United States Patent
Newcomb et al.

(10) Patent No.: US 11,013,273 B2
(45) Date of Patent: *May 25, 2021

(54) POD ASSEMBLY AND E-VAPOR APPARATUS INCLUDING THE SAME

(71) Applicant: Altria Client Services LLC, Richmond, VA (US)

(72) Inventors: Ryan Newcomb, Powhatan, VA (US); Terry Bache, Richmond, VA (US); Eric Hawes, Midlothian, VA (US); Raymond Lau, Richmond, VA (US); Cristian Popa, Hertfordshire (GB); James Yorkshades, Gamlingay (GB)

(73) Assignee: ALTRIA CLIENT SERVICES LLC, Richmond, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/887,147

(22) Filed: May 29, 2020

(65) Prior Publication Data

US 2020/0297030 A1    Sep. 24, 2020

Related U.S. Application Data

(63) Continuation of application No. 16/425,168, filed on May 29, 2019, now Pat. No. 10,701,981, which is a
(Continued)

(51) Int. Cl.
*A24F 47/00* (2020.01)
*G06F 21/44* (2013.01)
(Continued)

(52) U.S. Cl.
CPC ............ *A24F 47/008* (2013.01); *A24F 40/46* (2020.01); *A24F 40/465* (2020.01); *F22B 1/284* (2013.01);
(Continued)

(58) Field of Classification Search
None
See application file for complete search history.

(56) References Cited

U.S. PATENT DOCUMENTS

| 3,998,232 A | 12/1976 | Smith |
| 4,686,353 A | 8/1987 | Spector |

(Continued)

FOREIGN PATENT DOCUMENTS

| CN | 103960784 | 8/2014 |
| EP | 0 640297 A1 | 3/1995 |

(Continued)

OTHER PUBLICATIONS

Web address http://www.my7s.com/faq, 7's electronic cigarettes, Electronic Vapor.
(Continued)

*Primary Examiner* — Cynthia Szewczyk
(74) *Attorney, Agent, or Firm* — Harness, Dickey & Pierce, P.L.C

(57) ABSTRACT

An e-vapor apparatus may include a pod assembly including a pre-vapor formulation compartment, a first electrical connector, a vapor channel traversing the pre-vapor formulation compartment, and a vaporizer, the pre-vapor formulation compartment configured to hold a pre-vapor formulation therein and in fluidic communication with the vaporizer during an operation of the e-vapor apparatus, the first electrical connector including first and second power electrodes, the first power electrode including a first contact portion on an exterior of the first electrical connector and a first extended portion configured to contact an anode portion of the vaporizer, the second power electrode including a second contact portion on the exterior of the first electrical connector and a second extended portion configured to contact a cathode portion of the vaporizer. The e-vapor apparatus may further include a dispensing body including
(Continued)

a second electrical connector configured to connect to the first electrical connector.

16 Claims, 68 Drawing Sheets

Related U.S. Application Data continuation of application No. 16/010,934, filed on Jun. 18, 2018, now Pat. No. 10,314,343, which is a continuation of application No. 15/601,365, filed on May 22, 2017, now Pat. No. 9,999,258, which is a continuation-in-part of application No. 15/334,989, filed on Oct. 26, 2016, now Pat. No. 10,104,913, which is a continuation-in-part of application No. 14/998,020, filed on Apr. 22, 2015, now Pat. No. 10,064,432.

(51) Int. Cl.
  *H05B 1/02* (2006.01)
  *H05B 3/03* (2006.01)
  *F22B 1/28* (2006.01)
  *A24F 40/465* (2020.01)
  *A24F 40/46* (2020.01)

(52) U.S. Cl.
  CPC .......... *G06F 21/44* (2013.01); *H05B 1/0227* (2013.01); *H05B 3/03* (2013.01)

(56) References Cited

U.S. PATENT DOCUMENTS

| | | | |
|---|---|---|---|
| 5,666,977 A | 9/1997 | Higgins et al. | |
| 7,665,461 B2 | 2/2010 | Zierenberg et al. | |
| 8,689,804 B2 | 4/2014 | Fernando et al. | |
| 8,707,965 B2 | 4/2014 | Newton | |
| 8,955,522 B1 | 2/2015 | Bowen et al. | |
| 9,247,773 B2 | 2/2016 | Memari et al. | |
| 2005/0268911 A1 | 12/2005 | Cross et al. | |
| 2008/0023003 A1 | 1/2008 | Rosenthal | |
| 2009/0293888 A1 | 12/2009 | Williams et al. | |
| 2010/0242974 A1 | 9/2010 | Pan | |
| 2011/0011396 A1 | 1/2011 | Fang | |
| 2011/0036346 A1 | 2/2011 | Cohen et al. | |
| 2012/0318882 A1 | 12/2012 | Abehasera | |
| 2013/0042865 A1 | 2/2013 | Monsees et al. | |
| 2013/0081642 A1 | 4/2013 | Safari | |
| 2013/0167853 A1 | 7/2013 | Liu | |
| 2013/0192615 A1 | 8/2013 | Tucker et al. | |
| 2013/0213418 A1 | 8/2013 | Tucker et al. | |
| 2013/0220315 A1 | 8/2013 | Conley et al. | |
| 2013/0298905 A1 | 11/2013 | Levin et al. | |
| 2014/0144453 A1 | 5/2014 | Capuano et al. | |
| 2014/0150785 A1 | 6/2014 | Malik et al. | |
| 2014/0202474 A1 | 7/2014 | Peleg et al. | |
| 2014/0251326 A1 | 9/2014 | Terry et al. | |
| 2014/0290650 A1* | 10/2014 | Ivey | A24F 47/008 128/202.21 |
| 2015/0040929 A1 | 2/2015 | Hon | |
| 2015/0189919 A1 | 7/2015 | Liu | |
| 2015/0208729 A1 | 7/2015 | Monsees et al. | |
| 2015/0313287 A1 | 11/2015 | Verleur et al. | |
| 2015/0328415 A1 | 11/2015 | Minskoff et al. | |
| 2015/0351456 A1 | 12/2015 | Johnson et al. | |
| 2016/0360789 A1 | 12/2016 | Hawes et al. | |
| 2017/0042246 A1 | 2/2017 | Lau et al. | |
| 2017/0108840 A1 | 4/2017 | Hawes et al. | |

FOREIGN PATENT DOCUMENTS

| | | |
|---|---|---|
| WO | WO-2013/040193 A2 | 3/2013 |
| WO | WO-2014/066730 A1 | 5/2014 |
| WO | WO-2014/110119 A1 | 7/2014 |
| WO | WO-2014/207719 A1 | 12/2014 |
| WO | WO-2015/151053 | 10/2015 |
| WO | WO-2015/197165 A1 | 12/2015 |
| WO | WO 2016/172420 | 10/2016 |

OTHER PUBLICATIONS

International Search Report dated Jun. 23, 2016, issued in corresponding International Application No. PCT/US2016/028048.
Written Opinion of the International Searching Authority dated Jun. 23, 2016, issued in corresponding International Application No. PCT/US2016/028048.
U.S. Office Action dated Jun. 5, 2017 for copending U.S. Appl. No. 14/998,020.
http://vaping360.com/juul-vapor-e-cigarette-review, Feb. 1, 2016.
http://se.azinstall.net/2015/10/hacking-vuse-e-cig-puff-counter.html, Oct. 16, 2015.
Foxfur, "E-cigarette Bulk Tanks: Single & Dual coil," May 5, 2012.
Eurasian Office Action dated Oct. 22, 2020.
International Search Report and Written Opinion dated Sep. 13, 2018.

\* cited by examiner

802

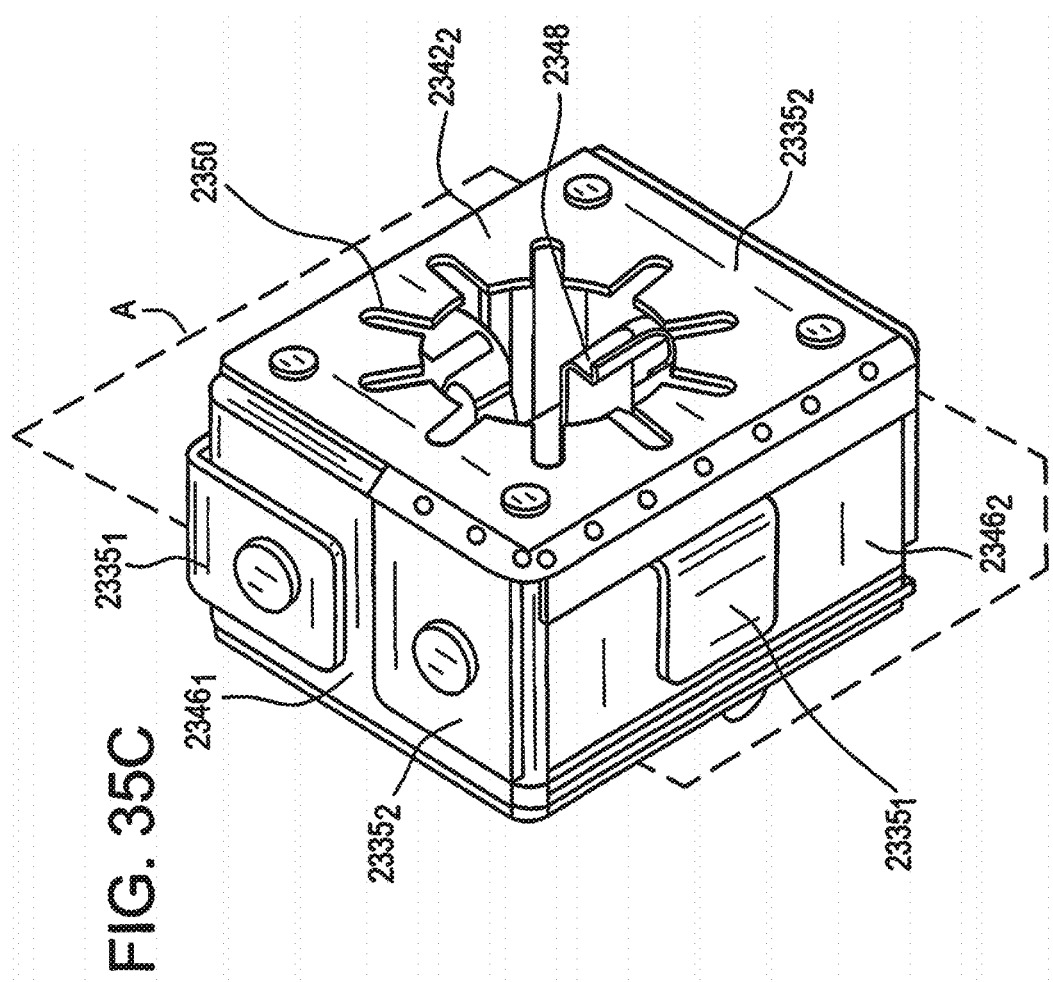

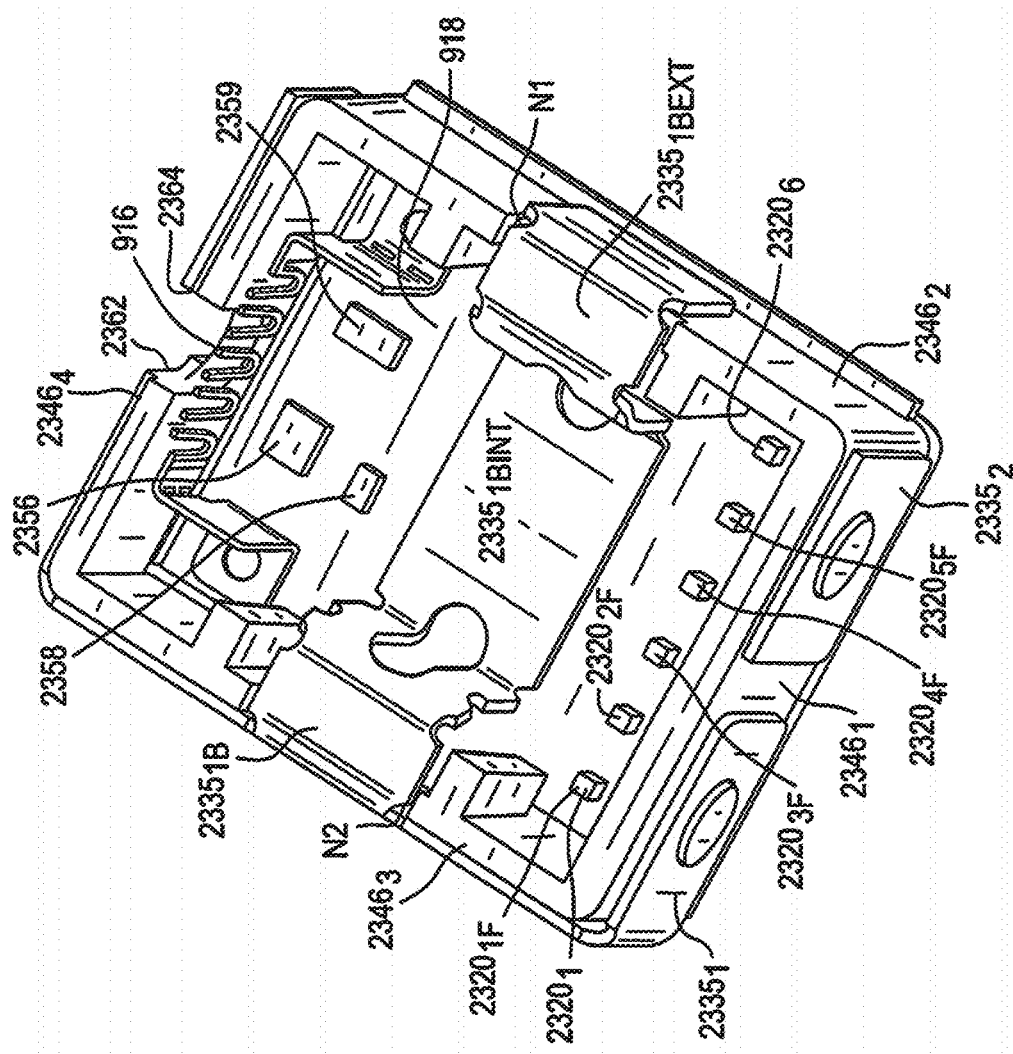

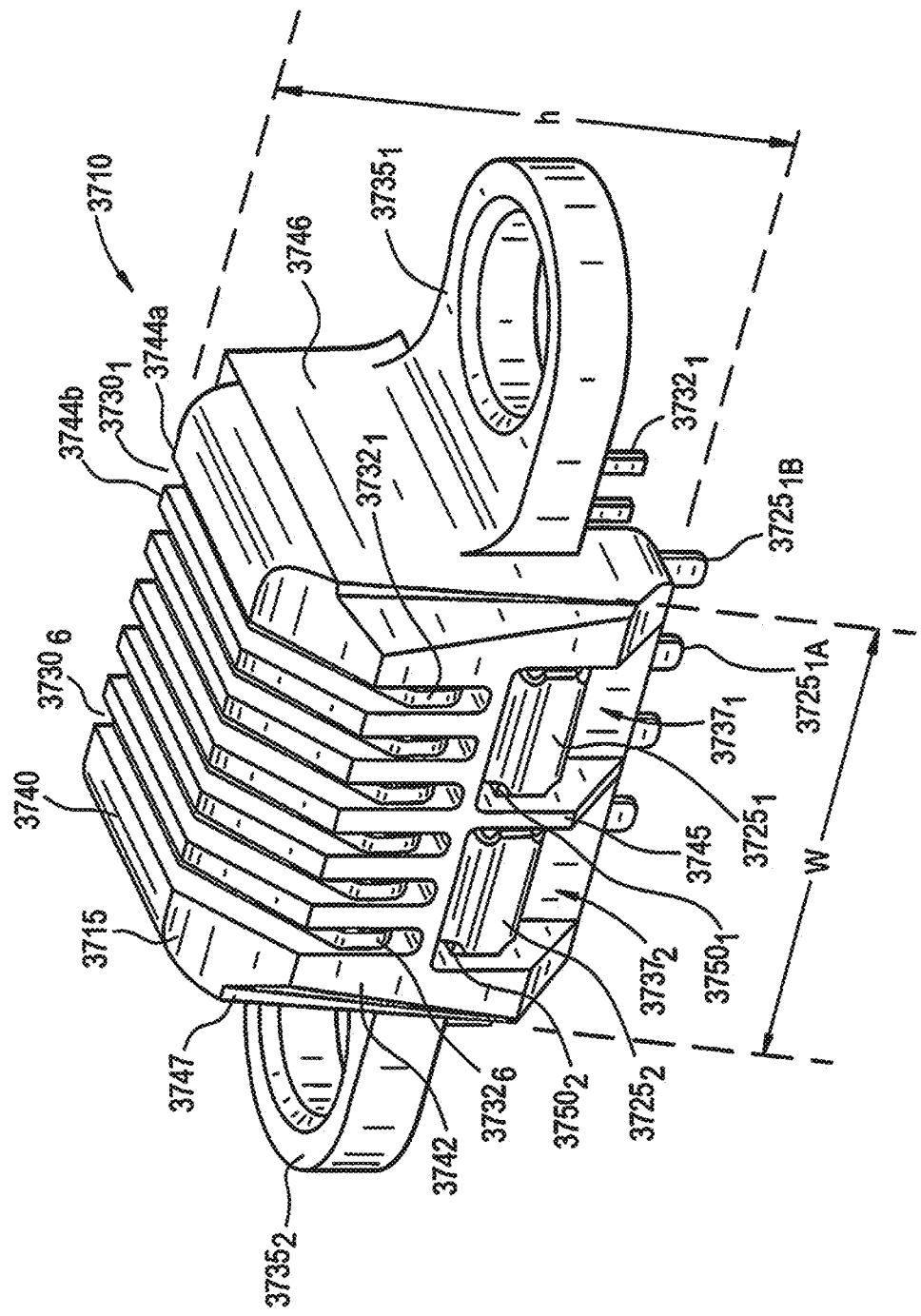

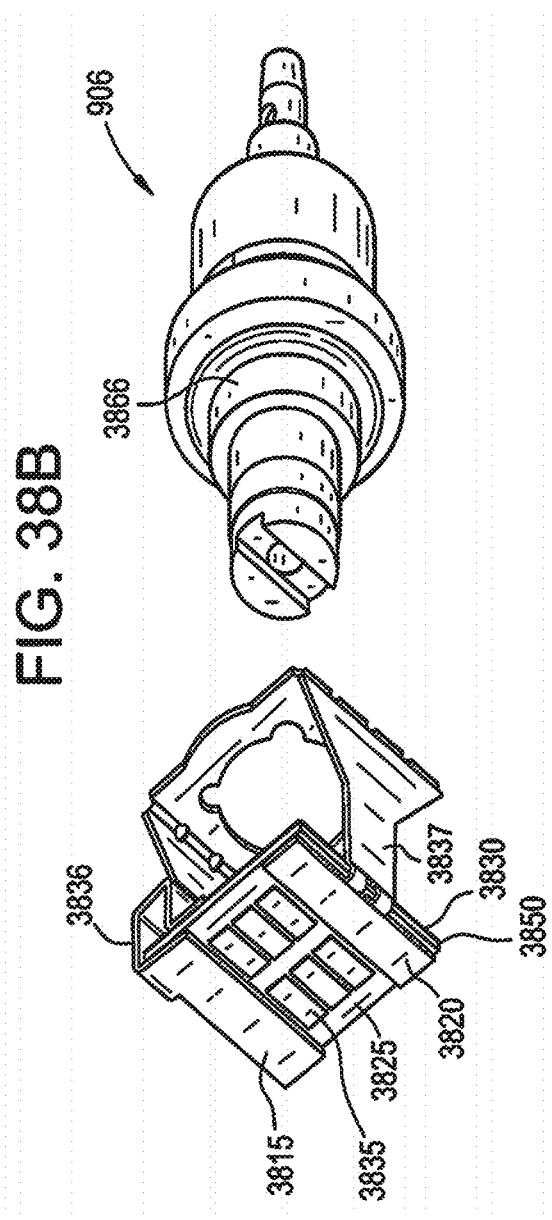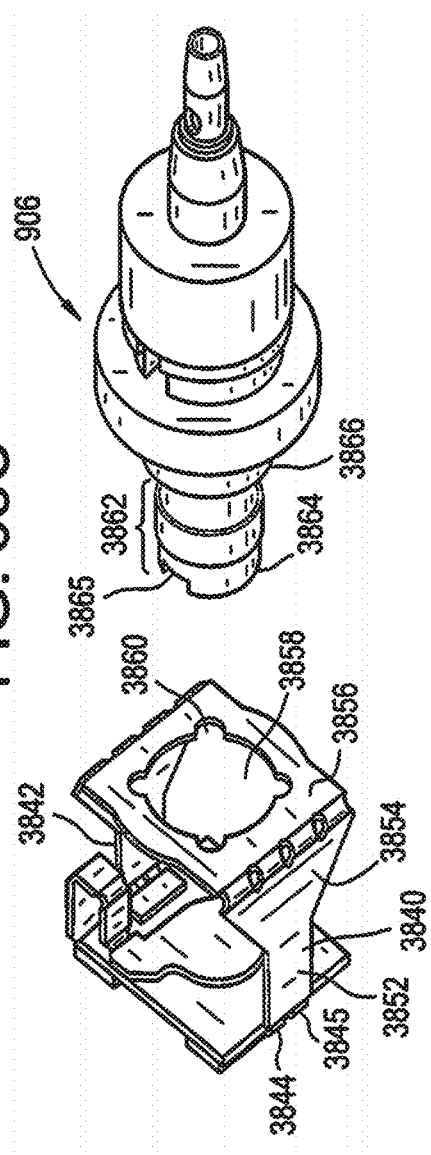

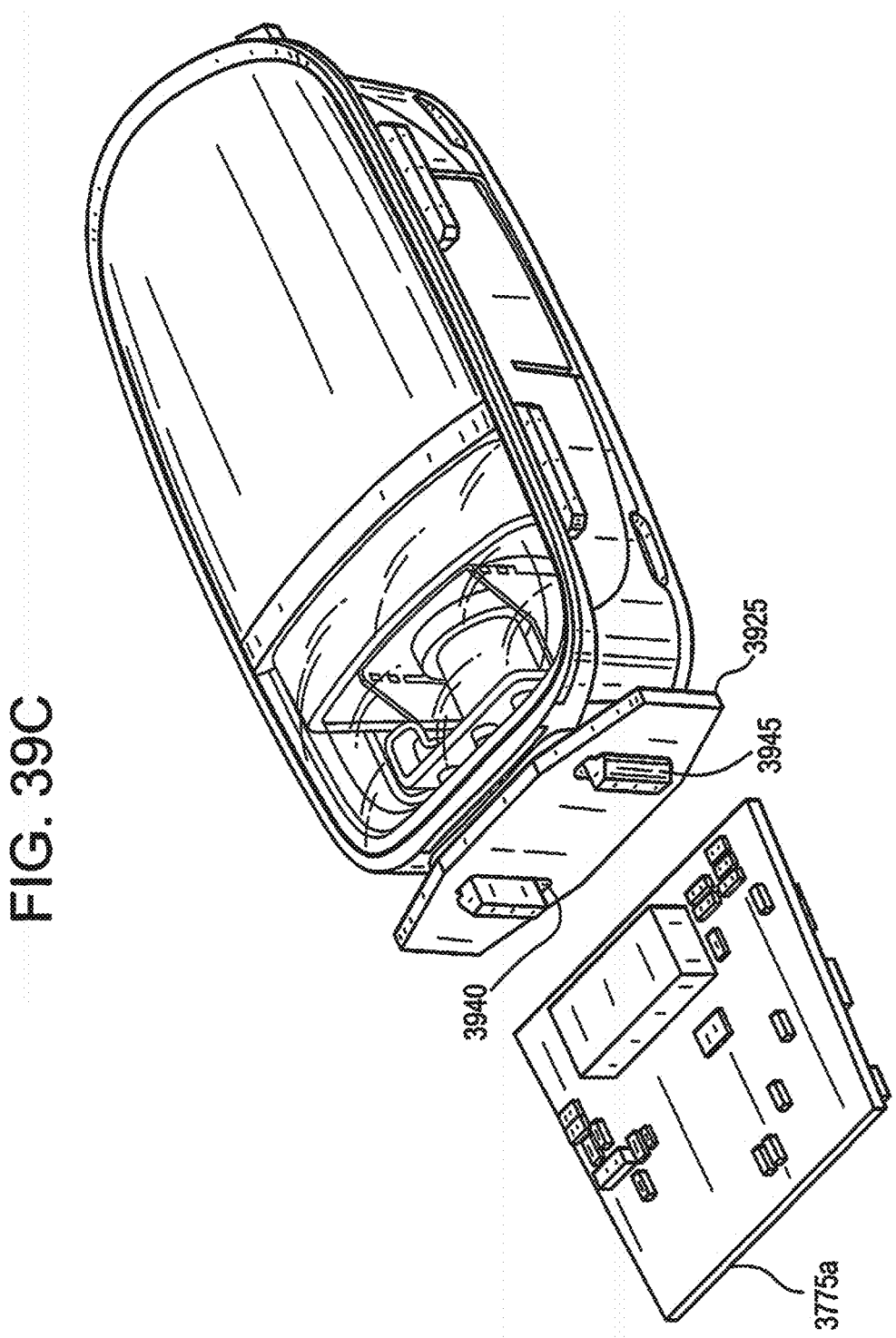

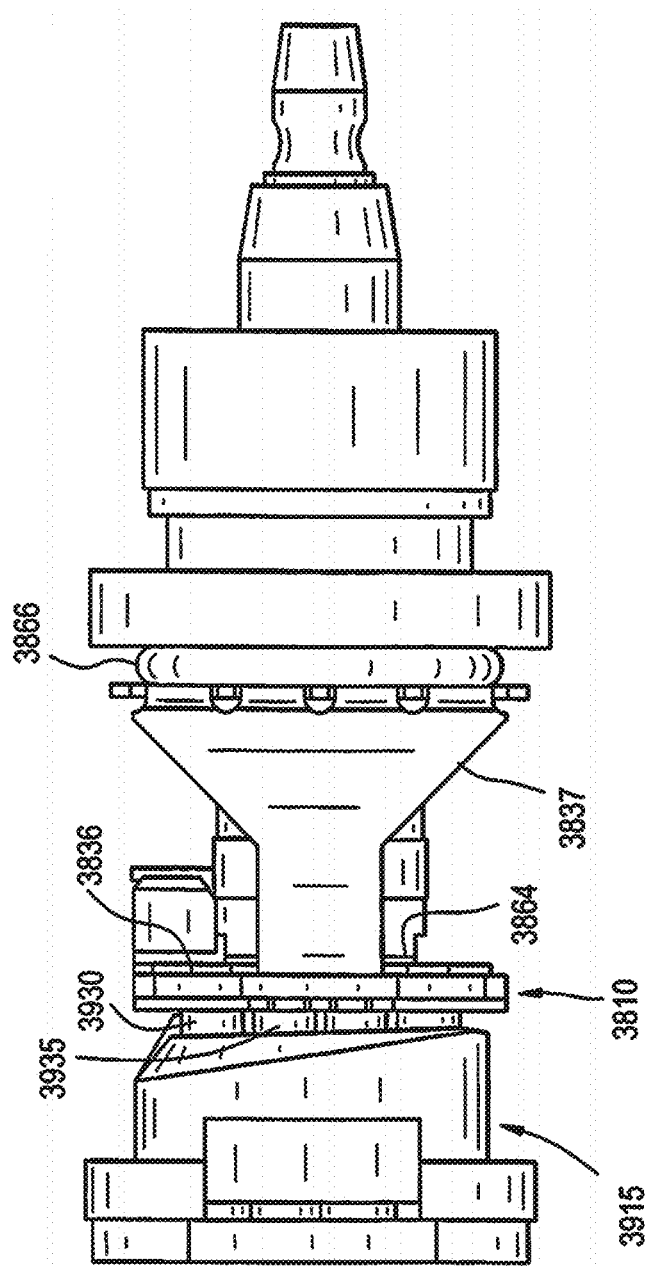

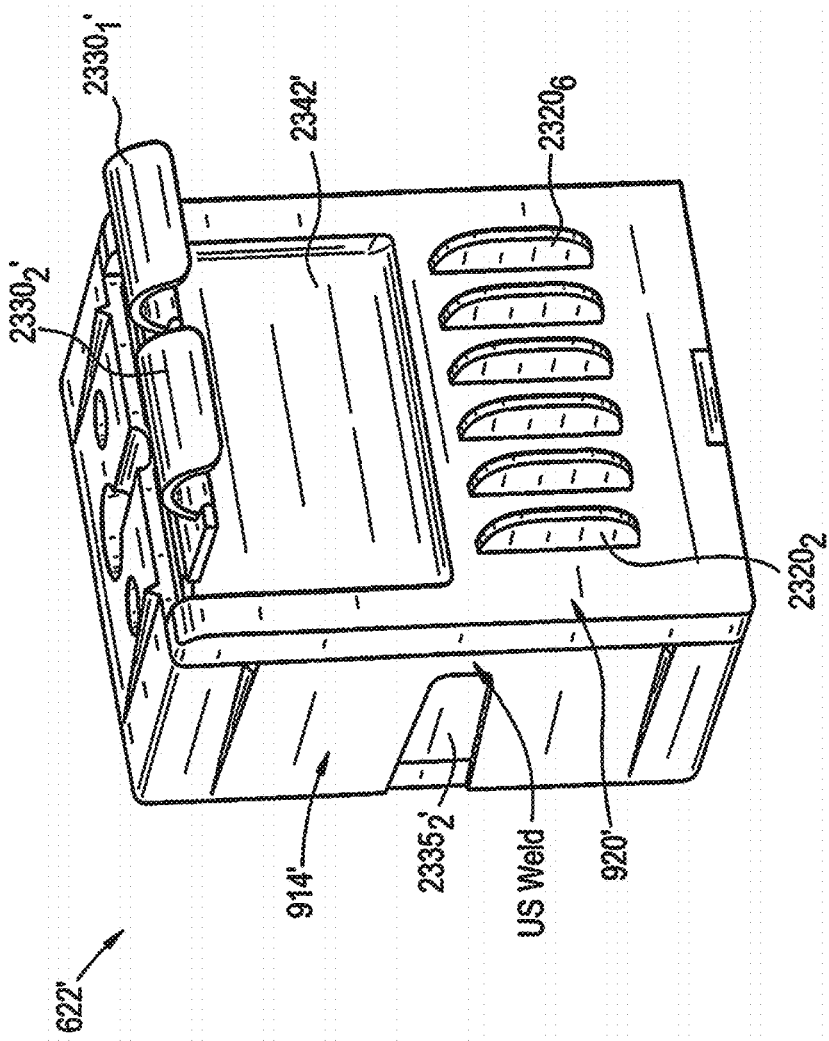

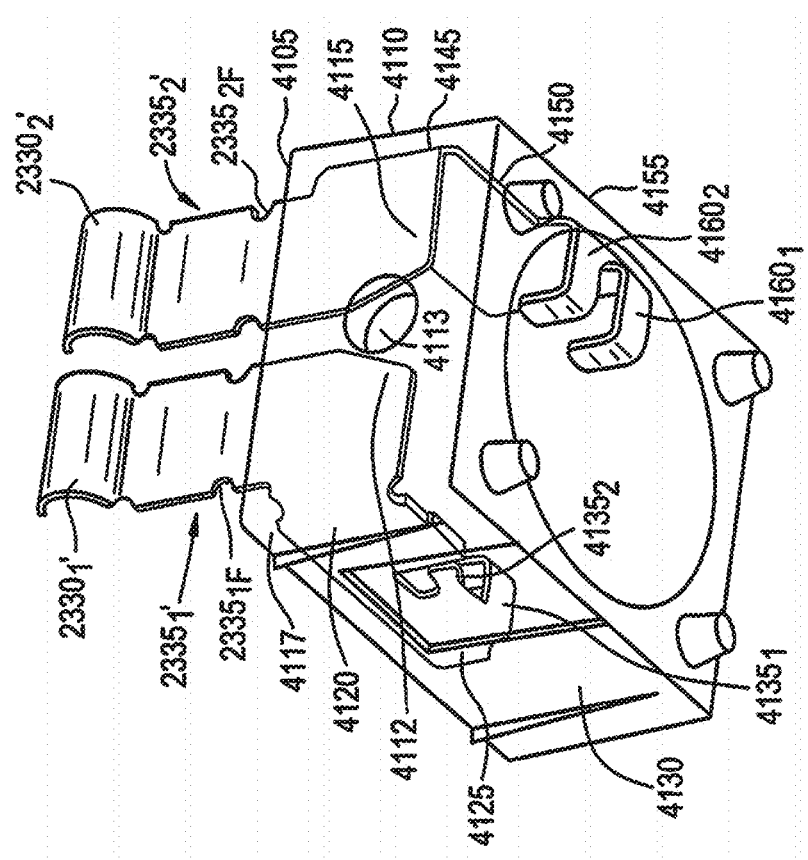

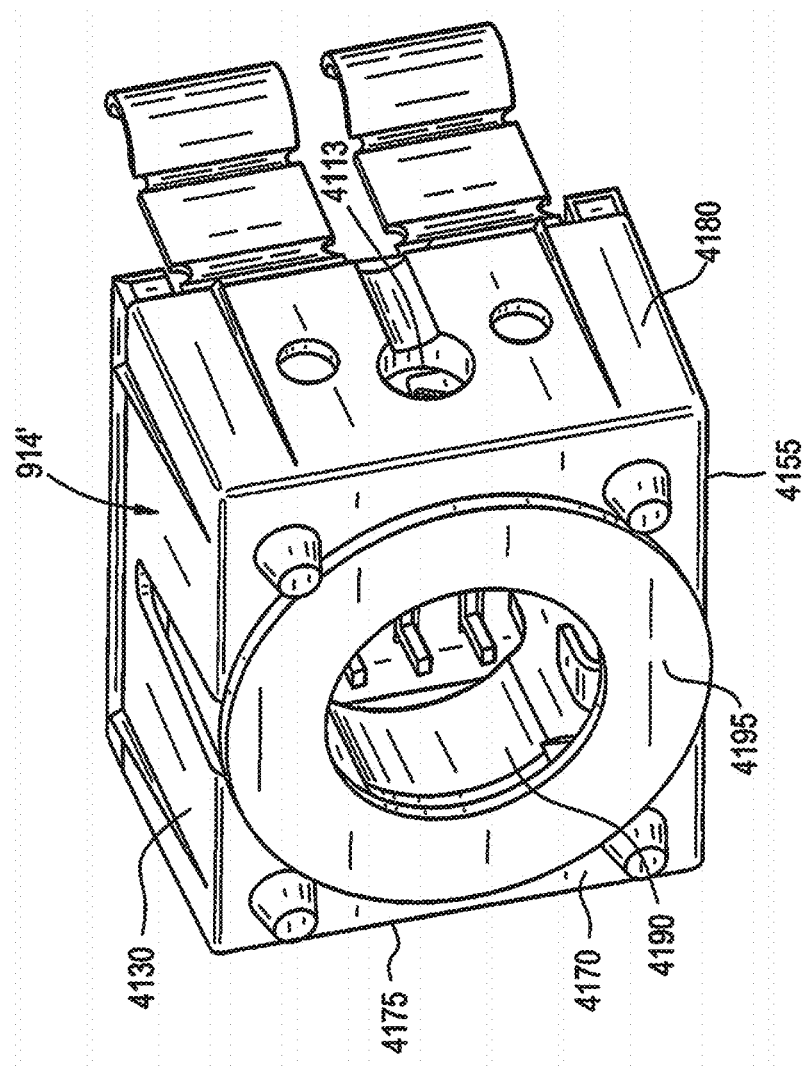

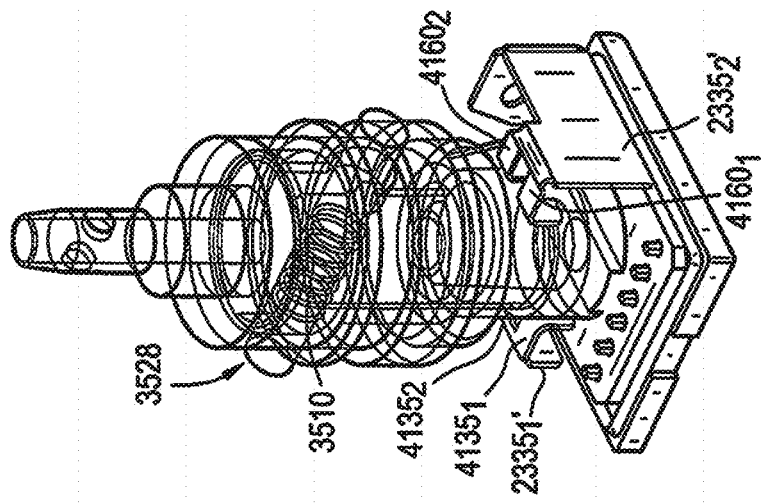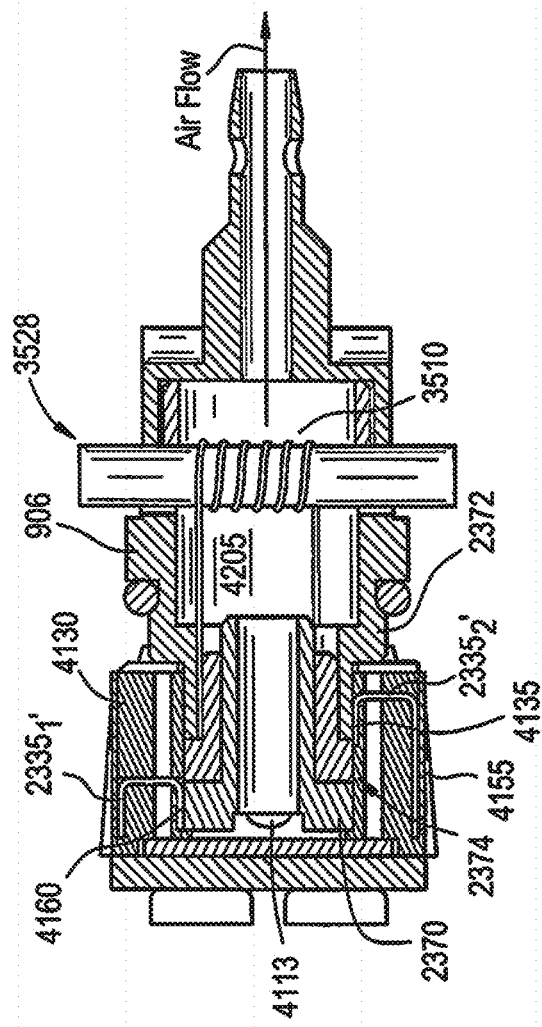

POD ASSEMBLY AND E-VAPOR APPARATUS INCLUDING THE SAME

CROSS-REFERENCE TO RELATED APPLICATION

The present application is a continuation under 35 U.S.C. § 120 of U.S. application Ser. No. 16/425,168, filed on May 29, 2019, which is a continuation of U.S. application Ser. No. 16/010,934, filed on Jun. 18, 2018, which is a continuation of U.S. application Ser. No. 15/601,365, filed on May 22, 2017, which is a continuation-in-part under 35 U.S.C. § 120 of U.S. application Ser. No. 15/334,989, filed Oct. 26, 2016, which is a continuation-in-part under 35 U.S.C. § 120 of U.S. application Ser. No. 14/998,020 (formerly U.S. Provisional Application No. 62/151,148), filed Apr. 22, 2015, the entire contents of each of which is hereby incorporated herein by reference.

BACKGROUND

Field

The present disclosure relates to electronic vapor (e-vapor) devices including self-contained articles including pre-vapor formulations.

Description of Related Art

Some e-vapor devices include a first section coupled to a second section via a threaded connection. The first section may be a replaceable cartridge, and the second section may be a reusable fixture. The threaded connection may be a combination of a male threaded member on the first section and a female threaded receiver on the second section.

SUMMARY

An e-vapor apparatus may include a pod assembly including a pre-vapor formulation compartment, a first electrical connector, a vapor channel traversing the pre-vapor formulation compartment, and a vaporizer, the pre-vapor formulation compartment configured to hold a pre-vapor formulation therein and in fluidic communication with the vaporizer during an operation of the e-vapor apparatus, the first electrical connector including first and second power electrodes, the first power electrode including a first contact portion on an exterior of the first electrical connector and a first extended portion configured to contact an anode portion of the vaporizer, the second power electrode including a second contact portion on the exterior of the first electrical connector and a second extended portion configured to contact a cathode portion of the vaporizer. The e-vapor apparatus may further include a dispensing body defining a receiving area to receive the pod assembly, the dispensing body including a second electrical connector configured to connect to the first electrical connector.

In an example embodiment, each of the first contact portion and the second contact portion includes a part that extends away from the exterior of the first electrical connector.

In an example embodiment, the part that extends away from the exterior of the first electrical connector is semi-circular.

In an example embodiment, the first contact portion and the second contact portion are configured to apply a spring force on the second electrical connector.

In an example embodiment, the first electrical connector further includes first data contacts, the first data contacts being blade-shaped.

In an example embodiment, the second electrical connector includes a body, the body defining slots for receiving the first data contacts and second data contacts on the body and in the slots.

In an example embodiment, the second data contacts are configured to apply a spring force on the first data contacts.

In an example embodiment, the first extended portion and the second extended portion are configured to apply a spring force on the vaporizer.

In an example embodiment, the pre-vapor formulation compartment and the first electrical connector are at opposite ends of the pod assembly.

In an example embodiment, the first electrical connector includes a memory device and an air flow sensor.

In an example embodiment, the dispensing body is configured to supply power to the pod assembly and communicate with the pod assembly via at least one electrical contact.

In an example embodiment, dimensions of the receiving area correspond to dimensions of the pod assembly.

In an example embodiment, the receiving area is a through-hole.

In an example embodiment, the dispensing body includes a mouthpiece that includes a vapor passage, the vapor passage being in fluidic communication with the vapor channel when the pod assembly is electrically connected to the dispensing body.

In an example embodiment, the e-vapor apparatus further includes an attachment structure on at least one of a side wall of the receiving area and a side surface of the pod assembly, the attachment structure configured to engage and hold the pod assembly upon insertion into the receiving area.

At least one example embodiment is directed to a pod assembly for an e-vapor apparatus. The pod assembly includes a pre-vapor formulation compartment configured to hold a pre-vapor formulation therein, a vapor channel traversing the pre-vapor formulation compartment, a vaporizer configured to be in fluidic communication with the pre-vapor formulation compartment and a device compartment configured to be in fluidic communication with the pre-vapor formulation compartment, the device compartment including a first electrical connector, the first electrical connector including first and second power electrodes, the first power electrode including a first contact portion on an exterior of the first electrical connector and a first extended portion configured to contact an anode portion of the vaporizer, the second power electrode including a second contact portion on the exterior of the first electrical connector and a second extended portion configured to contact a cathode portion of the vaporizer.

In an example embodiment, each of the first contact portion and the second contact portion includes a part that extends away from the exterior of the first electrical connector.

In an example embodiment, the part that extends away from the exterior of the first electrical connector is semi-circular.

In an example embodiment, the first electrical connector further includes first data contacts, the first data contacts being blade-shaped.

In an example embodiment, the first electrical connector includes a memory device and an air flow sensor.

BRIEF DESCRIPTION OF THE DRAWINGS

The various features and advantages of the non-limiting embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

FIGS. 35A-35F illustrate an example embodiment of a pod assembly having an electrical connector assembly.

FIG. 37B illustrates a perspective view of the electrical connector assembly shown in FIG. 37A.

FIGS. 38A-38C illustrate an example embodiment of a pod assembly having an electrical connector assembly.

FIGS. 39B-39C illustrate more detailed views of a connector assembly shown in FIG. 39A.

FIG. 40 illustrates a cross-sectional view of the connector assembly shown in FIG. 38A and the connector assembly shown in FIG. 39A.

FIGS. 41A-41F illustrate another example embodiment of an electrical connector assembly.

DETAILED DESCRIPTION

Figure 1:
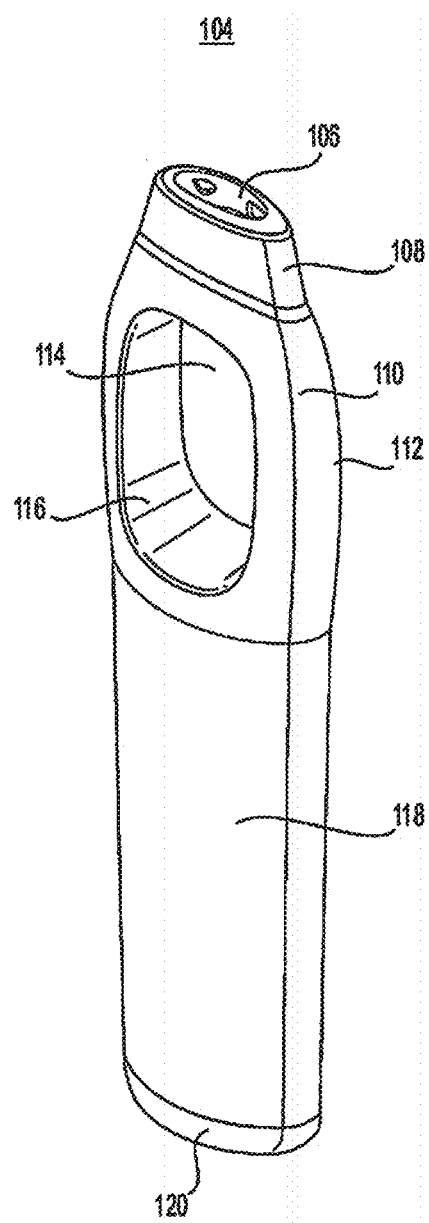
FIG. 1 is a perspective view of a dispensing body of an e-vapor apparatus according to an example embodiment.

It should be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It should be understood that, although the terms first, second, third, etc. may be used herein to describe various elements, components, regions, layers and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing. The regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

FIG. 1 is a perspective view of a dispensing body of an e-vapor apparatus according to an example embodiment. Referring to FIG. 1, a dispensing body 104 of an e-vapor apparatus includes a frame portion that is connected to a body portion 118. The frame portion includes a first frame 110 and a second frame 112. The side walls 116 (e.g., inner side surfaces) of the first frame 110 and the second frame 112 define a through-hole 114. The through-hole 114 is configured to receive a pod assembly (which will be subsequently discussed in detail).

Generally, an e-vapor apparatus may include the dispensing body 104, a pod assembly inserted in the through-hole 114 of the dispensing body 104, and a vaporizer disposed in at least one of the pod assembly and the dispensing body 104. The pod assembly may include a pre-vapor formulation compartment (e.g., liquid compartment), a device compartment, and a vapor channel. The vapor channel may extend from the device compartment and traverse the pre-vapor formulation compartment. The pre-vapor formulation compartment is configured to hold a pre-vapor formulation (e.g., e-liquid) therein. A pre-vapor formulation is a material or combination of materials that may be transformed into a vapor. For example, the pre-vapor formulation may be a liquid, solid, and/or gel formulation including, but not limited to, water, beads, solvents, active ingredients, ethanol, plant extracts, natural or artificial flavors, and/or vapor formers such as glycerine and propylene glycol.

The dispensing body 104 includes a proximal portion and an opposing distal portion. The mouthpiece 108 is disposed at the proximal portion, while the end piece 120 is disposed at the distal portion. The proximal portion includes a vapor passage 106 and the through-hole 114. The vapor passage 106 extends from an end surface of the proximal portion to the side wall 116 of the through-hole 114. The vapor passage 106 is in the form of one or more passageways extending through the proximal portion of the dispensing body 104. The through-hole 114 is between the vapor passage 106 and the distal portion of the dispensing body 104 (e.g., between the mouthpiece 108 and the body portion 118).

A vaporizer (which will be subsequently discussed in more detail) is disposed in at least one of the pod assembly and the dispensing body 104. The pre-vapor formulation compartment of the pod assembly is configured to be in fluidic communication with the vaporizer during an operation of the e-vapor apparatus such that the pre-vapor formulation from the pre-vapor formulation compartment comes into thermal contact with the vaporizer. The vaporizer is configured to heat the pre-vapor formulation to produce a vapor that passes through the pod assembly via the vapor channel. The through-hole 114 of the dispensing body 104 is configured to receive the pod assembly such that the vapor channel of the pod assembly is aligned with the vapor passage 106 of the dispensing body 104 so as to facilitate a delivery of the vapor through the vapor passage 106 of the dispensing body 104.

Figure 2:
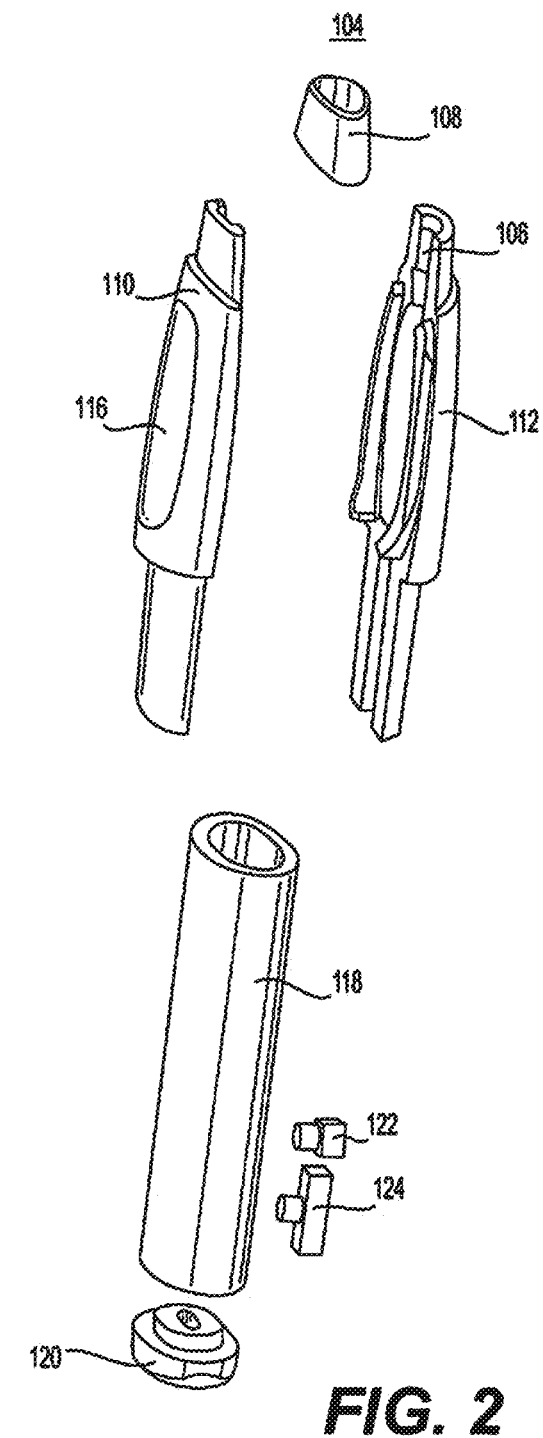
FIG. 2 is an exploded view of the dispensing body of FIG. 1.

FIG. 2 is an exploded view of the dispensing body of FIG. 1. Referring to FIG. 2, the first frame 110 and the second frame 112 are configured to unite to form the frame portion of the dispensing body 104. A number of options are available for uniting the first frame 110 and the second frame 112. In an example embodiment, the first frame 110 is a female member, while the second frame 112 is a male member that is configured to engage therewith. Alternatively, the first frame 110 may be a male member, while the second frame 112 may be a female member that is configured to engage therewith. The engagement of the first frame 110 and the second frame 112 may be via a snap-fit, friction-fit, or slide-lock type arrangement, although example embodiments are not limited thereto.

The first frame 110 may be regarded as the front frame of the dispensing body 104, and the second frame 112 may be regarded as the rear frame (or vice versa). Additionally, the proximal ends of the first frame 110 and the second frame 112, when united, define the vapor passage 106 therebetween. The vapor passage 106 may be in the form of a single passageway that is in communication with the through-hole 114 defined by the side wall 116. Alternatively, the vapor passage 106 may be in the form of a plurality of passageways that are in communication with the through-hole 114 defined by the side wall 116. In such an example, the plurality of passageways may include a central passageway surrounded by peripheral passageways (or just several evenly spaced passageways). Each of the plurality of passageways may independently extend from the through-hole 114 to the proximal end surface of the frame portion. Alternatively, a common passageway may extend partly from the through-hole 114 and then branch into a plurality of passageways that extend to the proximal end surface of the frame portion.

The mouthpiece 108 is configured to slip onto the proximal end of the frame portion that defines the vapor passage 106. As a result, the outer surface of the proximal end formed by the first frame 110 and the second frame 112 may correspond to an inner surface of the mouthpiece 108. Alternatively, the proximal end defining the vapor passage 106 may be integrally formed as part of the mouthpiece 108 (instead of being a part of the frame portion). The mouthpiece 108 may be secured via a snap-fit type or other suitable arrangement. In an example embodiment, the mouthpiece 108 is a removable element that is intended to permit voluntary, recommended, or required replacement by an adult vaper. For instance, the mouthpiece 108 may, in addition to its intended functionality, provide a visual or other sensory appeal to the adult vaper. In particular, the mouthpiece 108 may be formed of an ornamental material (e.g., wood, metal, ceramic) and/or include designs (e.g., patterns, images, characters). Thus, the mouthpiece 108 may be customized so as to provide an expression of personality and individuality by an adult vaper. In other instances, the removable nature of the mouthpiece 108 may facilitate a recommended replacement due to the amount of usage or a required replacement due to wear over time or damage (e.g., chipped mouthpiece 108 caused by accidental dropping of e-vapor apparatus).

The lower ends of the first frame 110 and the second frame 112 opposite the proximal ends (that define the vapor passage 106) are configured to insert into the body portion 118. To facilitate a secure fit, the outer surface of the lower ends of the first frame 110 and the second frame 112 may correspond to a receiving inner surface of the body portion 118. Additionally, the lower ends of the first frame 110 and the second frame 112 may also define a groove therebetween to accommodate one or more wires that connect to one or more electrical contacts provided in the side wall 116 (e.g., lower surface of the side wall 16 opposite the vapor passage 106). A power source (e.g., battery) may also be provided in the groove to supply the requisite current through the wire(s). Alternatively, the power source may be provided in an available space within the body portion 118 between the inserted lower end of the frame portion and the end piece 120.

A first button 122 and a second button 124 may be provided on the body portion 118 and connected to the corresponding circuitry and electronics therein. In an example embodiment, the first button 122 may be a power button, and the second button 124 may be a battery level indicator. The battery level indicator may display a representation of the amount of power available (e.g., 3 out of 4 bars). In addition, the battery level indicator may also blink and/or change colors to alert an adult vaper to recharge the e-vapor apparatus. To stop the blinking, an adult vaper may simply press the second button 124. Thus, the button(s) of the e-vapor apparatus may have a control and/or display function. It should be understood that the examples with regard to the first button 122 and the second button 124 are not intended to be limiting and can have different implementations depending on the desired functionalities. Accordingly, more than two buttons (and/or of different shapes) may be provided in the same proximity or at a different location on the e-vapor apparatus.

Figure 3:
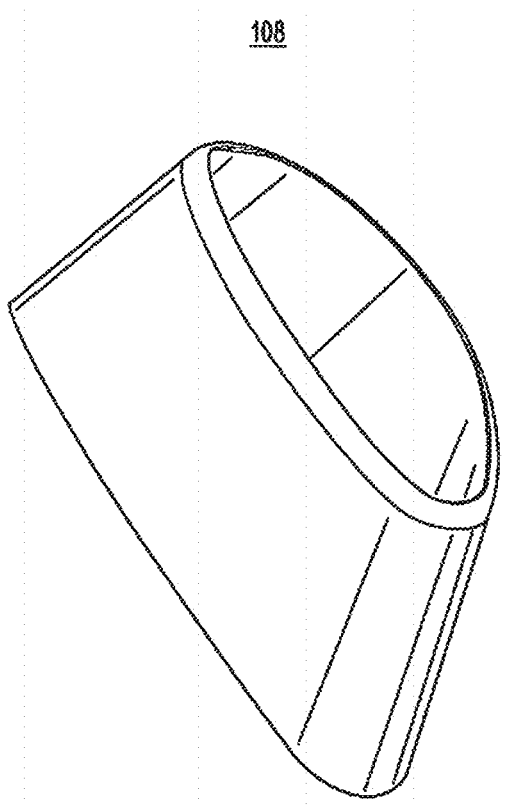
FIG. 3 is a perspective view of the mouthpiece of FIG. 2.

FIG. 3 is a perspective view of the mouthpiece of FIG. 2. Referring to FIG. 3, the mouthpiece 108 may be an open-ended cap-like structure that is configured to slip onto the proximal end of the frame portion defining the vapor passage 106. The mouthpiece 108 may have a wider base that tapers to a narrower top. However, it should be understood that example embodiments are not limited thereto. The mouthpiece 108 may also be shaped to better accommodate an adult vaper's mouth during the application of negative pressure. For instance, one side of the mouthpiece 108 may be more linear, while the opposing side may be more curved.

Figure 4:
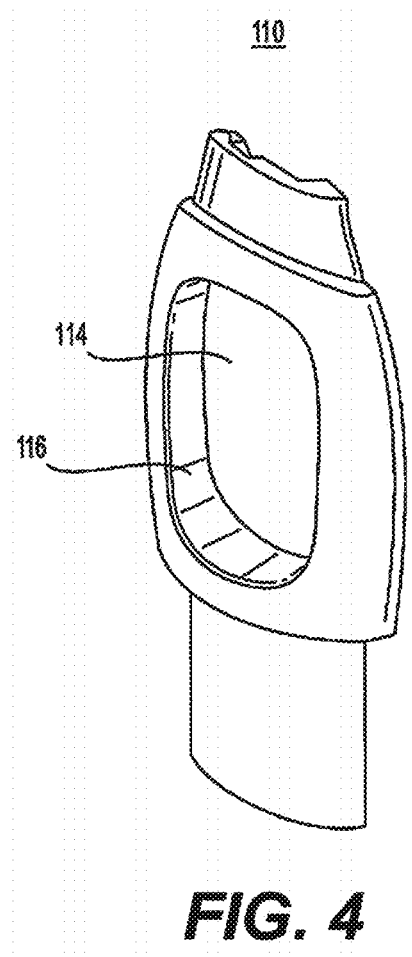
FIG. 4 is a perspective view of the first frame of FIG. 2.

FIG. 4 is a perspective view of the first frame of FIG. 2. Referring to FIG. 4, the first frame 110 includes a side wall 116 that defines a through-hole 114. The first frame 110 is configured to unite with the second frame 112, which also includes a side wall 116 defining a through-hole 114. Because the combined through-hole 114 is configured to receive a pod assembly, the side walls 116 of the first frame 110 and the second frame 112 may form a relatively smooth and continuous surface to facilitate the insertion of the pod assembly.

Figure 5:
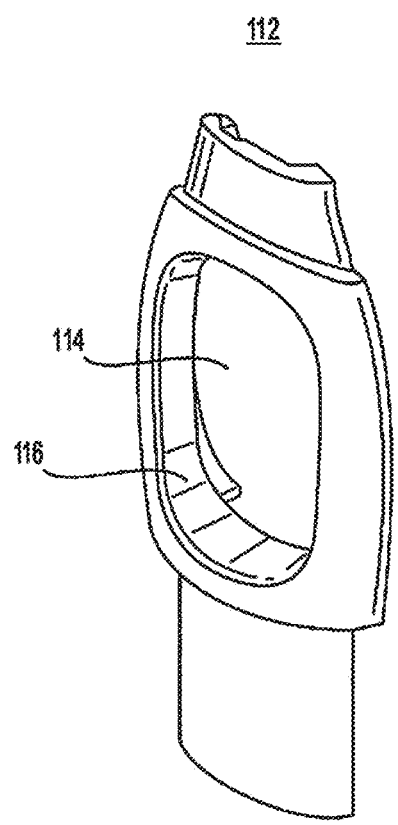
FIG. 5 is a perspective view of the second frame of FIG. 2.

FIG. 5 is a perspective view of the second frame of FIG. 2. Referring to FIG. 5, the second frame 112 is configured to unite with the first frame 110 such that the shape defined by the combined side walls 116 corresponds to the shape of the side surface of a pod assembly. In addition, an attachment structure (e.g., mating member/recess, magnetic arrangement) may be provided on at least one of the side walls 116 and the side surface of the pod assembly.

For example, the attachment structure may include a mating member that is formed on the side wall 116 (of the first frame 110 and/or second frame 112) and a corresponding recess that is formed on the side surface of the pod assembly. Conversely, the mating member may be formed on the side surface of the pod assembly, while the corresponding recess may be formed on the side wall 116 (of the first frame 110 and/or second frame 112). In a non-limiting embodiment, the mating member may be a rounded structure to facilitate the engagement/disengagement of the attachment structure, while the recess may be a concave indentation that corresponds to the curvature of the rounded structure. The mating member may also be spring-loaded so as to retract (via spring compression) when the pod assembly is being inserted into the through-hole 114 and protract (via spring decompression) when mating member becomes aligned with the corresponding recess. The engagement of the mating member with the corresponding recess may result in an audible sound (e.g., click), which notifies the adult vaper that the pod assembly is secured and properly positioned within the through-hole 114 of the dispensing body 104.

In another example, the attachment structure may include a magnetic arrangement. For instance, a first magnet may be arranged in the side wall 116 (of the first frame 110 and/or second frame 112), and a second magnet may be arranged in the side surface of the pod assembly. The first and/or second magnets may be exposed or hidden from view behind a layer of material. The first and second magnets are oriented so as to be attracted to each other, and a plurality of pairs of the first and second magnets may be provided to ensure that the pod assembly will be secure and properly aligned within the through-hole 114 of the dispensing body 104. As a result, when the pod assembly is inserted in the through-hole 114, the pair(s) of magnets (e.g., first and second magnets) will be attracted to each other and, thus, hold the pod assembly within the through-hole 114 while properly aligning the channel outlet of the pod assembly with the vapor passage 106 of the dispensing body 104.

Figure 6:
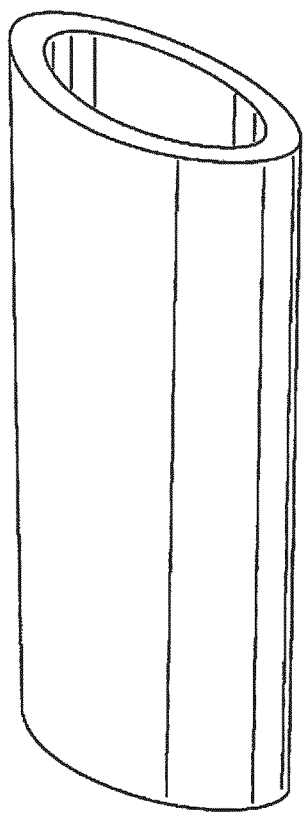
FIG. 6 is a perspective view of the body portion of FIG. 2.
Figure 7:
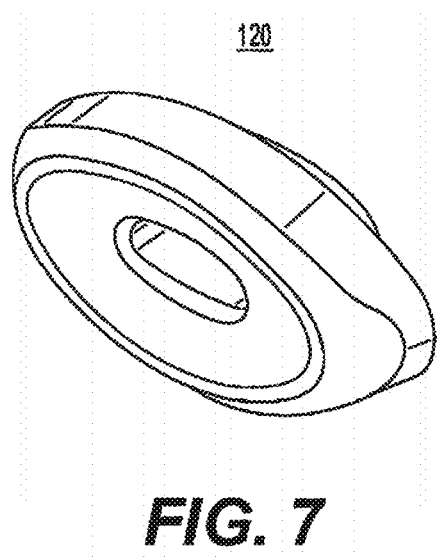
FIG. 7 is a perspective view of the end piece of FIG. 2.

FIG. 6 is a perspective view of the body portion of FIG. 2. Referring to FIG. 6, the body portion 118 may be a tube-like structure that constitutes a substantial segment of the dispensing body 104. The cross-section of the body portion 118 may be oval-shaped, although other shapes are possible depending on the structure of the frame portion. An adult vaper may hold the e-vapor apparatus by the body portion 118. Accordingly, the body portion 118 may be formed of (or covered with) a material that provides enhanced gripping and/or texture appeal to the fingers FIG. 7 is a perspective view of the end piece of FIG. 2. Referring to FIG. 7, the end piece 120 is configured to be inserted in the distal end of the body portion 118. The shape of the end piece 120 may correspond to the shape of the distal end of the body portion 118 so as to provide a relatively smooth and continuous transition between the two surfaces.

Figure 8:
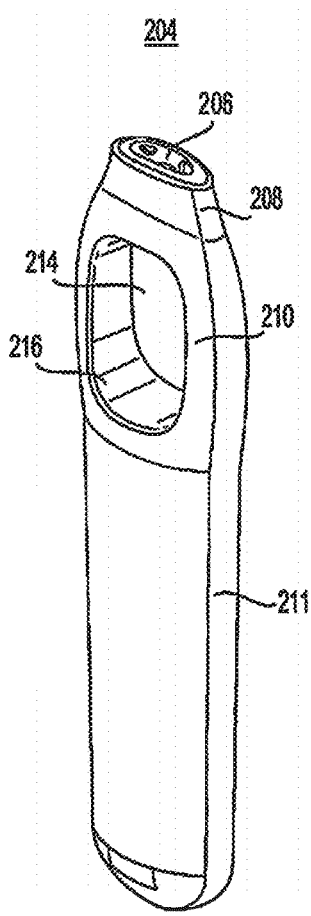
FIG. 8 is a perspective view of another dispensing body of an e-vapor apparatus according to an example embodiment.

FIG. 8 is a perspective view of another dispensing body of an e-vapor apparatus according to an example embodiment. Referring to FIG. 8, the dispensing body 204 includes a side wall 216 defining a through-hole 214 that is configured to receive a pod assembly. A substantial portion of the framework of the dispensing body 204 is provided by the first frame 210, the frame trim 211, and the second frame 212 (e.g., FIG. 9). A vapor passage 206 and a first mouthpiece 208 are provided at a proximal portion of the dispensing body 204.

Figure 9:
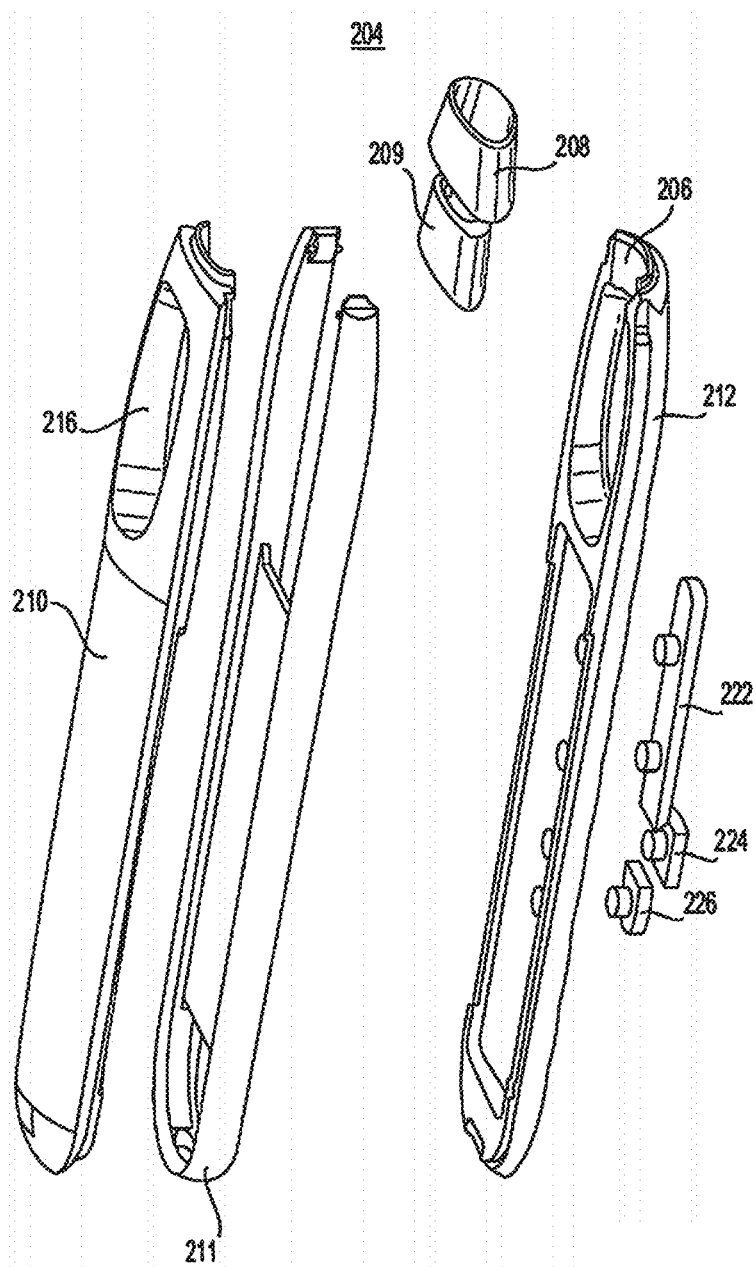
FIG. 9 is an exploded view of the dispensing body of FIG. 8.

FIG. 9 is an exploded view of the dispensing body of FIG. 8. Referring to FIG. 9, the frame trim 211 is sandwiched between the first frame 210 and the second frame 212. However, it should be understood that it is possible to modify and structure the first frame 210 and the second frame 212 such that the frame trim 211 is not needed. The vapor passage 206 may be defined by both the proximal ends of the first frame 210 and the second frame 212 as well as the second mouthpiece 209. As a result, the vapor passage 206 extends from the side wall 216 to the outlet end of the second mouthpiece 209. The first mouthpiece 208 is configured to slip onto the second mouthpiece 209. In an example embodiment, the first mouthpiece 208 may be structured to be removable, while the second mouthpiece 209 may be structured to be permanent. Alternatively, the first mouthpiece 208 may be integrated with the second mouthpiece 209 to form a single structure that is removable.

A first button 222, a second button 224, and a third button 226 may be provided on the second frame 212 of the dispensing body 204. In an example embodiment, the first button 222 may be a display (e.g., battery level indicator), the second button 224 may control an amount of pre-vapor formulation available to the heater, and the third button 226 may be the power button. However, it should be understood that example embodiments are not limited thereto. Notably, the buttons can have different implementations depending on the desired functionalities. Accordingly, a different number of buttons (and/or of different shapes) may be provided in the same proximity or at a different location on the e-vapor apparatus. Furthermore, the features and considerations in connection with the dispensing body 104 that are also applicable to the dispensing body 204 may be as discussed supra in connection with the dispensing body 104.

Figure 10:
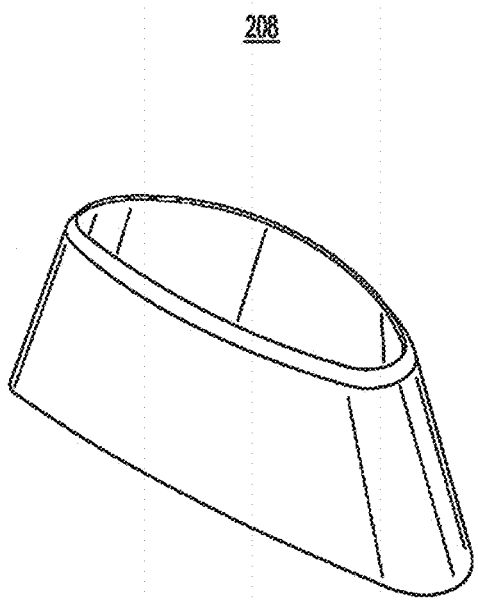
FIG. 10 is a perspective view of the first mouthpiece of FIG. 9.

FIG. 10 is a perspective view of the first mouthpiece of FIG. 9. Referring to FIG. 10, the first mouthpiece 208 is configured to fit over the second mouthpiece 209. Thus, the inner surface of the first mouthpiece 208 may correspond to an outer surface of the second mouthpiece 209.

Figure 11:
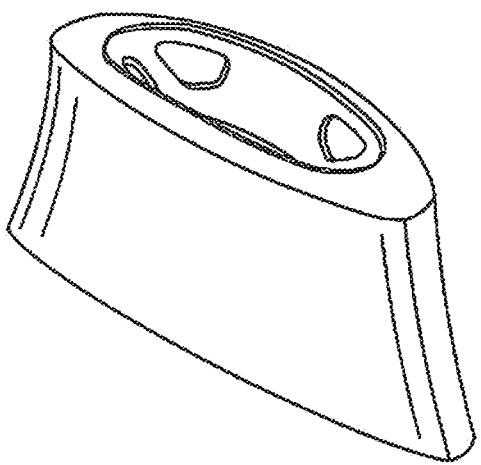
FIG. 11 is a perspective view of the second mouthpiece of FIG. 9.

FIG. 11 is a perspective view of the second mouthpiece of FIG. 9.

Referring to FIG. 11, the second mouthpiece 209 defines a vapor passage 206 therein. The second mouthpiece 209 may resemble the combined proximal ends of the first frame 110 and the second frame 112 that define the vapor passage 106 of the dispensing body 104.

Figure 12:
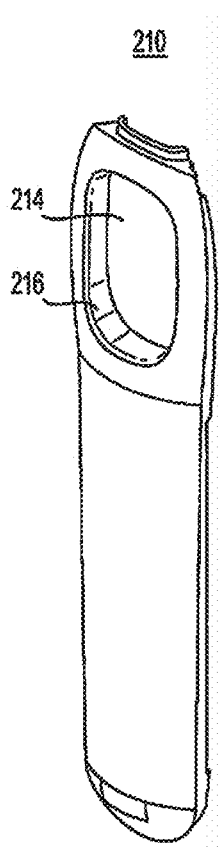
FIG. 12 is a perspective view of the first frame of FIG. 9.

FIG. 12 is a perspective view of the first frame of FIG. 9. Referring to FIG. 12, the first frame 210 includes a side wall 216 that defines a through-hole 214. The top end of the first frame 210 may include a connection structure that facilitates the connection of at least the second mouthpiece 209 thereto.

Figure 13:
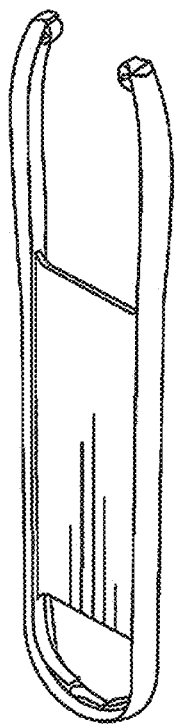
FIG. 13 is a perspective view of the frame trim of FIG. 9.

FIG. 13 is a perspective view of the frame trim of FIG. 9. Referring to FIG. 13, the frame trim 211 may be in the form of a curved strip that is supported by a central plate. When arranged between the first frame 210 and the second frame 212, the frame trim 211 forms a side surface of the dispensing body 204, although example embodiments are not limited thereto.

Figure 14:
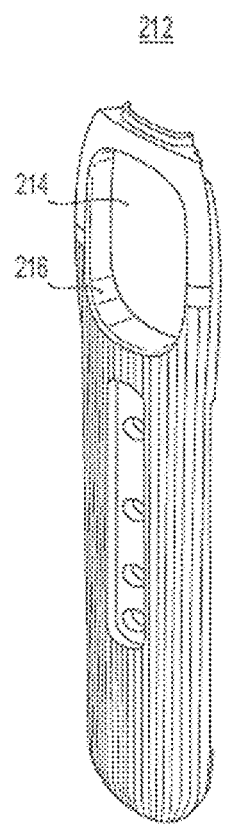
FIG. 14 is a perspective view of the second frame of FIG. 9.

FIG. 14 is a perspective view of the second frame of FIG. 9. Referring to FIG. 14, the second frame 212 includes a side wall 216 that defines a through-hole 214. The top end of the second frame 212 may include a connection structure that facilitates the connection of at least the second mouthpiece 209 thereto. In addition, the surface of the second frame 212 may be provided with a pattern or textured appearance. Such patterning and texturing may be aesthetic (e.g., visually appealing) and/or functional (e.g., enhanced grip) in nature. Although not shown, the surface of the first frame 210 may be similarly provided.

Figure 15:
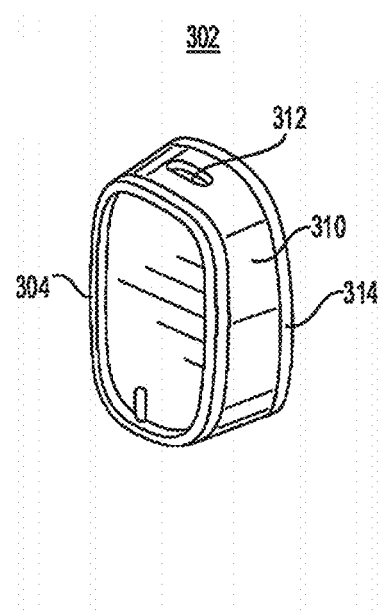
FIG. 15 is a perspective view of a pod assembly of an e-vapor apparatus according to an example embodiment.

FIG. 15 is a perspective view of a pod assembly of an e-vapor apparatus according to an example embodiment. Referring to FIG. 15, the pod assembly 302 includes a pod trim 310 that is arranged between a first cap 304 and a second cap 314. The first cap 304 may be regarded as a front cap, and the second cap 314 may be regarded as a rear cap (or vice versa). The first cap 304 and the second cap 314 may be formed of a transparent material to permit a viewing of the contents (e.g., pre-vapor formulation) in the pod assembly 302. The pod trim 310 defines a channel outlet 312 for the release of vapor generated within the pod assembly 302.

The pod assembly 302 is a self-contained article that can be sealed with a protective film that wraps around the pod trim 310. Additionally, because of the closed system nature of the pod assembly 302, the risk of tampering and contamination can be reduced. Also, the chance of unwanted physical exposure to the pre-vapor formulation within the pod assembly 302 (e.g., via a leak) can be reduced. Furthermore, the pod assembly 302 can be structured so as to prevent refilling.

Figure 16:
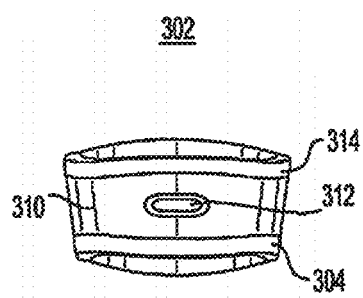
FIG. 16 is a top view of the pod assembly of FIG. 15.

FIG. 16 is a top view of the pod assembly of FIG. 15. Referring to FIG. 16, the second cap 314 is wider than the first cap 304. As a result, the pod trim 310 may slant outwards from the first cap 304 to the second cap 314. However, it should be understood that other configurations are possible depending on the design of the pod assembly 302.

Figure 17:
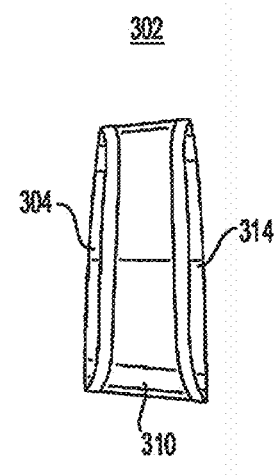
FIG. 17 is a side view of the pod assembly of FIG. 15.

FIG. 17 is a side view of the pod assembly of FIG. 15. Referring to FIG. 17, the second cap 314 is longer than the first cap 304. As a result, the pod trim 310 may slant outwards from the first cap 304 to the second cap 314. As a result, the pod assembly 302 may be inserted in a dispensing body such that the side corresponding to the first cap 304 is received in the through-hole first. In an example embodiment, the pod assembly 302 may be inserted in the through-hole 114 of the dispensing body 104 and/or the through-hole 214 of the dispensing body 204.

Figure 18:
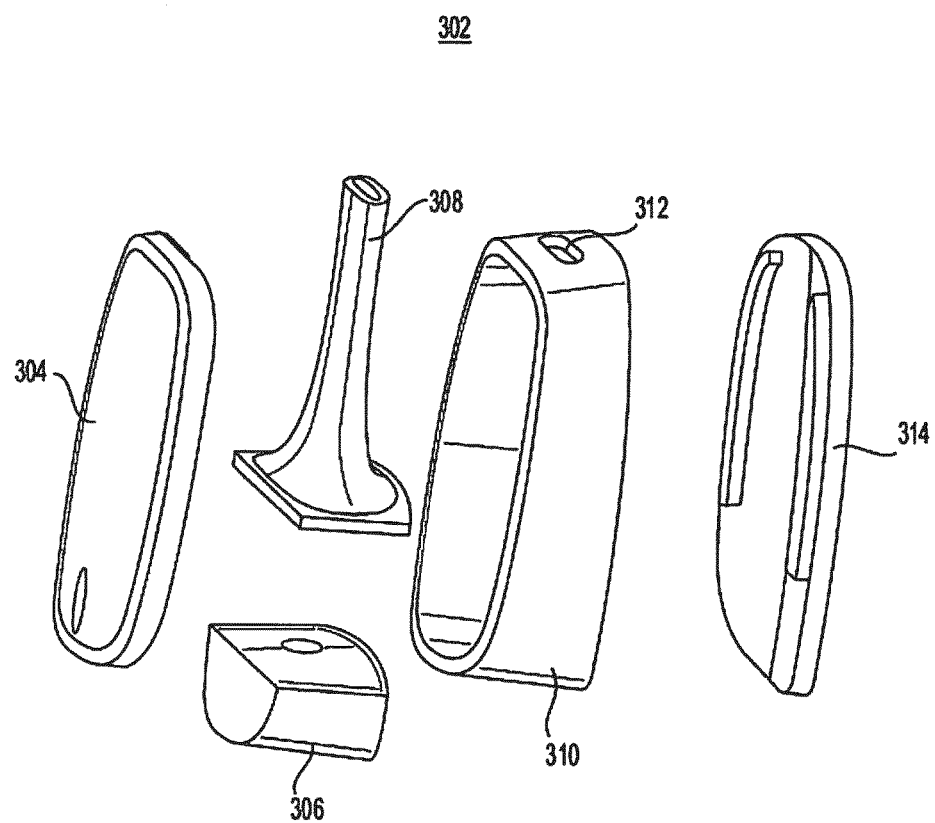
FIG. 18 is an exploded view of the pod assembly of FIG. 15.

FIG. 18 is an exploded view of the pod assembly of FIG. 15. Referring to FIG. 18, the internal space of the pod assembly 302 may be divided into a plurality of compartments by virtue of the elements therein. For instance, the tapered outlet of the vapor channel 308 may be aligned with the channel outlet 312, and the space bounded by the first cap 304, the vapor channel 308, the pod trim 310, and the second cap 314 may be regarded as the pre-vapor formulation compartment. Additionally, the bounded space under the vapor channel 308 may be regarded as the device compartment. For instance, the device compartment may include the vaporizer 306. One benefit of including the vaporizer 306 in the pod assembly 302 is that the vaporizer 306 will only be used for the amount of pre-vapor formulation contained within the pre-vapor formulation compartment and, thus, will not be overused.

Figure 19:
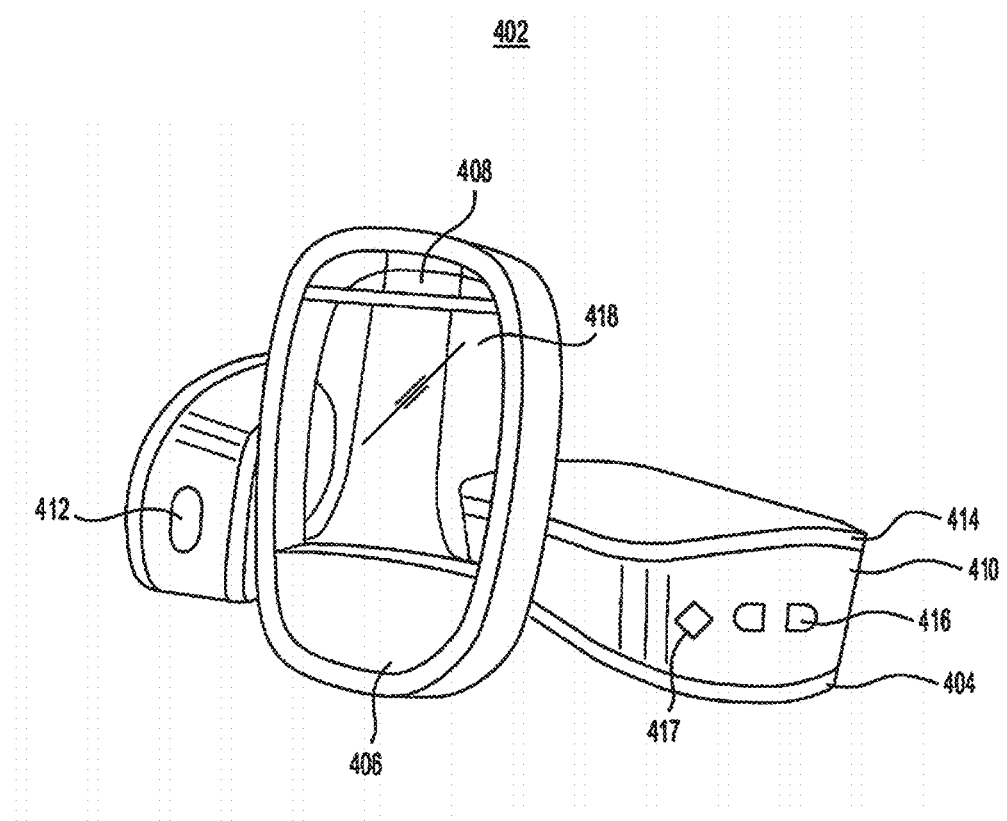
FIG. 19 a perspective view of several pod assemblies according to an example embodiment.

FIG. 19 a perspective view of several pod assemblies according to an example embodiment. Referring to FIG. 19, each of the pod assemblies 402 includes a pod trim 410 arranged between a first cap 404 and a second cap 414. The vapor channel 408 is aligned with the channel outlet 412 and arranged above the vaporizer 406. The pod assembly 402 is sealed to hold a pre-vapor formulation 418 therein and to preclude tampering therewith. The pre-vapor formulation compartment of the pod assembly 402 is configured to hold the pre-vapor formulation 418, and the device compartment includes the vaporizer 406.

In further detail, the pod assembly 402 for an e-vapor apparatus may include a pre-vapor formulation compartment configured to hold a pre-vapor formulation 418 therein. A device compartment is configured to be in fluidic communication with the pre-vapor formulation compartment. The device compartment includes a vaporizer 406. A vapor channel 408 extends from the device compartment and traverses the pre-vapor formulation compartment.

The pod assembly 402 is configured for insertion into a dispensing body. As a result, the dimensions of the pod assembly 402 may correspond to the dimensions of the through-hole (e.g., 114) of the dispensing body (e.g., 104). The vapor channel 408 may be between the mouthpiece (e.g., 108) and the device compartment when the pod assembly 402 is inserted into the through-hole of the dispensing body.

An attachment structure (e.g., male/female member arrangement, magnetic arrangement) may be provided on at least one of the side wall (e.g., 116) of the through-hole (e.g., 114) and a side surface of the pod assembly 402. The attachment structure may be configured to engage and hold the pod assembly 402 upon insertion into the through-hole of the dispensing body. In addition, the channel outlet 412 may be utilized to secure the pod assembly 402 within the through-hole of the dispensing body. For instance, the dispensing body may be provided with a retractable vapor connector that is configured to insert into the channel outlet 412 so as to secure the pod assembly 402 while also supplementing the vapor path from the channel outlet 412 to the vapor passage (e.g., 106) of the dispensing body (e.g., 104). The vapor connector may also be a rounded structure and/or spring-loaded to facilitate its retraction (e.g., via spring compression) and protraction (e.g., via spring decompression).

In an example embodiment, the pre-vapor formulation compartment of the pod assembly 402 may surround the vapor channel 408. For instance, the vapor channel 408 may pass through a center of the pre-vapor formulation compartment, although example embodiments are not limited thereto.

Alternatively, instead of the vapor channel 408 shown in FIG. 19, a vapor channel may be in a form of a pathway that is arranged along at least one sidewall of the pre-vapor formulation compartment. For example, a vapor channel may be provided in a form of a pathway that spans between the first cap 404 and the second cap 414 while extending along one or both sides of an inner surface of the pod trim 410. As a result, the pathway may have a thin, rectangular cross-section, although example embodiments are not limited thereto. When the pathway is arranged along two sidewalls of the pre-vapor formulation compartment (e.g., both inner sidewalls of the pod trim 410), the pathway along each sidewall may be configured to converge at a position (e.g., channel outlet 412) that is aligned with the vapor passage (e.g., 106) of the dispensing body (e.g., 104) when the pod assembly 402 is received in the through-hole 114.

In another instance, the vapor channel may be in a form of a conduit that is arranged in at least one corner of the pre-vapor formulation compartment. Such a corner may be at the interface of the first cap 404 and/or the second cap 414 with the inner surface of the pod trim 410. As a result, the conduit may have a triangular cross-section, although example embodiments are not limited thereto. When the conduit is arranged in at least two corners (e.g., front corners, rear corners, diagonal corners, side corners) of the pre-vapor formulation compartment, the conduit in each corner may be configured to converge at a position (e.g., channel outlet 412) that is aligned with the vapor passage (e.g., 106) of the dispensing body (e.g., 104) when the pod assembly 402 is received in the through-hole 114.

The pre-vapor formulation compartment and the device compartment may be at opposite ends of the pod assembly 402. The device compartment may include a memory device. The memory device may be coded with an electronic identity to permit at least one of an authentication of the pod assembly 402 and a pairing of operating parameters specific to a type of the pod assembly 402 when the pod assembly 402 is inserted into the through-hole of the dispensing body (e.g., smart calibration). The electronic identity may help prevent counterfeiting. The operating parameters may help optimize a vaping experience without placing a burden on the adult vaper to determine the proper settings. In an example embodiment, the level of pre-vapor formulation in the pod assembly 402 may be tracked. Additionally, the activation of the pod assembly 402 may be restricted once its intended usage life has been exceeded. Thus, the pod assembly 402 (and 302) may be regarded as a smart pod.

A side surface of the pod assembly 402 includes at least one electrical contact 416 and/or data connection 417 (e.g., two or three electrical contacts and/or data connections). The dispensing body may be configured to perform at least one of supply power to and communicate with the pod assembly 402 via the at least one electrical contact 416. The at least one electrical contact 416 may be provided at an end of the pod assembly 402 corresponding to the device compartment. Because of its smart capability, the pod assembly 402 may communicate with dispensing body and/or another electronic device (e.g., smart phone). As a result, usage patterns and other information (e.g., flavor intensity, throat feel, puff count) may be generated, stored, transferred, and/or displayed. The smart capability, connecting features, and other related aspects of the pod assembly, dispensing body, and overall e-vapor apparatus are additionally discussed in U.S. Application No. 62/151,160, U.S. Application No. 62/151,179, and U.S. Application No. 62/151,248, the entire contents of each of which are incorporated herein by reference.

Figure 20:
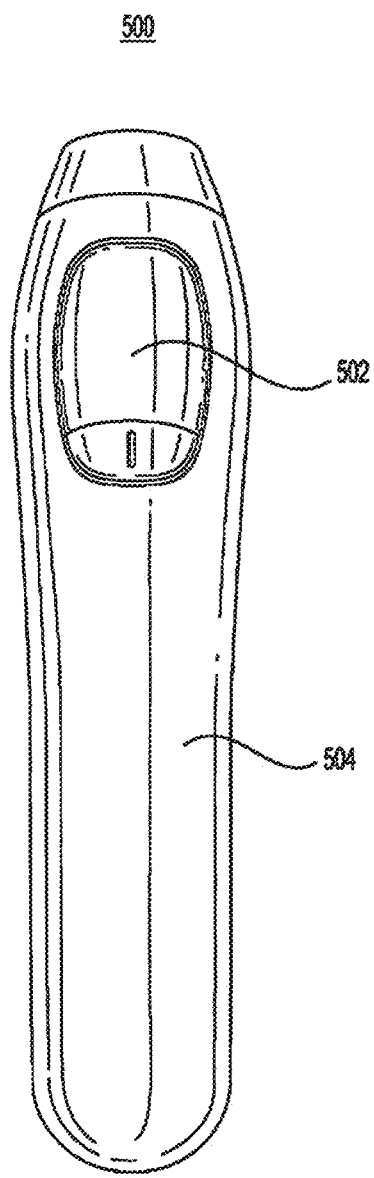
FIG. 20 is a view of an e-vapor apparatus with a pod assembly inserted in a dispensing body according to an example embodiment.

FIG. 20 is a view of an e-vapor apparatus with a pod assembly inserted in a dispensing body according to an example embodiment. Referring to FIG. 20, an e-vapor apparatus 500 includes a pod assembly 502 (e.g., smart pod) that is inserted within a dispensing body 504. The pod assembly 502 may be as previously described in connection with the pod assembly 302 and the pod assembly 402. As a result, the pod assembly 502 may be a hassle-free and leak-free part that can be replaced with relative ease when the pre-vapor formulation therein runs low/out or when another flavor is desired.

Figure 21:
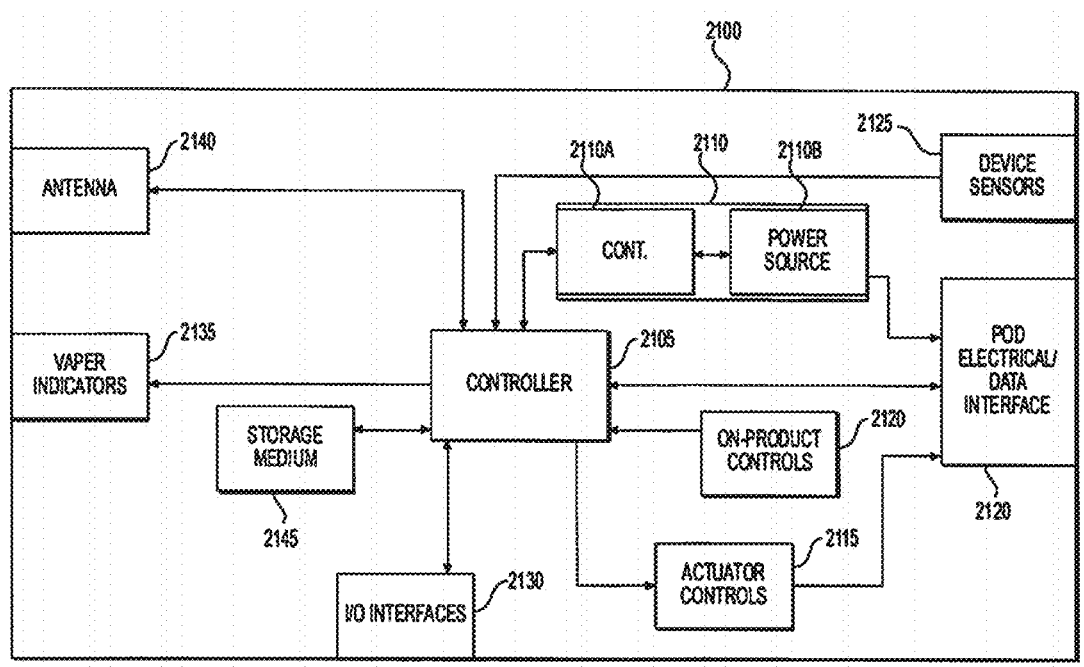
FIG. 21 illustrates a device system diagram of a dispensing body according to an example embodiment.

FIG. 21 illustrates a device system of a dispensing body according to an example embodiment. A device system 2100 may be the system within the dispensing body 104 and the dispensing body 204.

The device system 2100 includes a controller 2105, a power supply 2110, actuator controls 2115, a pod electrical/data interface 2120, device sensors 2125, input/output (I/O) interfaces 2130, vaper indicators 2135, at least one antenna 2140 and a storage medium 2145. The device system 2100 is not limited to the features shown in FIG. 21. For example, the device system 2100 may include additional elements. However, for the sake of brevity, the additional elements are not described.

The controller 2105 may be hardware, firmware, hardware executing software or any combination thereof. When the controller 2105 is hardware, such existing hardware may include one or more Central Processing Units (CPUs), digital signal processors (DSPs), application-specific-integrated-circuits (ASICs), field programmable gate arrays (FPGAs) computers or the like configured as special purpose machines to perform the functions of the processor. As stated above, CPUs, DSPs, ASICs and FPGAs may generally be referred to as processing devices.

In the event where the controller 2105 is a processor executing software, the controller 2105 is configured as a special purpose machine to execute the software, stored in the storage medium 2145, to perform the functions of the at least one of the controller 2105.

As disclosed herein, the term "storage medium", "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Referring to FIG. 21, the controller 2105 communicates with the power supply 2110, the actuator control 2115, the pod electrical/data interface 2120, the device sensors 2125, the input/output (I/O) interfaces 2130, the vaper indicators 2135, the at least one antenna 2140.

The controller 2105 communicates with the CC-NVM in the pod through the pod electrical/data interface 2120. More specifically, the controller 2105 may utilize encryption to authenticate the pod. As will be described, the controller 2105 communicates with the CC-NVM package to authenticate the pod. More specifically, the non-volatile memory is encoded during manufacture with product and other information for authentication.

The memory device may be coded with an electronic identity to permit at least one of an authentication of the pod and a pairing of operating parameters specific to a type of the pod when the pod assembly 402 is inserted into the throughhole of the dispensing body. In addition to authenticating based on an electronic identity of the pod, the controller 2105 may authorize use of the pod based on an expiration date of the stored pre-vapor formulation and/or heater encoded into the non-volatile memory of the CC-NVM. If the controller determines that the expiration date encoded into the non-volatile memory has passed, the controller may not authorize use of the pod and disable the e-vaping device.

The controller 2105 (or storage medium 2145) stores key material and proprietary algorithm software for the encryption. For example, encryption algorithms rely on the use of random numbers. The security of these algorithms depends on how truly random these numbers are. These numbers are usually pre-generated and coded into the processor or memory devices. Example embodiments may increase the randomness of the numbers used for the encryption by using the puffing parameters e.g. puff durations, intervals between puffs, or combinations of them, to generate numbers that are more random and more varying from individual to individual than pre-generated random numbers. All communications between the controller 2105 and the pod may be encrypted.

Moreover, the pod can be used to as a general pay-load carrier for other information such as software patches for the e-vaping device. Since encryption is used in all the communications between the pod and the controller 2105, such information is more secure and the e-vaping device is less prone to being installed with malwares or viruses. Use of the CC-NVM as an information carrier such as data and software updates allows the e-vaping device to be updated with software without it being connected to the Internet and for the adult vaper to go through a downloading process as with most other consumer electronics devices requiring periodic software updates.

The controller 2105 may also include a cryptographic accelerator to allow resources of the controller 2105 to perform functions other than the encoding and decoding involved with the authentication. The controller 2105 may also include other security features such as preventing unauthorized use of communication channels and preventing unauthorized access to data if a pod or vaper is not authenticated.

In addition to a cryptographic accelerator, the controller 2105 may include other hardware accelerators. For example, the controller 2105 may include a floating point unit (FPU), a separate DSP core, digital filters and Fast Fourier Transform (FFT) modules.

The controller 2105 operates a real time operating system (RTOS), controls the system 2100 and may be updated through communicating with the CC-NVM or when the system 2100 is connected with other devices (e.g., a smart phone) through the I/O interfaces 2130 and/or the antenna 2140. The I/O interfaces 2130 and the antenna 2140 allow the system 2100 to connect to various external devices such as smart phones, tablets, and PCs. For example, the I/O interfaces 2130 may include a micro-USB connector. The micro-USB connector may be used by the system 2100 to charge the power source 2110$b$.

The controller 2105 may include on-board RAM and flash memory to store and execute code including analytics, diagnostics and software upgrades. As an alternative, the storage medium 2145 may store the code. Additionally, in another example embodiment, the storage medium 2145 may be on-board the controller 2105.

The controller 2105 may further include on-board clock, reset and power management modules to reduce an area covered by a PCB in the dispensing body.

The device sensors 2125 may include a number of sensor transducers that provide measurement information to the controller 2105. The device sensors 2125 may include a power supply temperature sensor, an external pod temperature sensor, a current sensor for the heater, power supply current sensor, air flow sensor and an accelerometer to monitor movement and orientation. The power supply temperature sensor and external pod temperature sensor may be a thermistor or thermocouple and the current sensor for the heater and power supply current sensor may be a resistive based sensor or another type of sensor configured to measure current. The air flow sensor may be a microelectromechanical system (MEMS) flow sensor or another type of sensor configured to measure air flow.

The data generated from the number of sensor transducers may be sampled at a sample rate appropriate to the parameter being measured using a discrete, multi-channel analog-to-digital converter (ADC).

The controller 2105 may adapt heater profiles for a pre-vapor formulation and other profiles based on the measurement information received from the controller 2105. For the sake of convenience, these are generally referred to as vaping or vapor profiles.

The heater profile identifies the power profile to be supplied to the heater during the few seconds when a negative pressure is applied to the e-vapor device. An example of a heater profile may be the delivery of maximum power to the heater when a negative pressure is initially applied, but then after a second or so immediately reduce the power to half-way or a quarter-way or so.

The modulation of electrical power is usually implemented using pulse wave modulation instead of flipping an on/off switch such that the power is either full on or off.

In addition, a heater profile can also be modified by the extent to which the adult vaper applies negative pressure to the e-vaping device. The use of the MEMS flow sensor allows puff strength to be measured and used as feedback to the controller 2105 to adjust the power delivered to the heater of the pod, which may be referred to as heating or energy delivery.

When the controller 2105 recognizes the pod currently installed (e.g., via SKU), the controller 2105 matches an associated heating profile that is designed for that particular pod. The controller 2105 and the storage medium 2145 will store data and algorithms that allow the generation of heating profiles for all SKUs. The adult vapers may also adjust heating profiles to suit their preferences.

As shown in FIG. 21, the controller 2105 sends data to and receives data from the power supply 2110. The power supply 2110 includes a power source 2110b and a power controller 2110a to manage the power output by the power source 2110b.

The power source 2110b may be a Lithium-ion battery or one of its variants, for example a Lithium-ion polymer battery. Alternatively, the power source 2110b may be a Nickel-metal hydride battery, a Nickel cadmium battery, a Lithium-manganese battery, a Lithium-cobalt battery or a fuel cell. Alternatively, the power source 2110b may be rechargeable and include circuitry allowing the battery to be chargeable by an external charging device. In that case, the circuitry, when charged, provides power for a desired (or alternatively a pre-determined) number of puffs, after which the circuitry must be re-connected to an external charging device.

The power controller 2110a provides commands to the power source 2110b based on instructions from the controller 2105. For example, the power supply 2110 may receive a command from the controller 2105 to provide power to the pod (through the electrical/data interface 2120) when the pod is authenticated and the adult vaper activates the system 2100 (e.g., by activating a switch such as a toggle button, capacitive sensor, IR sensor). When the pod is not authenticated, the controller 2105 may either send no command to the power supply 2110 or send an instruction to the power supply 2110 to not provide power. In another example embodiment, the controller 2105 may disable all operations of the system 2100 if the pod is not authenticated.

In addition to supplying power to the pod, the power supply 2110 also supplies power to the controller 2105. Moreover, the power controller 2110a may provide feedback to the controller 2105 indicating performance of the power source 2110b.

The controller 2105 sends data to and receives data from the at least one antenna 2140. The at least one antenna 2140 may include a Near Field Communication (NFC) modem and a Bluetooth Low Energy (LE) modem and/or other modems for other wireless technologies (e.g., Wi-Fi). In an example embodiment, the communications stacks are in the modems, but the modems are controlled by the controller 2105. The Bluetooth LE modem is used for data and control communications with an application on an external device (e.g., smart phone). The NFC modem may be used for pairing of the e-vaping device to the application and retrieval of diagnostic information. Moreover, the NFC modem may be used to provide location information (for an adult vaper to find the e-vaping device) or authentication during a purchase.

As described above, the system 2100 may generate and adjust various profiles for vaping. The controller 2105 uses the power supply 2110 and the actuator controls 2115 to regulate the profile for the adult vaper.

The actuator controls 2115 include passive and active actuators to regulate a desired vapor profile. For example, the dispensing body may include an inlet channel within a mouthpiece. The actuator controls 2115 may control the inlet channel based on commands from the controller 2105 associated with the desired vapor profile.

Moreover, the actuator controls 2115 are used to energize the heater in conjunction with the power supply 2110. More specifically, the actuator controls 2115 are configured to generate a drive waveform associated with the desired vaping profile. As described above, each possible profile is associated with a drive waveform. Upon receiving a command from the controller 2105 indicating the desired vaping profile, the actuator controls 2115 may produce the associated modulating waveform for the power supply 2110.

The controller 2105 supplies information to the vaper indicators 2135 to indicate statuses and occurring operations to the adult vaper. The vaper indicators 2135 include a power indicator (e.g., LED) that may be activated when the controller 2105 senses a button press by the adult vaper. The vaper indicators 2135 may also include a vibrator, speaker, an indicator for current state of a vaper-controlled vaping parameter (e.g., vapor volume) and other feedback mechanisms.

Furthermore, the system 2100 may include a number of on-product controls 2150 that provide commands from an adult vaper to the controller 2105. The on-product controls 2150 include an on-off button which may be a toggle button, capacitive sensor or IR sensor, for example. The on-product controls 2150 may further include a vaping control button (if the adult vaper desires to override the buttonless vaping feature to energize the heater), a hard reset button, a touch based slider control (for controlling setting of a vaping parameter such as puff volume), a vaping control button to activate the slider control and a mechanical adjustment for an air inlet.

Once a pod is authenticated, the controller 2105 operates the power supply 2110, the actuator controls 2115, vaper indicators 2135 and antenna 2140 in accordance with an adult vaper using the e-vaping device and the information stored by the CC-NVM on the pod. Moreover, the controller 2105 may include logging functions and be able to implement algorithms to calibrate the e-vaping device. The logging functions are executed by the controller 2105 to record usage data as well any unexpected events or faults. The recorded usage data may be used for diagnostics and analytics. The controller 2105 may calibrate the e-vaping device using buttonless vaping, a vaper configuration and the stored information on the CC-NVM including puff sensing, pre-vapor formulation level, and pre-vapor formulation composition. For example, the controller 2105 may command the power supply 2110 to supply power to the heater in the pod based on a vaping profile associated with the pre-vapor formulation composition in the pod. Alternatively, a vaping profile may be encoded in the CC-NVM and utilized by the controller 2105.

Figure 22:
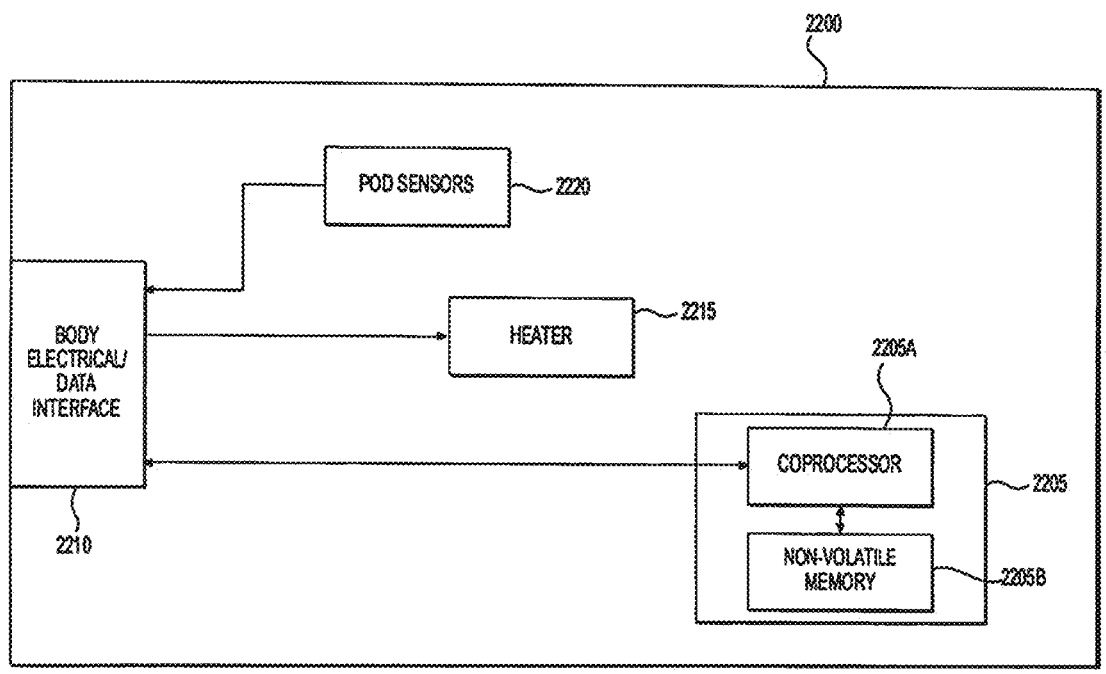
FIG. 22 illustrates a pod system diagram of a dispensing body according to an example embodiment.

FIG. 22 illustrates a pod system diagram of a dispensing body according to an example embodiment. A pod system 2200 may be within the pod assembly 502, the pod assembly 302 and the pod assembly 402.

As shown in FIG. 22, the pod system 2200 includes a CC-NVM 2205, a body electrical/date interface 2210, a heater 2215 and pod sensors 2220. The pod system 2200 communicates with the device system 2100 through the body electrical/data interface 2210 and the pod electrical/data interface 2120. The body electrical/data interface 2210 may correspond to the electrical contacts 416 and data connection 417 connected within the pod assembly 402, shown in FIG. 19, for example. Thus, the CC-NVM 2205 is coupled to the data connection 417 and the electrical contacts 416.

The CC-NVM 2205 includes a cryptographic coprocessor 2205a and a non-volatile memory 2205b. The controller 2105 may access the information stored on the non-volatile memory 2205b for the purposes of authentication and operating the pod by communicating with the cryptographic coprocessor 2205a.

The non-volatile memory 2205b may be coded with an electronic identity to permit at least one of an authentication of the pod and a pairing of operating parameters specific to a type of the pod when the pod assembly is inserted into the through-hole of the dispensing body. In addition to authenticating based on an electronic identity of the pod, the controller 2105 may authorize use of the pod based on an expiration date of the stored pre-vapor formulation and/or heater encoded into the non-volatile memory 2205b of the CC-NVM. If the controller determines that the expiration date encoded into the non-volatile memory non-volatile memory 2205b has passed, the controller may not authorize use of the pod and disable the e-vaping device.

Moreover, the non-volatile memory 2205b may store information such as a stock keeping unit (SKU) of the pre-vapor formulation in the pre-vapor formulation compartment (including pre-vapor formulation composition), software patches for the system 2100, product usage information such as puff count, puff duration, and pre-vapor formulation level. The non-volatile memory 2205b may store operating parameters specific to the type of the pod and the pre-vapor formulation composition. For example, the non-volatile memory 2205b may store the electrical and mechanical design of the pod for use by the controller 2105 to determine commands corresponding to a desired vaping profile.

The pre-vapor formulation level in the pod may be determined in one of two ways, for example. In one example embodiment, one of the pod sensors 2220 directly measures the pre-vapor formulation level in the pod.

In another example embodiment, the non-volatile memory 2205b stores the number of puffs taken from the pod and the controller 2105 uses the number of puffs taken as a proxy to the amount of pre-vapor formulation that is vaporized.

The controller 2105 and/or the storage medium 2145 may store pre-vapor formulation calibration data that identifies an operating point for the pre-vapor formulation composition. The pre-vapor formulation calibration data include data describing how flow rate changes with a remaining pre-vapor formulation level or how volatility changes with an age of the pre-vapor formulation and may be used for calibration by the controller 2105. The pre-vapor formulation calibration data may be stored by the controller 2105 and/or the storage medium 2145 in a table format. The pre-vapor formulation calibration data allows the controller 2105 to equate the number of puffs taken to the amount of pre-vapor formulation that is vaporized.

The controller 2105 writes the pre-vapor formulation level and number of puffs taken back to the non-volatile memory 2205b in the pod so if the pod is removed from the dispensing body and later on re-installed, an accurate pre-vapor formulation level of the pod will still be known by the controller 2105.

The operating parameters (e.g., power supply, power duration, air channel control) are referred to as a vaping profile. Moreover, the non-volatile memory 2205b may record information communicated by the controller 2105. The non-volatile memory 2205b may retain the recorded information even when the dispensing body becomes disconnected from the pod.

In an example embodiment, the non-volatile memory 2205b may be a programmable read only memory.

The heater 2215 is actuated by the controller 2105 and transfers heat to the pre-vapor formulation in accordance with the commanded profile (volume, temperature (based on power profile) and flavor) from the controller 2105.

The heater 2215 may be a wire coil surrounding a wick, a mesh, a surface or made out of a ceramic material for example. Examples of suitable electrically resistive materials include titanium, zirconium, tantalum and metals from the platinum group. Examples of suitable metal alloys include stainless steel, nickel-, cobalt-, chromium-, aluminum-titanium-zirconium-, hafnium-, niobium-, molybdenum-, tantalum-, tungsten-, tin-, gallium-, manganese- and iron-containing alloys, and super-alloys based on nickel, iron, cobalt, stainless steel. For example, the heater may be formed of nickel aluminides, a material with a layer of alumina on the surface, iron aluminides and other composite materials, the electrically resistive material may optionally be embedded in, encapsulated or coated with an insulating material or vice-versa, depending on the kinetics of energy transfer and the external physicochemical properties required. In one embodiment, the heater 2215 comprises at least one material selected from the group consisting of stainless steel, copper, copper alloys, nickel-chromium alloys, superalloys and combinations thereof. In an embodiment, the heater 2215 is formed of nickel-chromium alloys or iron-chromium alloys. In one embodiment, the heater 2215 can be a ceramic heater having an electrically resistive layer on an outside surface thereof.

In another embodiment, the heater 2215 may be constructed of an iron-aluminide (e.g., FeAl or $Fe_3Al$), such as those described in commonly owned U.S. Pat. No. 5,595,706 to Sikka, et al., filed Dec. 29, 1994, or nickel aluminides (e.g., $Ni_3Al$), the entire contents of which are hereby incorporate by reference.

The heater 2215 may determine an amount of pre-vapor formulation to heat based on feedback from the pod sensors or the controller 2105. The flow of pre-vapor formulation may be regulated by a micro-capillary or wicking action. Moreover, the controller 2105 may send commands to the heater 2215 to adjust an air inlet to the heater 2215.

The pod sensor 2220 may include a heater temperature sensor, pre-vapor formulation flow rate monitor and air flow monitor. The heater temperature sensor may be a thermistor or thermocouple and the flow rate sensing may be performed by the pod system 2200 using electrostatic interference or an in-liquid rotator. The air flow sensor may be a microelectromechanical system (MEMS) flow sensor or another type of sensor configured to measure air flow.

The data generated from the pod sensors 2220 may be sampled at a sample rate appropriate to the parameter being measured using a discrete, multi-channel analog-to-digital converter (ADC).

Figure 23:
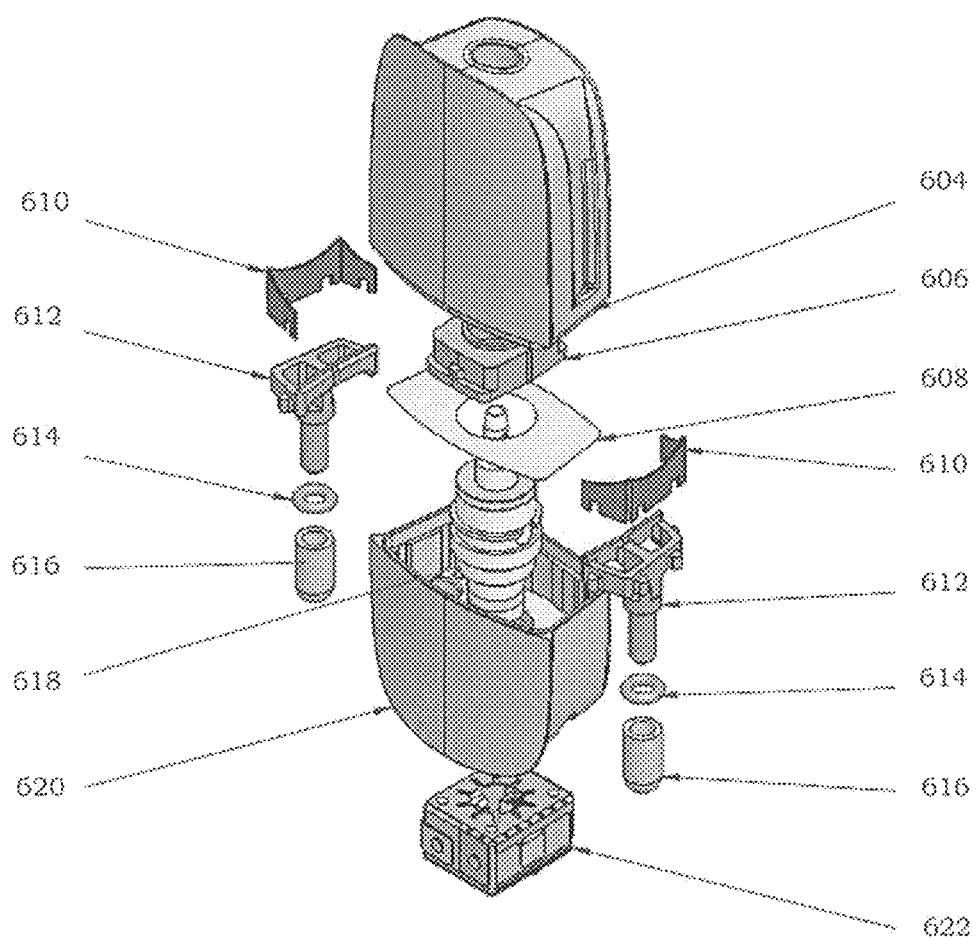
FIG. 23 is an exploded view of another pod assembly of an e-vapor apparatus according to an example embodiment.

FIG. 23 is an exploded view of another pod assembly of an e-vapor apparatus according to an example embodiment. Referring to FIG. 23, a pin piercing mechanism is employed to actuate the pod assembly 602 prior to use. In an example embodiment, the pod assembly 602 includes an upper pod case 604, a seal 606, a foil 608, a blade 610, a pin 612, an O-ring 614, a cap 616, a vaporizer 618, a lower pod case 620, and an electrical connector assembly 622 (electrical connector).

The pod assembly 602 is configured to store a pre-vapor formulation within an internal, hermetically-sealed compartment so as to isolate the pre-vapor formulation from other internal elements until the pod assembly 602 is actuated for vaping. Because the pre-vapor formulation is isolated from the environment as well as the internal elements of the pod assembly 602 that may potentially react with the pre-vapor formulation, the possibility of adverse effects to the shelf-life and/or sensorial characteristics (e.g., flavor) of the pre-vapor formulation may be reduced or prevented. The internal, hermetically-sealed compartment within the pod assembly 602 may be a reservoir defined by the upper pod case 604, the seal 606, and the foil 608.

The blade 610 is configured to be mounted or attached to an upper portion of the pin 612. The mounting or attachment may be achieved via a snap-fit connection, a friction fit connection, an adhesive, or other suitable coupling technique. The top of the blade 610 may have one or more curved or concave edges that taper upward to a pointed tip. As shown in FIG. 23, two blades 610 and two corresponding pins 612 may be provided on opposite sides of the vaporizer 618, although example embodiments are not limited thereto. Each of the blades 610 may have two pointed tips with a concave edge therebetween and a curved edge adjacent to each pointed tip. The radii of curvature of the concave edge and the curved edges may be the same, while their arc lengths may differ. The blade 610 may be formed of a sheet metal (e.g., stainless steel) that is cut or otherwise shaped to have the desired profile and bent to its final form. In another instance, the blade 610 may be formed of plastic if the foil 608 is relatively thin.

The lower portion of the pin 612 is configured to extend through a bottom section of the lower pod case 620. The distal end of the lower portion of the pin 612 is also provided with the O-ring 614 and covered with the cap 616. The O-ring 614 may be formed of silicone. The electrical connector assembly 622 is configured to provide an electrical connection between the pod assembly 602 and a power supply (e.g., battery) so as to power the vaporizer 618 when the pod assembly 602 is inserted in a dispensing body for vaping.

Figure 24A:
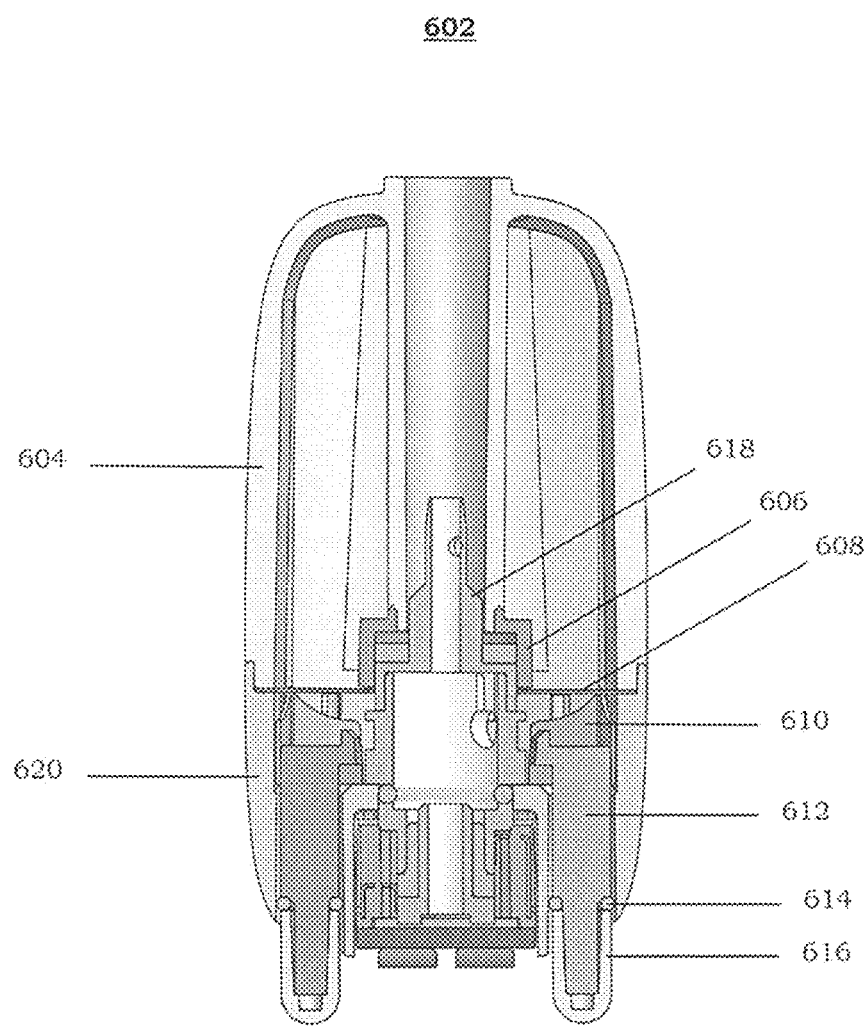
FIG. 24A is a cross-sectional view of the pod assembly of FIG. 23 when assembled and before actuation.
Figure 24B:
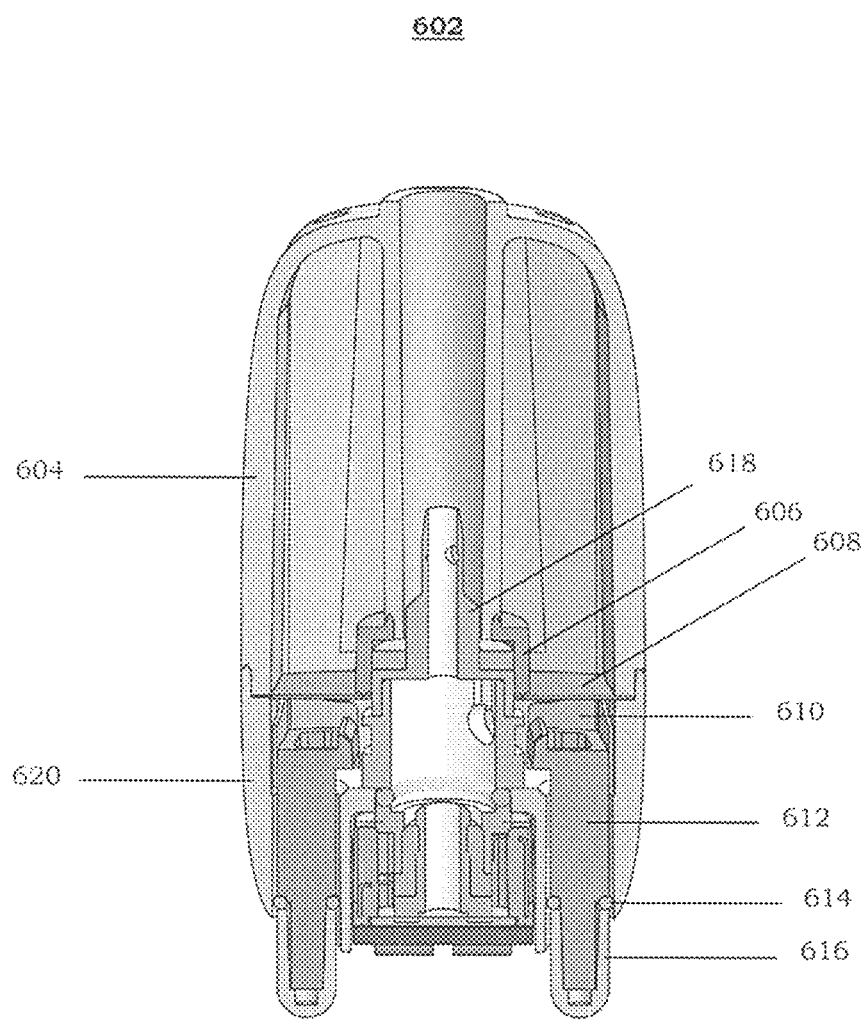
FIG. 24B is a tilted cross-sectional view of the pod assembly of FIG. 23 when assembled and before actuation.

FIG. 24A is a cross-sectional view of the pod assembly of FIG. 23 when assembled and before actuation. FIG. 24B is a tilted cross-sectional view of the pod assembly of FIG. 23 when assembled and before actuation. Referring to FIG. 24A and FIG. 24B, the upper pod case 604 is configured to engage with the lower pod case 620. The engagement may be via a snap-fit connection, a friction fit connection, an adhesive, or other suitable coupling technique. The upper portion of the vaporizer 618 is configured to extend into a vapor channel within the upper pod case 604, while the lower portion of the vaporizer 618 is configured to engage with the electrical connector assembly 622. The sector of the pod assembly 602 above the foil 608 for containing the pre-vapor formulation may be regarded as the pre-vapor formulation compartment, while the sector of the pod assembly 602 below the foil 608 may be regarded as the device compartment. The device compartment may be further regarded as being divided into at least a heating section and an electronics section. In an example embodiment, the vaporizer 618 is regarded as being part of the heating section.

Before the actuation of the pod assembly 602, the blade 610 and the pin 612 will be below the foil 608 and, thus, below the reservoir containing the pre-vapor formulation. As a result, the distal end of the lower portion of the pin 612 (which is covered by the cap 616) will protrude from the bottom section of the lower pod case 620. The foil 608 is designed to be strong enough to remain intact during the normal movement and/or handling of the pod assembly 602 so as to avoid being prematurely/inadvertently breached. For instance, the foil 608 may be a coated foil (e.g., aluminum-backed Tritan).

Figure 25A:
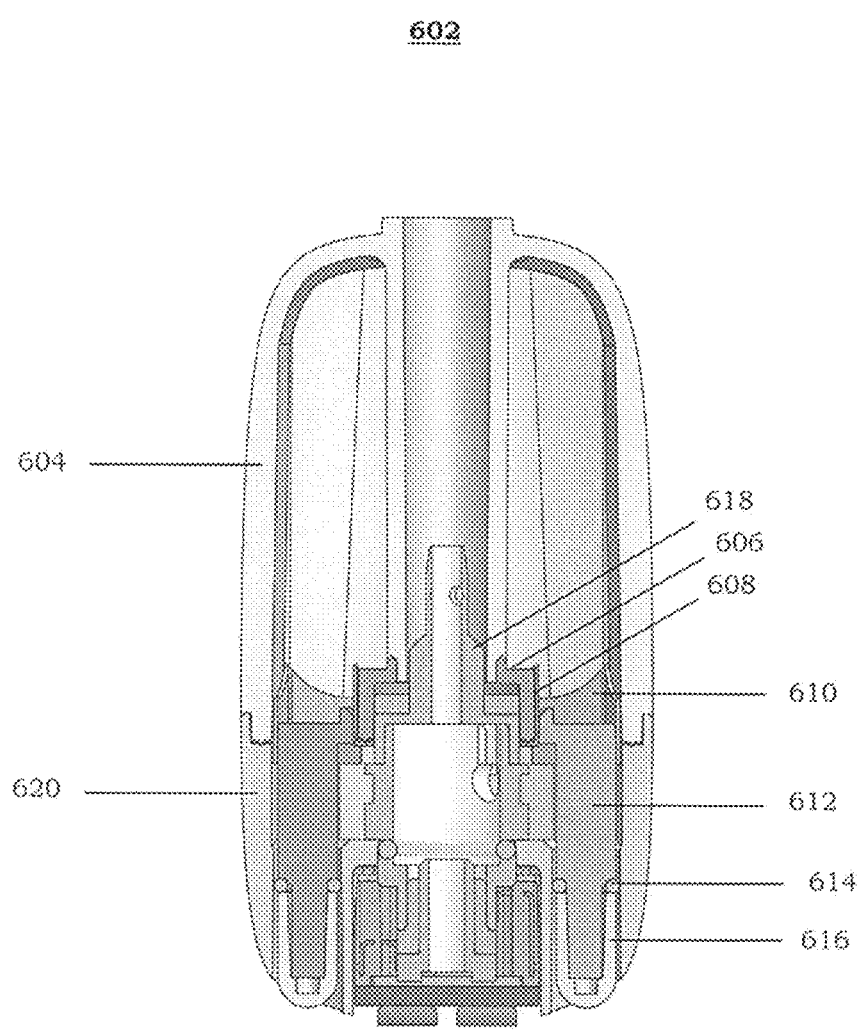
FIG. 25A is a cross-sectional view of the pod assembly of FIG. 23 when assembled and after actuation.
Figure 25B:
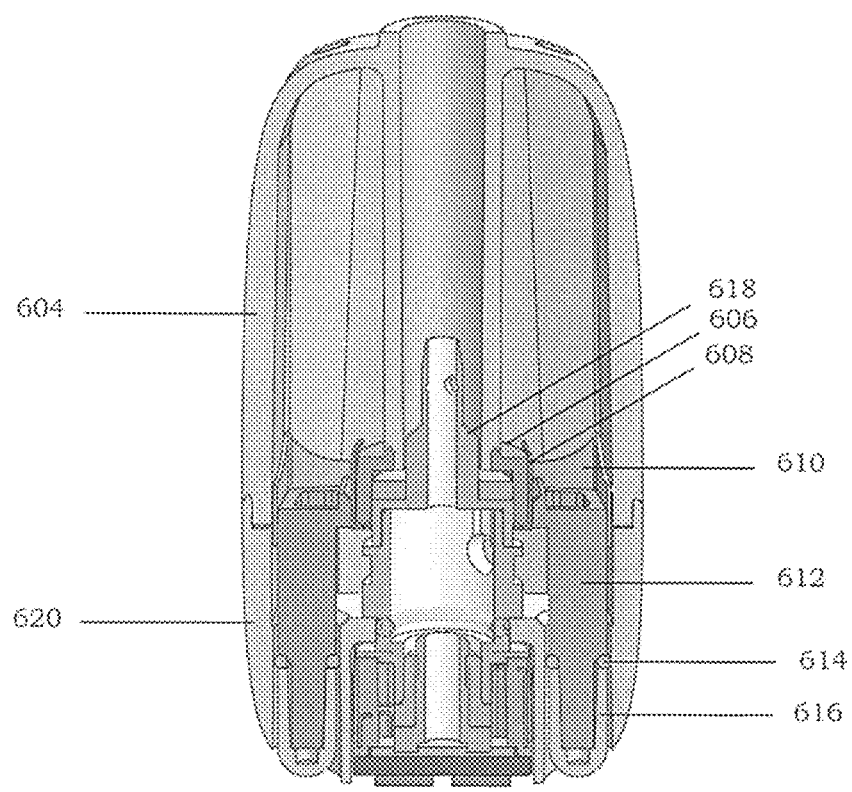
FIG. 25B is a tilted cross-sectional view of the pod assembly of FIG. 23 when assembled and after actuation.
Figure 25C:
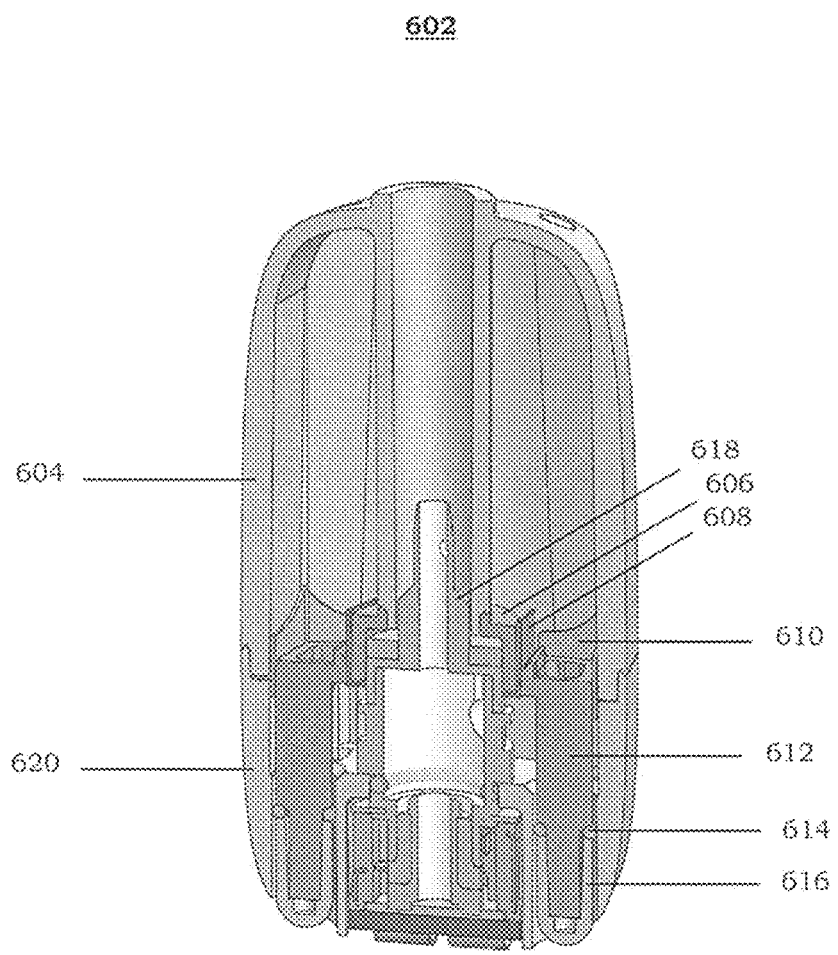
FIG. 25C is a tilted and angled cross-sectional view of the pod assembly of FIG. 23 when assembled and after actuation.

FIG. 25A is a cross-sectional view of the pod assembly of FIG. 23 when assembled and after actuation. FIG. 25B is a tilted cross-sectional view of the pod assembly of FIG. 23 when assembled and after actuation. FIG. 25C is a tilted and angled cross-sectional view of the pod assembly of FIG. 23 when assembled and after actuation. Referring to FIG. 25A, FIG. 25B, and FIG. 25C, the pin 612 is pushed inward to actuate the pod assembly 602. The pin 612 may be pushed inward manually by an adult vaper prior to inserting the actuated pod assembly 602 into the dispensing body. In such an instance, the pod assembly 602 may be configured to produce an audible sound (e.g., click) to indicate to the adult vaper that the pin 612 has been pushed sufficiently inward for actuation. The pod assembly 602 may also be configured such that the pin 612 is locked in place so as to not slide outward after actuation. Alternatively, the pin 612 may be pushed inward concurrently with the insertion of the pod assembly 602 by engaging features on the dispensing body. In another non-limiting embodiment, the unactuated pod assembly 602 may be first inserted into the dispensing body and then the pin 612 may be subsequently pushed inward mechanically by the dispensing body to actuate the pod assembly 602. The action to push the pin 612 may be performed automatically by the dispensing body or initiated by a button pressed by an adult vaper. Furthermore, the pod assembly 602 may be configured such that the pin 612 does not protrude from the bottom section of the lower pod case 620 when in the unactuated state.

During the actuation of the pod assembly 602, the inward movement of the pin 612 will cause the blade 610 to pierce and cut the foil 608 so as to release the pre-vapor formulation from the reservoir. In an example embodiment, the pin 612 includes an inner lip that folds the foil 608 back after (or concurrently with) the piercing and cutting by the blade 610. In such an instance, the foil 608 may be pushed against the seal 606 by the inner lip of the pin 612. The pin 612 may also include a groove or channel extending from its upper portion (which is adjacent to the blade 610) and extending downward along a part of its length. The pod assembly 602 may be configured such that the lower terminus of the groove or channel will be aligned with an opening in the vaporizer 618 when the pin 612 is pushed inward during actuation. The groove or channel in the pin 612 may facilitate the flow of the pre-vapor formulation into the opening of the vaporizer 618. The vaporizer 618 includes a heater that will be in thermal and/or fluidic communication with the pre-vapor formulation after the pod assembly 602 is actuated. The heater within the vaporizer 618 is not particularly limited and may include a number of suitable types and configurations. During vaping, the vaporizer 618 will be activated to heat the pre-vapor formulation to generate a vapor that will be drawn through the vapor channel of the upper pod case 604 when a negative pressure is applied to the mouthpiece of the e-vapor device.

Figure 26:
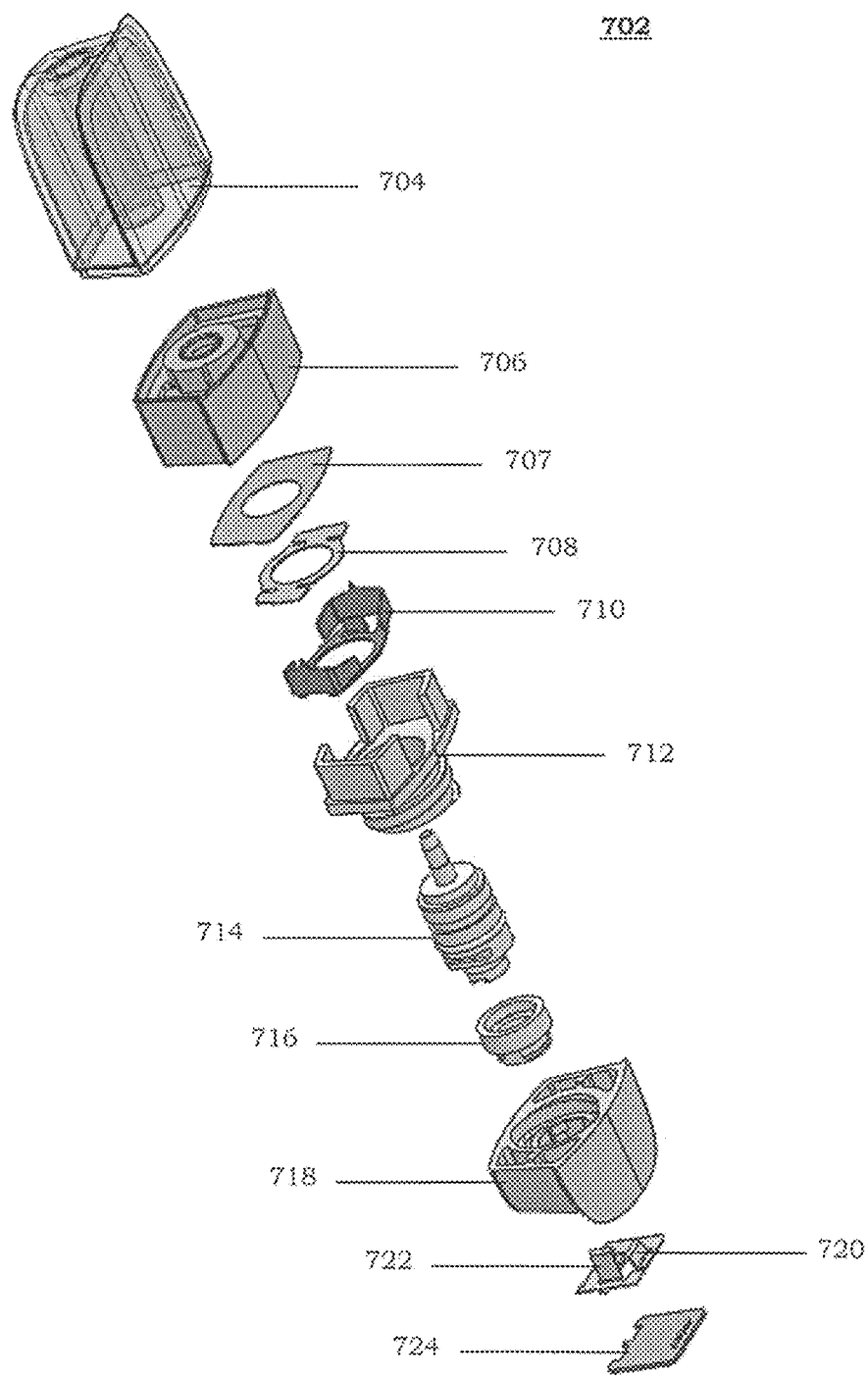
FIG. 26 is an exploded view of another pod assembly of an e-vapor apparatus according to an example embodiment.

FIG. 26 is an exploded view of another pod assembly of an e-vapor apparatus according to an example embodiment. Referring to FIG. 26, a twist piercing mechanism is employed to actuate the pod assembly 702 prior to use. In an example embodiment, the pod assembly 702 includes an upper pod case 704, a cap 706, a foil 707, a foil folder 708, a blade 710, a screw 712, a vaporizer 714, an insert 716, a lower pod case 718, a first contact 720, a second contact 722, and a printed circuit board (PCB) 724.

The pod assembly 702 is configured to store a pre-vapor formulation within an internal, hermetically-sealed compartment so as to isolate the pre-vapor formulation from other internal elements until the pod assembly 702 is actuated for vaping. Because the pre-vapor formulation is isolated from the environment as well as the internal elements of the pod assembly 702 that may potentially react with the pre-vapor formulation, the possibility of adverse effects to the shelf-life and/or sensorial characteristics (e.g., flavor) of the pre-vapor formulation may be reduced or prevented. The internal, hermetically-sealed compartment within the pod assembly 702 may be a reservoir defined by the upper pod case 704, the cap 706, and the foil 707. The foil folder 708 may be formed of stainless steel. In an example embodiment, the pod assembly 702 may be configured such that the foil 707 is integrated with the cap 706 for sealing the reservoir. Alternatively, the foil 707 may be included in the pod assembly 702 as a structure that is separate from the cap 706.

The blade 710 may be configured to sit within the upper portion of the screw 712. The size and shape of the blade 710 may be such that a lateral or rotational motion within the upper portion of the screw 712 is restricted or precluded while an axial displacement is permitted. In FIG. 26, the blade 710 is shown as having two pointed tips on opposite sides of a central opening. However, it should be understood that example embodiments are not limited thereto. The blade 710 may be formed of stainless steel. Alternatively, the blade 710 may be formed of plastic if the foil 707 is relatively thin.

The upper portion of the vaporizer 714 is configured to extend through the central openings of the screw 712, the blade 710, the foil folder 708, and the cap 706 and into a vapor channel within the upper pod case 704. The insert 716 is configured to receive the lower portion of the vaporizer 714, and both the insert 716 and the lower portion of the vaporizer 714 are seated in the lower pod case 718. The insert 716 may be formed of brass. The lower portion of the screw 712 is configured to be threadedly engaged with the lower pod case 718. The first contact 720 and the second contact 722 may be formed of beryllium copper (BeCu).

Figure 27A:
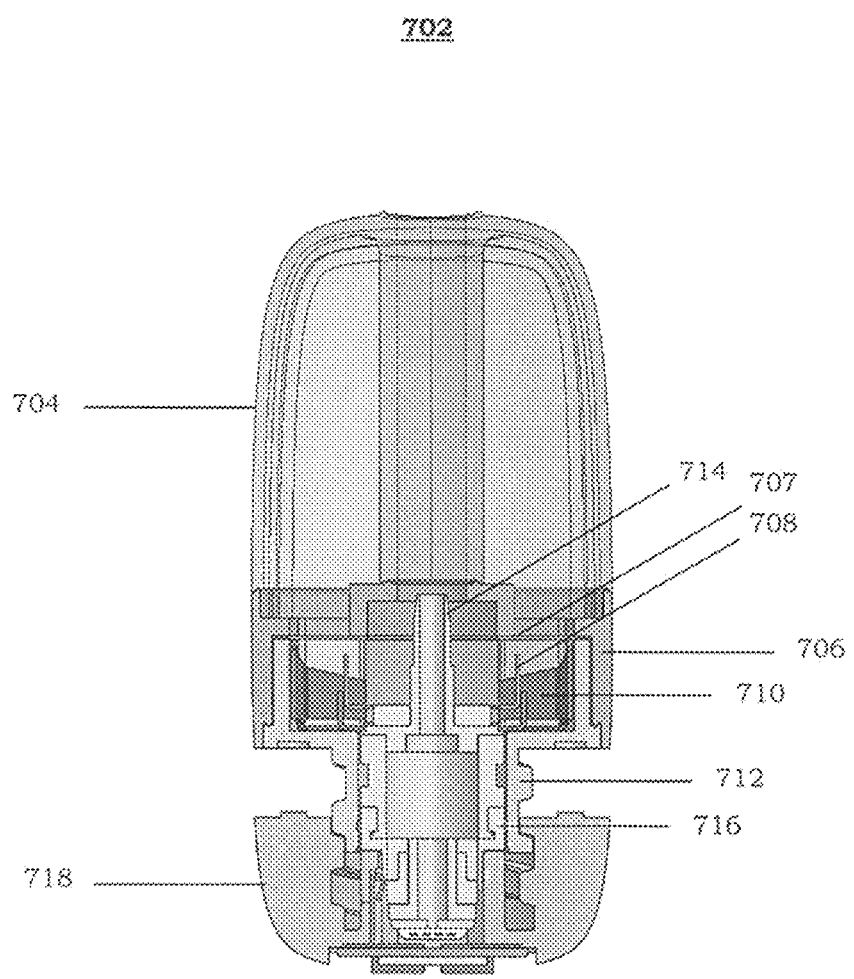
FIG. 27A is a cross-sectional view of the pod assembly of FIG. 26 when assembled and before actuation.
Figure 27B:
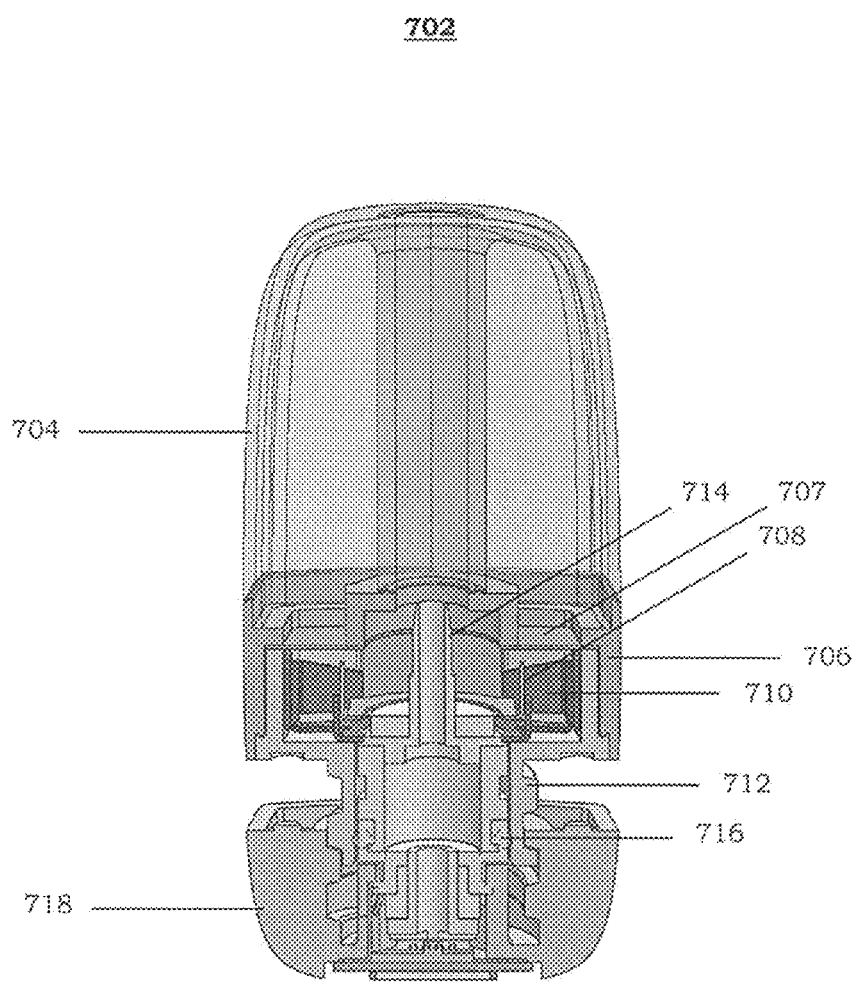
FIG. 27B is a tilted cross-sectional view of the pod assembly of FIG. 26 when assembled and before actuation.

FIG. 27A is a cross-sectional view of the pod assembly of FIG. 26 when assembled and before actuation. FIG. 27B is a tilted cross-sectional view of the pod assembly of FIG. 26 when assembled and before actuation. Referring to FIG. 27A and FIG. 27B, the upper pod case 704 is configured to connect with the cap 706, and the upper portion of the screw 712 is configured to be inserted into the cap 706. In an example embodiment, the outer side wall of the screw 712 interfaces with the inner side wall of the cap 706. The lower portion of the screw 712 is threadedly engaged with the lower pod case 718, and the threaded engagement is configured such that the lower pod case 718 can be rotated in a first direction to move upwards towards the upper pod case 704. The threaded engagement can also be configured so as to prevent the lower pod case 718 from becoming unscrewed or detached from the screw 712 when rotated in an opposite second direction.

Before actuation, the blade 710 may rest on the upper recessed surface of the screw 712 and/or a supporting ridge of the vaporizer 714. The vaporizer 714 is configured to move with the lower pod case 718. As a result, a rotation of the lower pod case 718 to move the lower pod case 718 will also move the vaporizer 714 (and the insert 716) with it. The size and shape of the central opening in the screw 712 is configured to permit the vaporizer 714 to move reversibly therein.

Figure 28A:
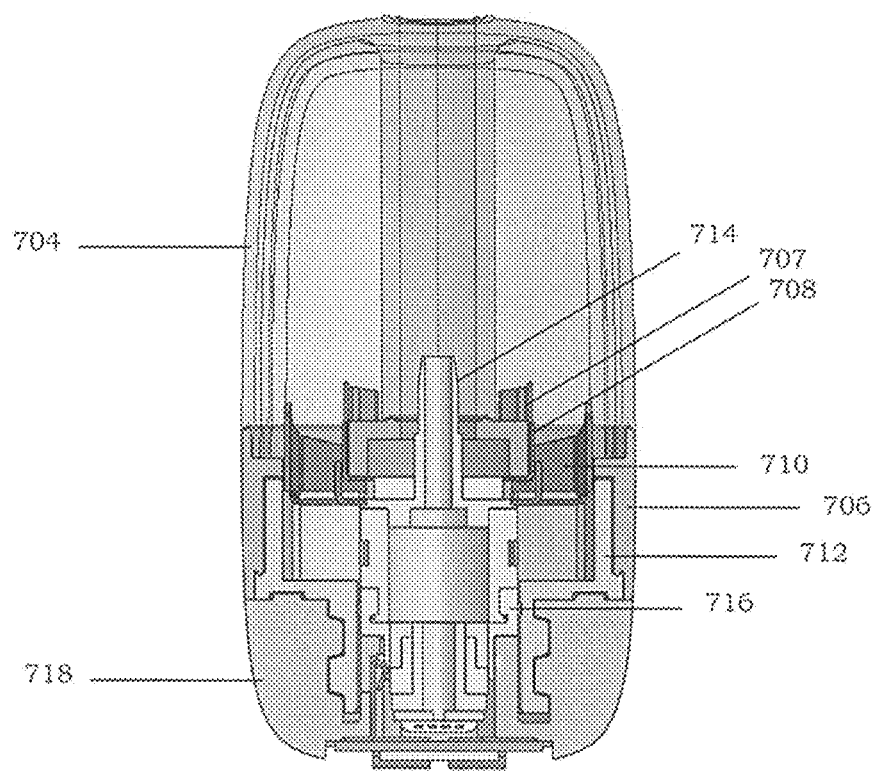
FIG. 28A is a cross-sectional view of the pod assembly of FIG. 26 when assembled and after actuation.
Figure 28B:
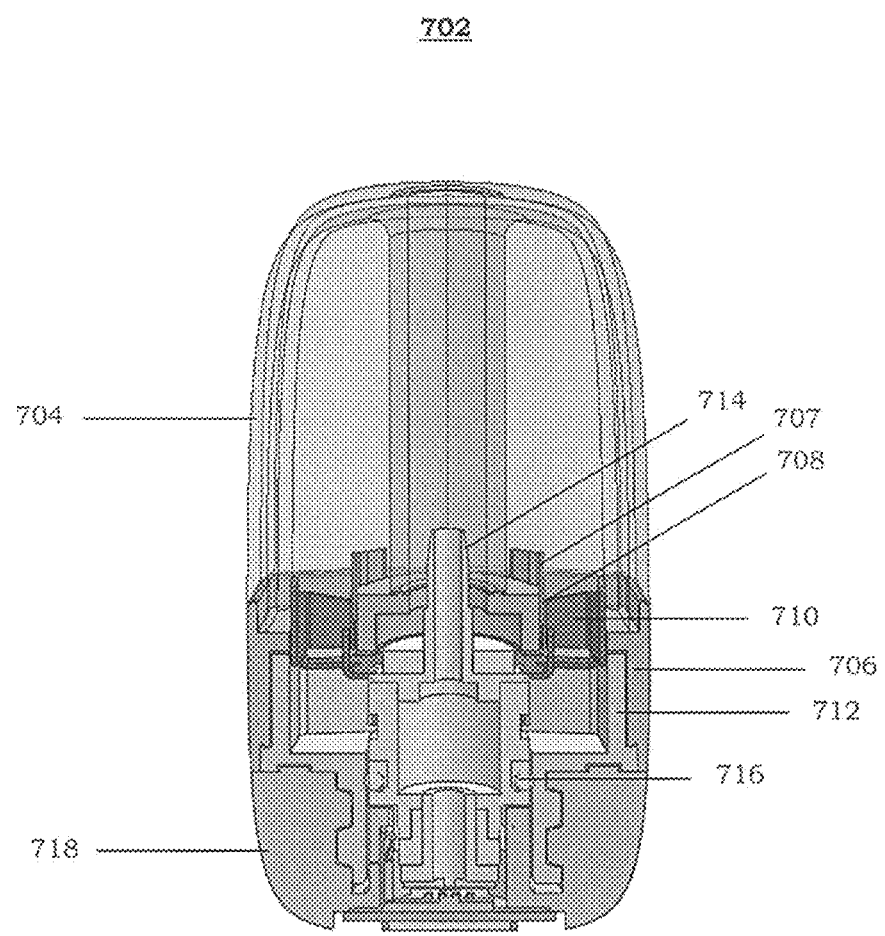
FIG. 28B is a tilted cross-sectional view of the pod assembly of FIG. 26 when assembled and after actuation.
Figure 28C:
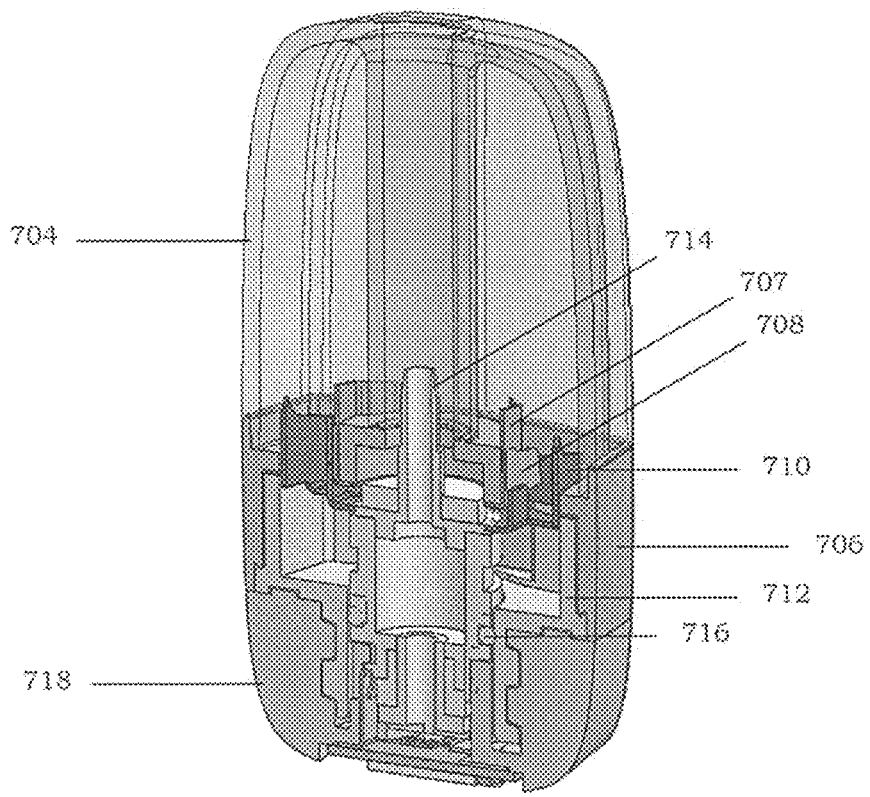
FIG. 28C is a tilted and angled cross-sectional view of the pod assembly of FIG. 26 when assembled and after actuation.

FIG. 28A is a cross-sectional view of the pod assembly of FIG. 26 when assembled and after actuation. FIG. 28B is a tilted cross-sectional view of the pod assembly of FIG. 26 when assembled and after actuation. FIG. 28C is a tilted and angled cross-sectional view of the pod assembly of FIG. 26 when assembled and after actuation. Referring to FIG. 28A, FIG. 28B, and FIG. 28C, the pod assembly 702 may be actuated by holding the upper pod case 704 and rotating the lower pod case 718 relative to the upper pod case 704. In such an instance, as a result of the rotation, the lower pod case 718 will travel along the threads of the screw 712 until the lower pod case 718 is adjacent to or abutting the undersurface of the screw 712. Conversely, the pod assembly 702 may be actuated by holding the lower pod case 718 and rotating the upper pod case 704 relative to the lower pod case 718. In such an instance, as a result of the rotation, the screw 712 will move into the lower pod case 718 until the undersurface of the screw 712 is adjacent to or abutting the lower pod case 718.

The pod assembly 702 may be configured such that the lower pod case 718 (or, conversely, the upper pod case 704) undergoes a 360 degree rotation to actuate the pod assembly 702. However, it should be understood that example embodiments are not limited thereto. For instance, the pod assembly 702 may be designed such that only a 180 degree rotation is needed for actuation. After the requisite rotation is performed, the upper pod case 704 will be adjacent to and aligned with the lower pod case 718 so as to result in a pod assembly 702 with relatively continuous front, side, and rear surfaces and, thus, a more compact form than the longer, unactuated state shown in FIG. 27A and FIG. 27B.

When the lower pod case 718 (or, conversely, the upper pod case 704) is rotated, the vaporizer 714 will move into the upper pod case 704. As a result, the blade 710 will also be axially displaced so as to be pushed into the upper pod case 704 by the supporting ridge of the vaporizer 714 so as to pierce and cut the foil 707, thereby releasing the pre-vapor formulation from the reservoir. The inner side wall of the upper portion of the screw 712 (within which the blade 710 is seated) may act as a guide for the axial displacement of the blade 710. The upper portion of the vaporizer 714 is configured to extend into the vapor channel within the upper pod case 704 in a snug fit manner.

In an example embodiment, the pod assembly 702 may be configured to produce an audible sound (e.g., click) to indicate to the adult vaper that the requisite amount of rotation has occurred and, thus, that the blade 710 has been pushed sufficiently inward for actuation. The pod assembly 702 may also be configured such that the upper pod case 704 and the lower pod case 718 will be locked in place so as to not rotate after actuation. For instance, the audible sound may coincide with the locking feature wherein both may be effectuated by a snap-fit type structure that is configured for rotational engagement.

During the actuation of the pod assembly 702, the blade 710 will pierce and cut the foil 707 so as to release the pre-vapor formulation from the reservoir. Additionally, the foil folder 708 folds the foil 707 back after (or concurrently with) the piercing and cutting by the blade 710. Furthermore, because of the snug fit of the vaporizer 714 with the upper pod case 704, the possibility of the released pre-vapor formulation leaking from the reservoir directly into the vapor channel after actuation can be reduced or prevented. The pod assembly 702 may be configured such that the pre-vapor formulation released from the reservoir will flow into the vaporizer 714 via a side opening. The vaporizer 714 includes a heater that will be in thermal and/or fluidic communication with the pre-vapor formulation after the pod assembly 702 is actuated. During vaping, the vaporizer 714 will be activated to heat the pre-vapor formulation to generate a vapor that will be drawn through the vapor channel of the upper pod case 704 when a negative pressure is applied to the mouthpiece of the e-vapor device.

Figure 29:
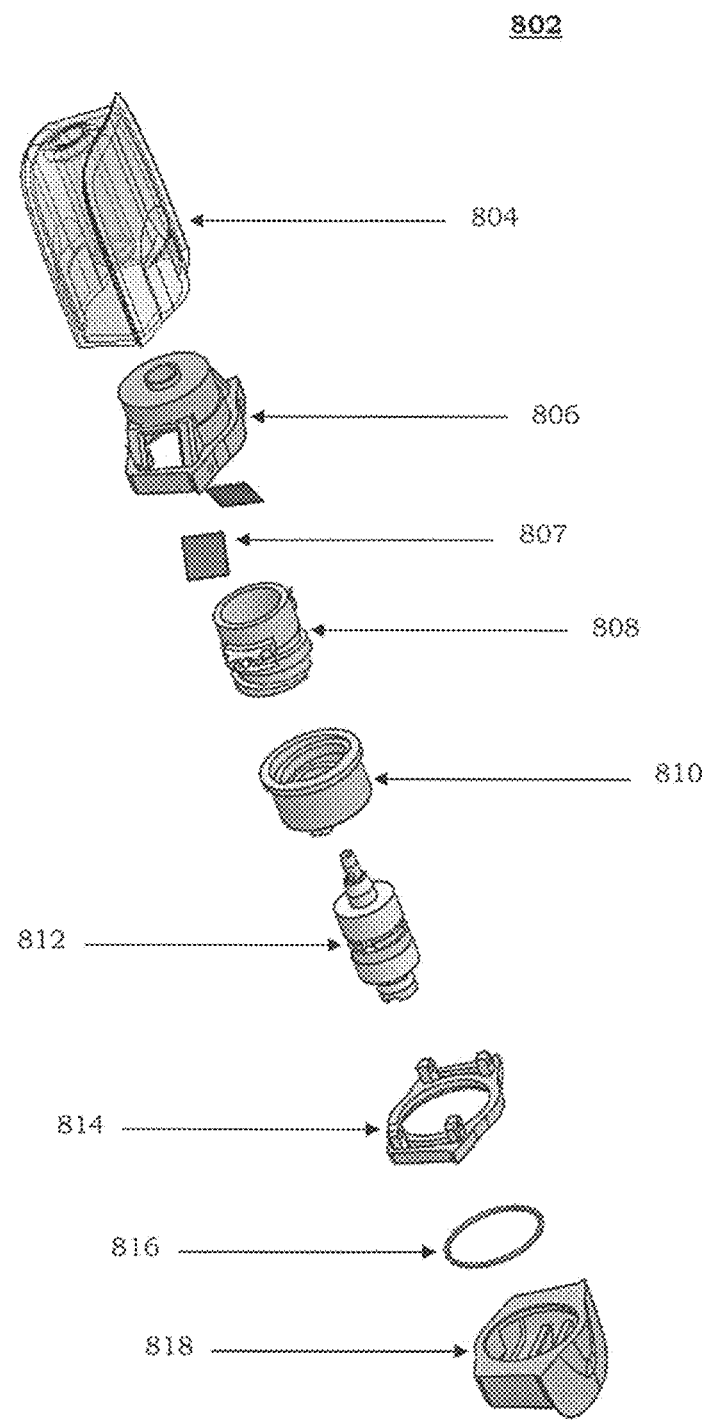
FIG. 29 is an exploded view of another pod assembly of an e-vapor apparatus according to an example embodiment.

FIG. 29 is an exploded view of another pod assembly of an e-vapor apparatus according to an example embodiment. Referring to FIG. 29, a twist and return mechanism is employed to actuate the pod assembly 802 prior to use. In an example embodiment, the pod assembly 802 includes an upper pod case 804, a foil holder 806, a foil 807, a cutter 808, a screw 810, a vaporizer 812, a brace 814, an O-ring 816, and a lower pod case 818.

The pod assembly 802 is configured to store a pre-vapor formulation within an internal, hermetically-sealed compartment so as to isolate the pre-vapor formulation from other internal elements until the pod assembly 802 is actuated for vaping. Because the pre-vapor formulation is isolated from the environment as well as the internal elements of the pod assembly 802 that may potentially react with the pre-vapor formulation, the possibility of adverse effects to the shelf-life and/or sensorial characteristics (e.g., flavor) of the pre-vapor formulation may be reduced or prevented. The internal, hermetically-sealed compartment within the pod assembly 802 may be a reservoir defined by the upper pod case 804, the foil holder 806, and the foil 807. In an example embodiment, the pod assembly 802 may be configured such that the foil 807 is integrated with the foil holder 806 for sealing the reservoir. Alternatively, the foil 807 may be included in the pod assembly 802 as a structure that is separate from the foil holder 806.

The cutter 808 is configured to pierce and cut the foil 807 in order to release the pre-vapor formulation from the reservoir during the actuation of the pod assembly 802. To effectuate the piercing and cutting, the cutter 808 may include a puncturing/perforating element that protrudes from its outer side wall. For instance, the puncturing/perforating element may be a pair of serrated structures arranged on opposite sides of the outer side wall of the cutter 808. However, it should be understood that example embodiments are not limited thereto.

When assembled, the vaporizer 812 will extend through the cutter 808, and both structures will be between the foil holder 806 and the screw 810. The cutter 808 is configured to be threadedly engaged with the screw 810. The brace 814 is configured to engage with a bottom section of the foil holder 806. The engagement of the brace 814 with the foil holder 806 may be achieved via a snap-fit connection, a friction fit connection, an adhesive, or other suitable coupling technique. The outer diameter of the rim of the screw 810 is larger than the diameter of the opening in the brace 814 due to the presence of the lip on the screw 810. The screw 810 is configured to be seated within the lower pod case 818. In an example embodiment, the bottom of the screw 810 includes a ridge structure that is received within a groove in the lower pod case 818. As a result, a rotation of the lower pod case 818 will cause the screw 810 to also rotate. In this regard, in addition to the groove/ridge structure example above, it should be understood that other suitable options may be employed to engage the screw 810 with the lower pod case 818.

Figure 30A:
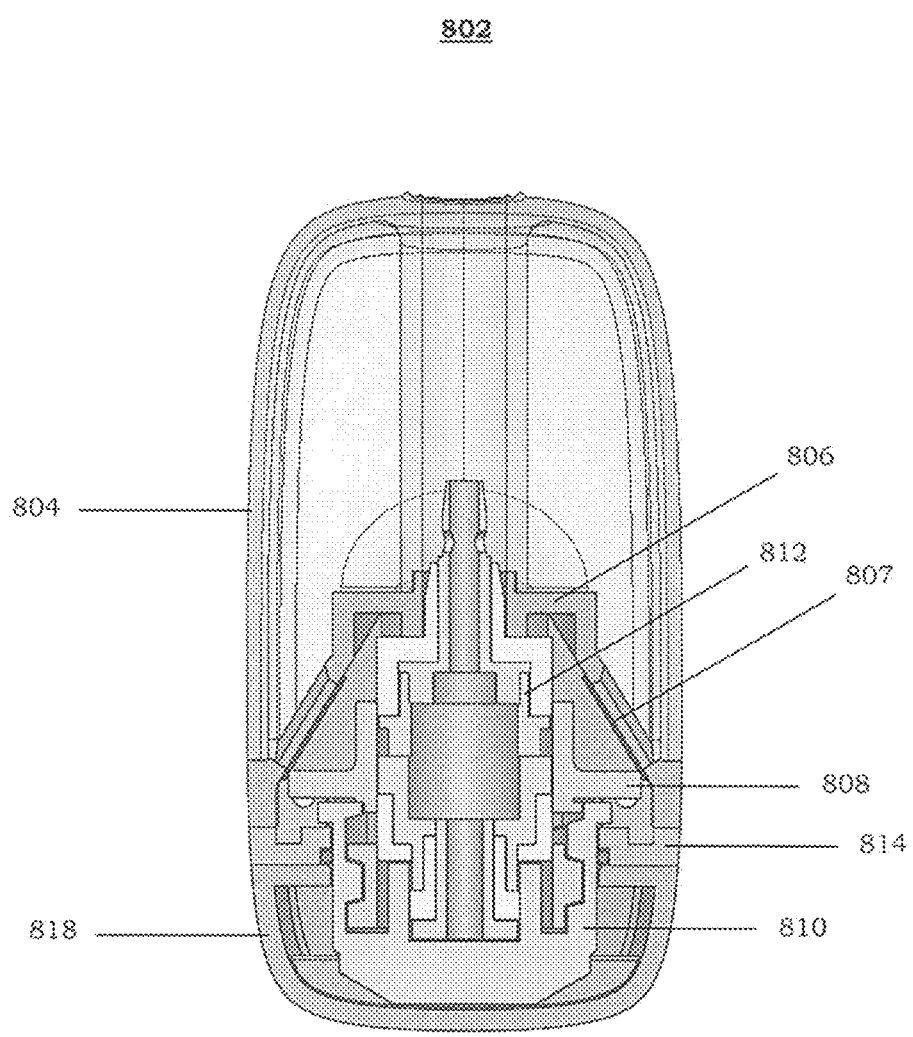
FIG. 30A is a cross-sectional view of the pod assembly of FIG. 29 when assembled and before actuation.
Figure 30B:
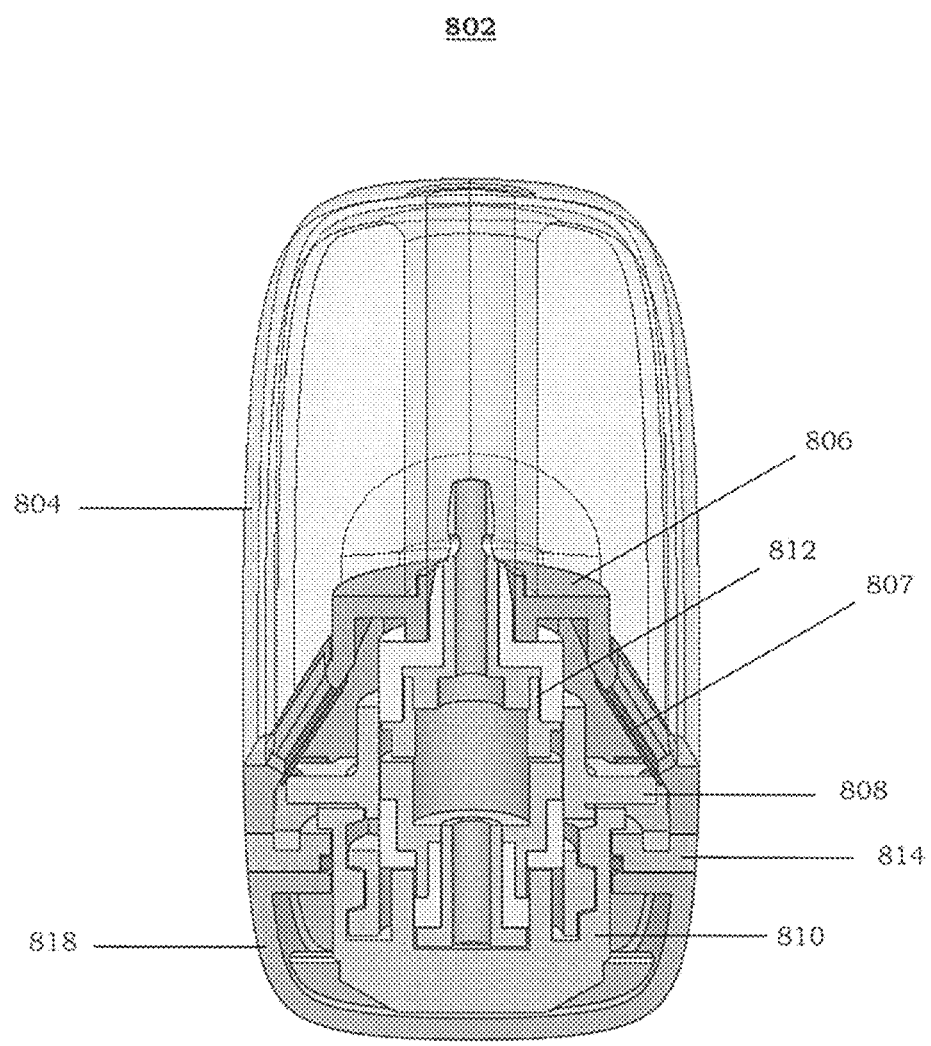
FIG. 30B is a tilted cross-sectional view of the pod assembly of FIG. 29 when assembled and before actuation.
Figure 30C:
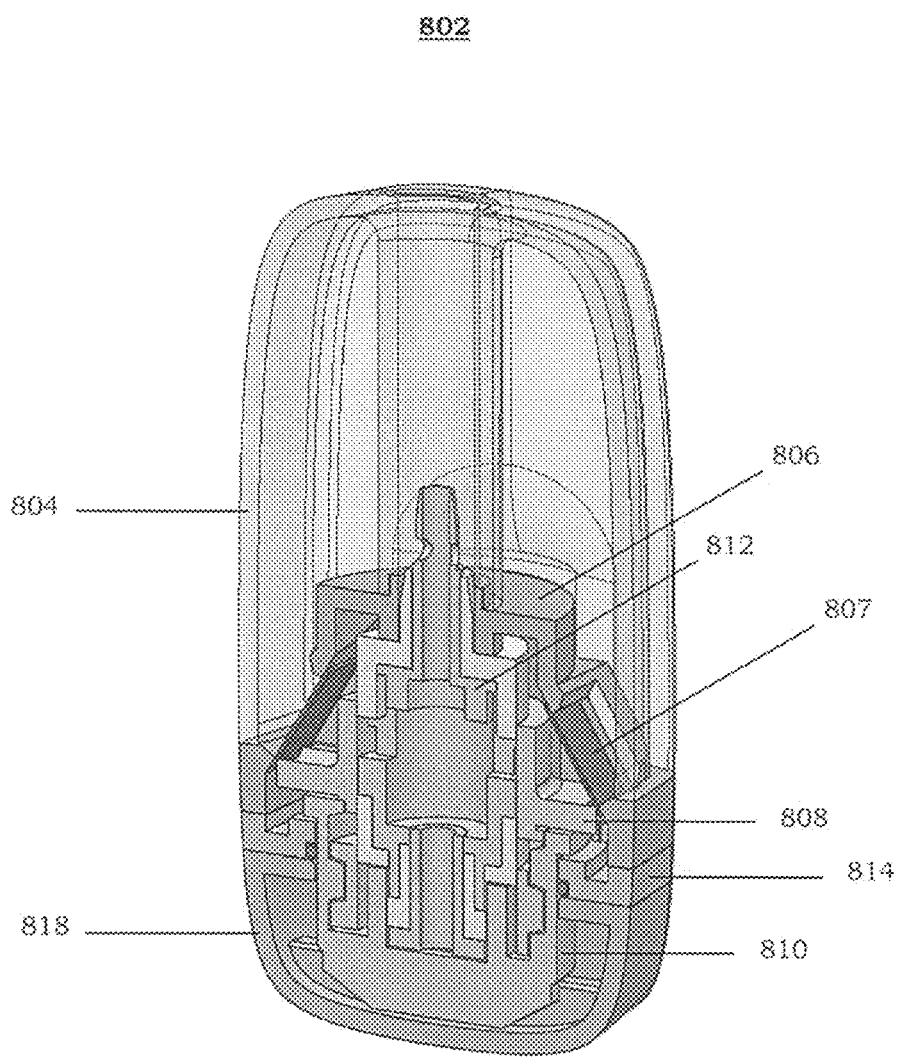
FIG. 30C is a tilted and angled cross-sectional view of the pod assembly of FIG. 29 when assembled and before actuation.

FIG. 30A is a cross-sectional view of the pod assembly of FIG. 29 when assembled and before actuation. FIG. 30B is a tilted cross-sectional view of the pod assembly of FIG. 29 when assembled and before actuation. FIG. 30C is a tilted and angled cross-sectional view of the pod assembly of FIG. 29 when assembled and before actuation. Referring to FIG. 30A, FIG. 30B, and FIG. 30C, the upper pod case 804 is configured to connect with the foil holder 806. The foil 807 is secured to each of the angled faces of the foil holder 806 so as to cover the openings in the angled faces. The foil 807 is designed to hermetically seal the reservoir until the pod assembly 802 is actuated. The vaporizer 812 extends through the cutter 808 and the foil holder 806 such that a tip portion of the vaporizer 812 protrudes into a vapor channel within the upper pod case 804. The cutter 808 is threadedly engaged with the screw 810, and the screw 810 is seated within the lower pod case 818. The threaded engagement between the cutter 808 and the screw 810 may be configured such that the cutter 808 will move upwards towards the upper pod case 804 when the screw 810 is rotated (via the lower pod case 818) in a first direction. Conversely, in such an example embodiment, the threaded engagement may be configured such that the cutter 808 will move downwards to its original position and, thus, towards the lower pod case 818 when the screw 810 is rotated (via the lower pod case 818) in an opposite second direction.

When the pod assembly 802 is in an unactuated (or resealed) state, as shown in FIG. 30A, FIG. 30B, and FIG. 30C, the cutter 808 will be adjacent to or abutting the bottom of the inner, recessed surface of the screw 810. In this unactuated state, a side opening in the vaporizer 812 (through which a pre-vapor formulation will enter after actuation) will be covered by the cutter 808. In an example embodiment, the inner surface of the cutter 808 may also be lined with a film or layer (e.g., silicone film) that is impervious to pre-vapor formulation in order to help close the side opening of the vaporizer 812 when entry of the pre-vapor formulation is not desired, such as when the pod assembly 802 has been resealed after actuation (which will be subsequently discussed in further detail).

The pod assembly 802 may be actuated by holding the upper pod case 804 and rotating the lower pod case 818 relative to the upper pod case 804. Alternatively, the pod assembly 802 may be actuated by holding the lower pod case 818 and rotating the upper pod case 804 relative to the lower pod case 818. In addition, the pod assembly 802 may be configured such that the lower pod case 818 (or, alternatively, the upper pod case 804) undergoes a 360 degree rotation to actuate the pod assembly 802. However, it should be understood that example embodiments are not limited thereto. For instance, the pod assembly 802 may be designed such that only a 180 degree rotation is needed for actuation. During actuation, the above-discussed rotation will cause the cutter 808 to move upwards so as to pierce and cut the foil 807 covering each of the openings in the angled faces of the foil holder 806, which will thereby release the pre-vapor formulation from the reservoir.

Figure 31A:
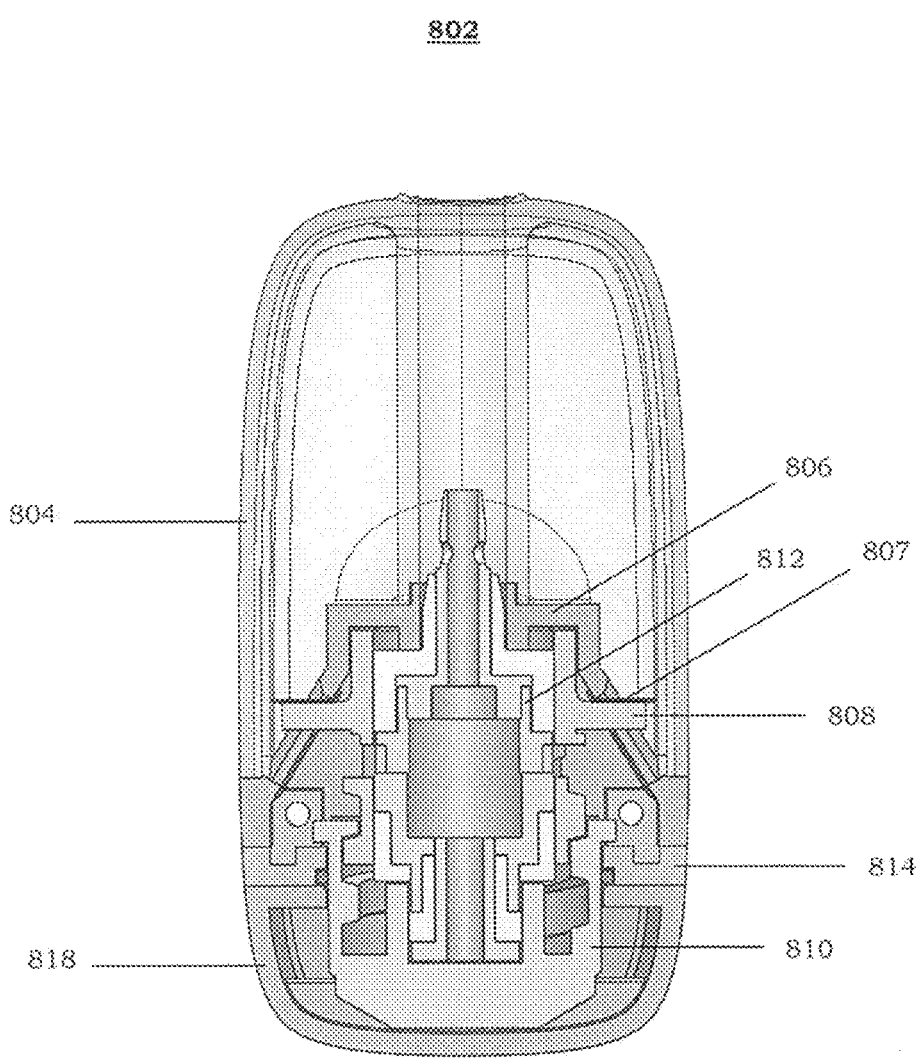
FIG. 31A is a cross-sectional view of the pod assembly of FIG. 29 when assembled and after actuation.
Figure 31B:
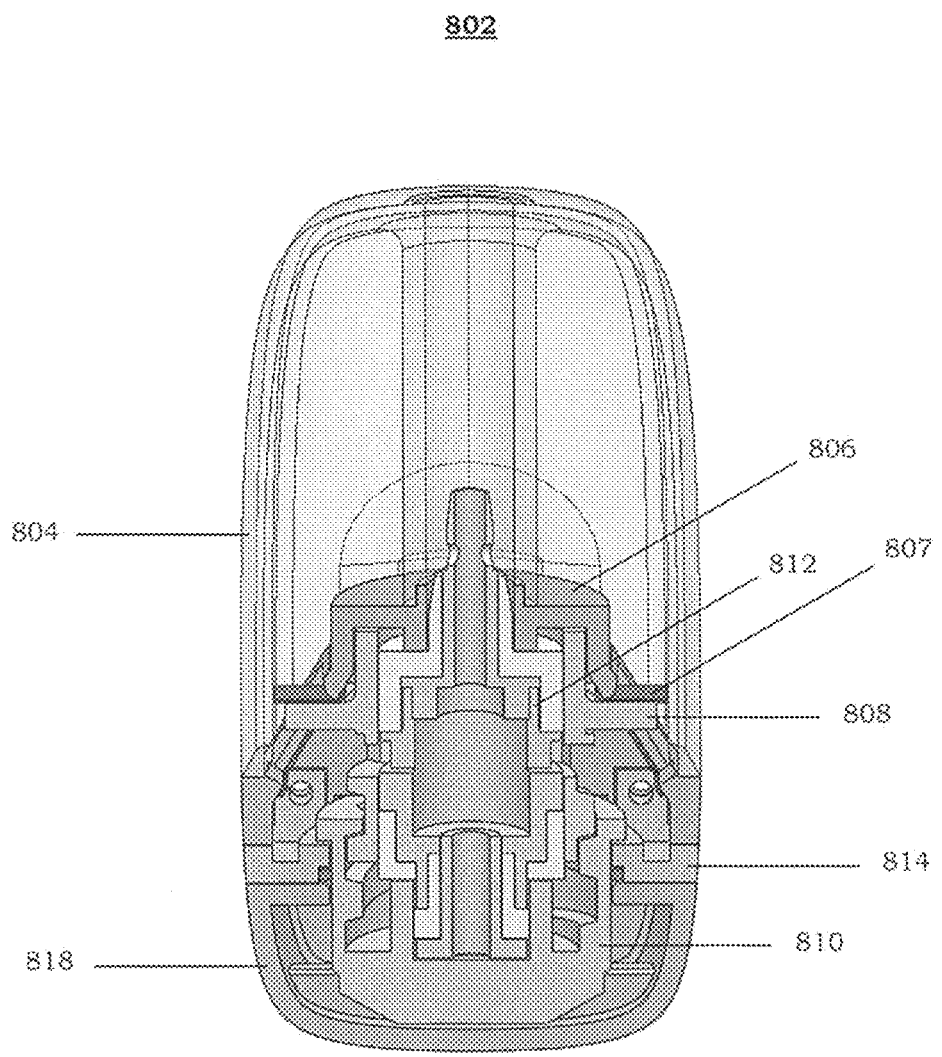
FIG. 31B is a tilted cross-sectional view of the pod assembly of FIG. 29 when assembled and after actuation.
Figure 31C:
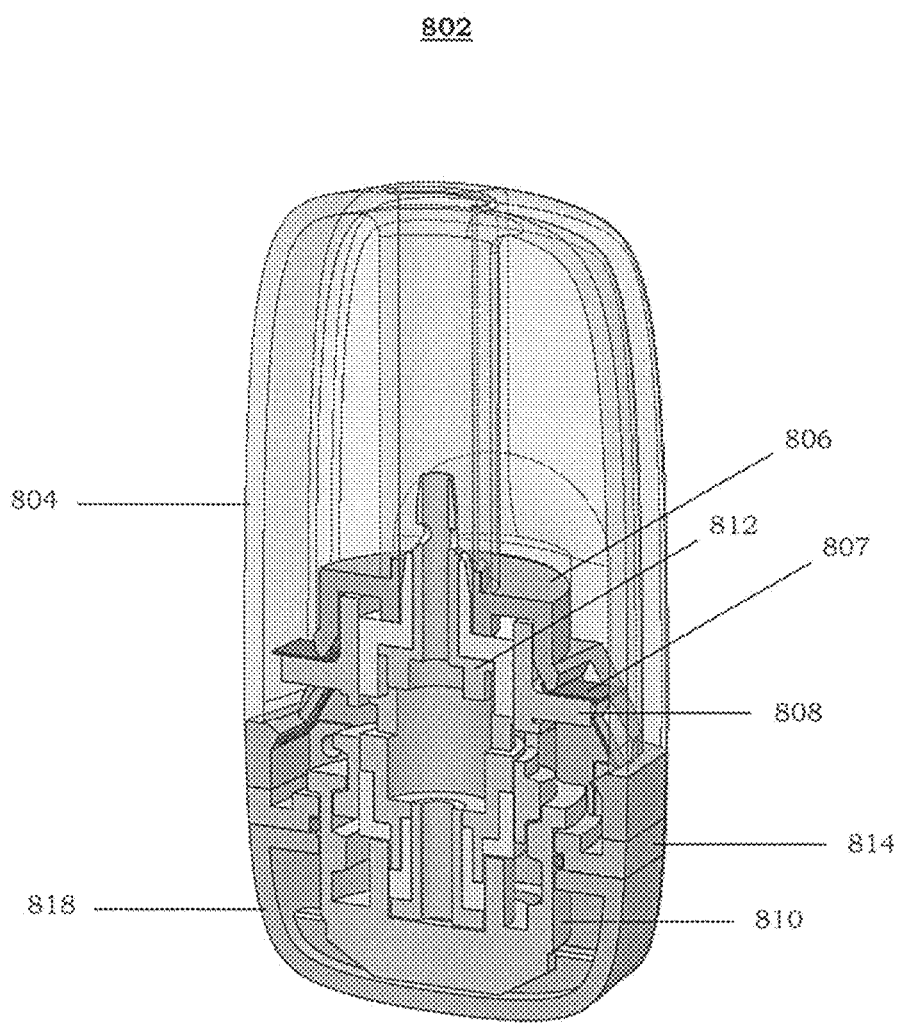
FIG. 31C is a tilted and angled cross-sectional view of the pod assembly of FIG. 29 when assembled and after actuation.

FIG. 31A is a cross-sectional view of the pod assembly of FIG. 29 when assembled and after actuation. FIG. 31B is a tilted cross-sectional view of the pod assembly of FIG. 29 when assembled and after actuation. FIG. 31C is a tilted and angled cross-sectional view of the pod assembly of FIG. 29 when assembled and after actuation. Referring to FIG. 31A, FIG. 31B, and FIG. 31C, when the pod assembly 802 is in an actuated state, the cutter 808 will be adjacent to or abutting the underside of the foil holder 806. As a result, the puncturing/perforating elements on the outer side wall of the cutter 808 will protrude through the openings in the angled faces of the foil holder 806, thereby piercing and cutting the associated foils 807 so as to release the pre-vapor formulation from the reservoir. In addition, the side opening in the vaporizer 812 will be aligned with a side opening in the cutter 808 to permit the entry of the pre-vapor formulation released from the reservoir into the vaporizer 812 via the aligned side openings. The vaporizer 812 includes a heater that will be in thermal and/or fluidic communication with the released pre-vapor formulation after the pod assembly 802 is actuated. During vaping, the vaporizer 812 will be activated to heat the pre-vapor formulation to generate a vapor that will be drawn through the vapor channel of the upper pod case 804 when a negative pressure is applied to the mouthpiece of the e-vapor device.

The actuated pod assembly 802 may also be switched from being open (FIG. 31A, FIG. 31B, and FIG. 31C) back to being closed (FIG. 30A, FIG. 30B, and FIG. 30C) by changing the position of the cutter 808. In this context, the term "open" should be understood to mean a state where the side opening of the vaporizer 812 is not covered by the cutter 808. In contrast, the term "closed" should be understood to mean a state where the side opening of the vaporizer 812 is covered/resealed. The pod assembly 802 may be closed by moving the cutter 808 back down to its original position to cover/reseal the side opening of the vaporizer 812. The return of the cutter 808 to its original position (towards the lower pod case 818) can be effectuated by rotating the screw 810 (via the lower pod case 818) in the opposite second direction to thereby cover/reseal the side opening of the vaporizer 812. The cutter 808 may be regarded as a shuttle-type structure due to its ability to move up and down in order to switch the pod assembly 802 from being closed to being open or vice versa. When resealed, the entry of further pre-vapor formulation into the vaporizer 812 may be precluded. As a result, the pod assembly 802 can be stored with a reduced risk of leakage.

Figure 32:
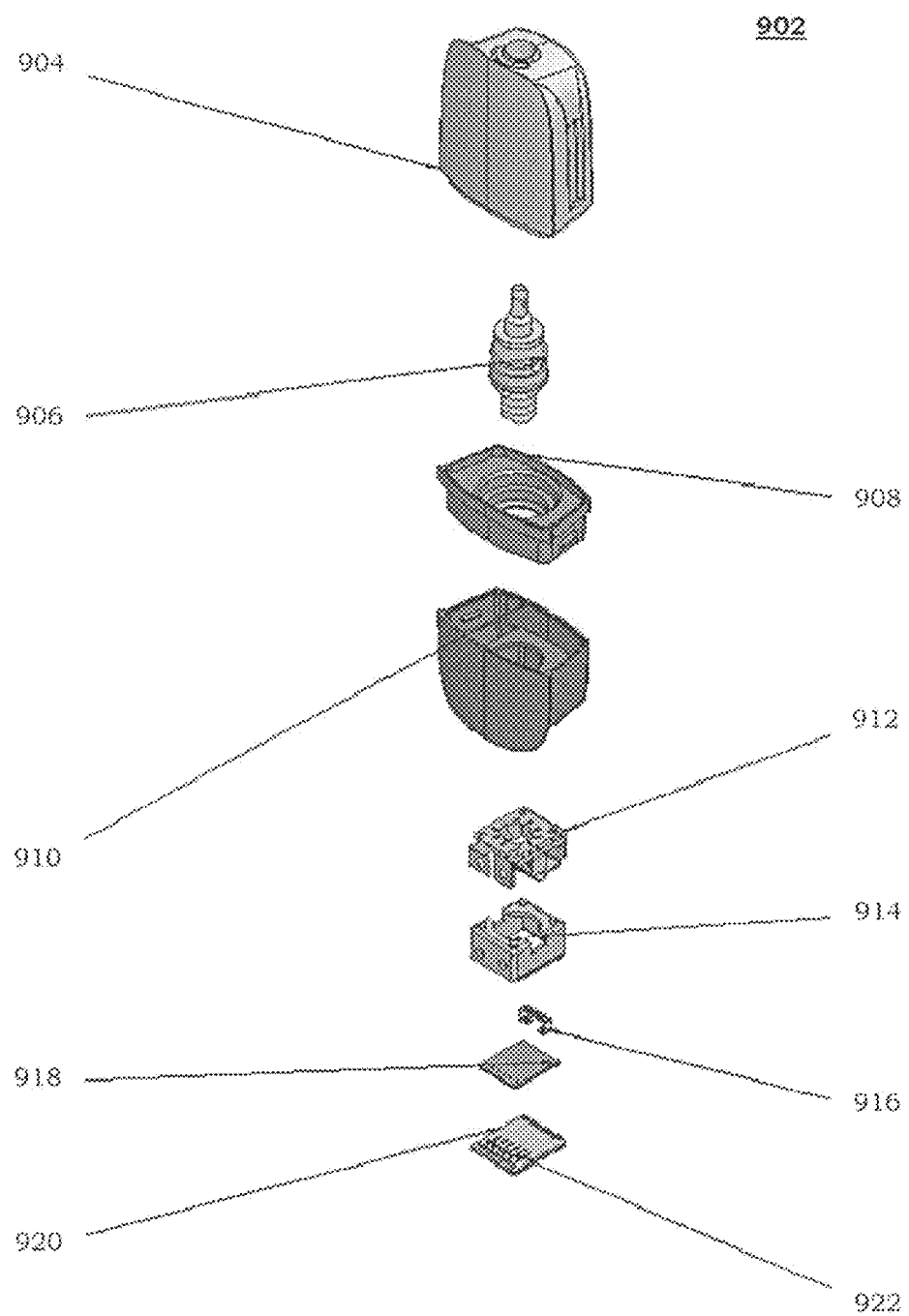
FIG. 32 is an exploded view of another pod assembly of an e-vapor apparatus according to an example embodiment.

FIG. 32 is an exploded view of another pod assembly of an e-vapor apparatus according to an example embodiment. Referring to FIG. 32, the pod assembly 902 has a simplified pod construction. In an example embodiment, the pod assembly 902 includes an upper pod case 904, a vaporizer assembly 906, a seal 908, a lower pod case 910, electrode section 912, a connector case 914, an air flow sensor 916, a printed circuit board (PCB) 918, a data pin connector 920, and data pins 922. The electrode section 912 and the data pins 922 may be formed of beryllium copper (BeCu). The connector case 914 and the data pin connector 920 may be formed of polybutylene terephthalate (PBT). The air flow sensor 916 may be a flow sensor, and the flow sensor may be formed of a nickel-iron alloy. The electrode section 912, connector case 914, air flow sensor 916, printed circuit board (PCB) 918, data pin connector 920, and data pins 922 for the electrical connector assembly 622.

The electrode section 912 includes an anode electrode 2335$_1$ and a cathode electrode 2335$_2$. Each of the anode electrode 2335$_1$ and the cathode electrode 2335$_2$ are photo-etched or stamped from sheet metal, then pressed/folded around a tool or die to create the structure shown in FIGS. 32 and 35A-35D. The anode electrode 2335$_1$ and the cathode electrode 2335$_2$ are described in greater detail below with respect to FIGS. 35A-35F.

Figure 33:
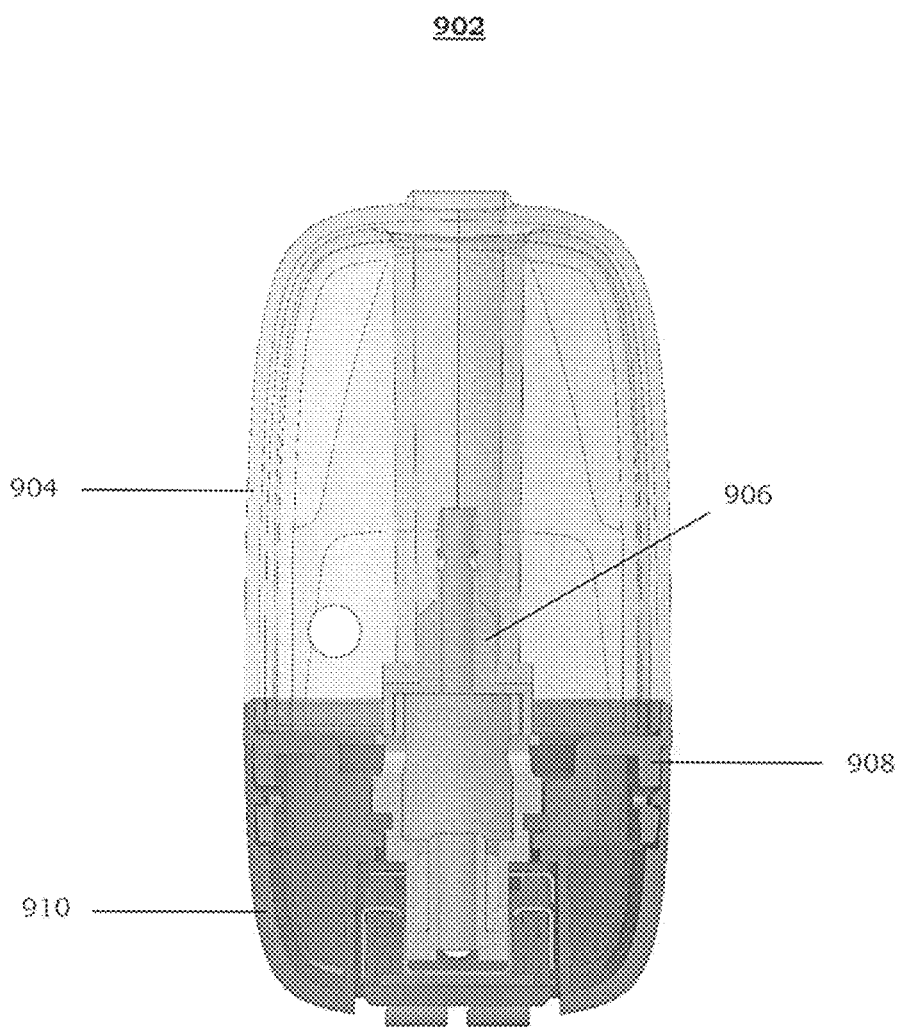
FIG. 33 is a cross-sectional view of the pod assembly of FIG. 32 when assembled.

FIG. 33 is a cross-sectional view of the pod assembly of FIG. 32 when assembled. Referring to FIG. 33, the pod assembly 902 includes an upper pod case 904 that is configured to connect with the lower pod case 910 via the seal 908. The pod assembly 902 is configured such that a pre-vapor formulation stored therein is already in thermal and/or fluidic communication with a heater within the vaporizer assembly 906. As a result, no actuation is needed to internally release the pre-vapor formulation prior to inserting the pod assembly 902 into a dispensing body of an e-vapor device. However, it should be understood that the other internal elements of the pod assembly 902 (e.g., electronics) may be isolated from the pre-vapor formulation by virtue of at least the seal 908. The sector of the pod assembly 902 above the seal 908 may be regarded as the pre-vapor formulation compartment, while the sector of the pod assembly 902 below the seal 908 may be regarded as the device compartment. During vaping, a heater within the vaporizer assembly 906 will be activated to heat the pre-vapor formulation to generate a vapor that will be drawn through the vapor channel of the upper pod case 904 when a negative pressure is applied to the mouthpiece of the e-vapor device.

Figure 34:
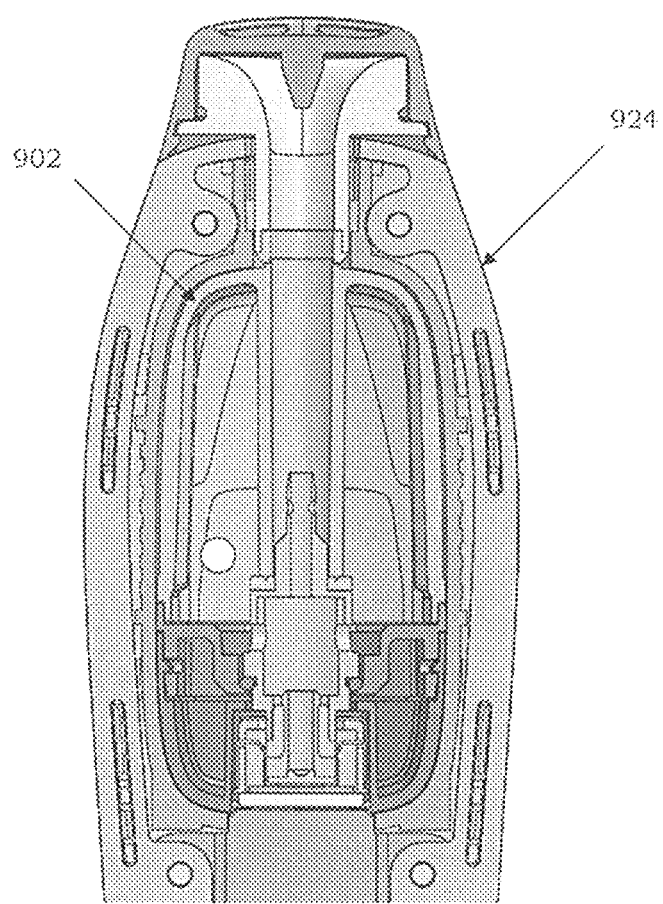
FIG. 34 is a partial view of an e-vapor apparatus with the pod assembly of FIG. 33 inserted in a dispensing body according to an example embodiment.

FIG. 34 is a partial view of an e-vapor apparatus with the pod assembly of FIG. 33 inserted in a dispensing body according to an example embodiment. Referring to FIG. 34, the pod assembly 902 may be held within the dispensing body 924 in a variety of ways. In an example embodiment, a mouthpiece seal may secure a top portion of the pod assembly 902, while an electrical connector may secure a bottom portion of the pod assembly 902 and act as an electrical interface between the pod assembly 902 and the dispensing body 924. The mouthpiece seal may be formed of silicone and acts as a vapor interface between the vapor channel of the pod assembly 902 and the vapor passage of the dispensing body 924 so as to facilitate a delivery of the vapor through the vapor passage of the dispensing body 924 when a negative pressure is applied to the mouthpiece.

The mouthpiece of the dispensing body 924 may have different parts and configurations for aesthetic reasons (e.g., outer piece to complement the look and feel of the e-vapor device) and/or for functional reasons (e.g., inner piece to adjust the temperature of the vapor and/or to reduce the turbulence of the vapor). Thus, a number of different mouthpieces may be utilized with the e-vapor device depending on the preferences of an adult vaper. In this regard, the mouthpiece is designed to be removable and interchangeable (e.g., via a bayonet connection). Alternative configurations for the mouthpiece are disclosed in U.S. application Ser. No. 29/575,895, the entire contents of which are incorporated herein by reference. In addition, alternative configurations for the dispensing body are disclosed in U.S. application Ser. No. 29/575,887, the entire contents of which are incorporated herein by reference. Alternative configurations for the pod assembly are also disclosed in U.S. application Ser. No. 29/575,881, the entire contents of which are incorporated herein by reference. Furthermore, alternative configurations for the overall e-vapor device are disclosed in U.S. application Ser. No. 29/575,883, the entire contents of which are incorporated herein by reference. Based on the present teachings and although not necessarily set forth expressly herein, it should be appreciated that various features and combinations from one embodiment may be suitable and applicable for other embodiments depending on the desired effects provided by such features and combinations.

Figure 35A:
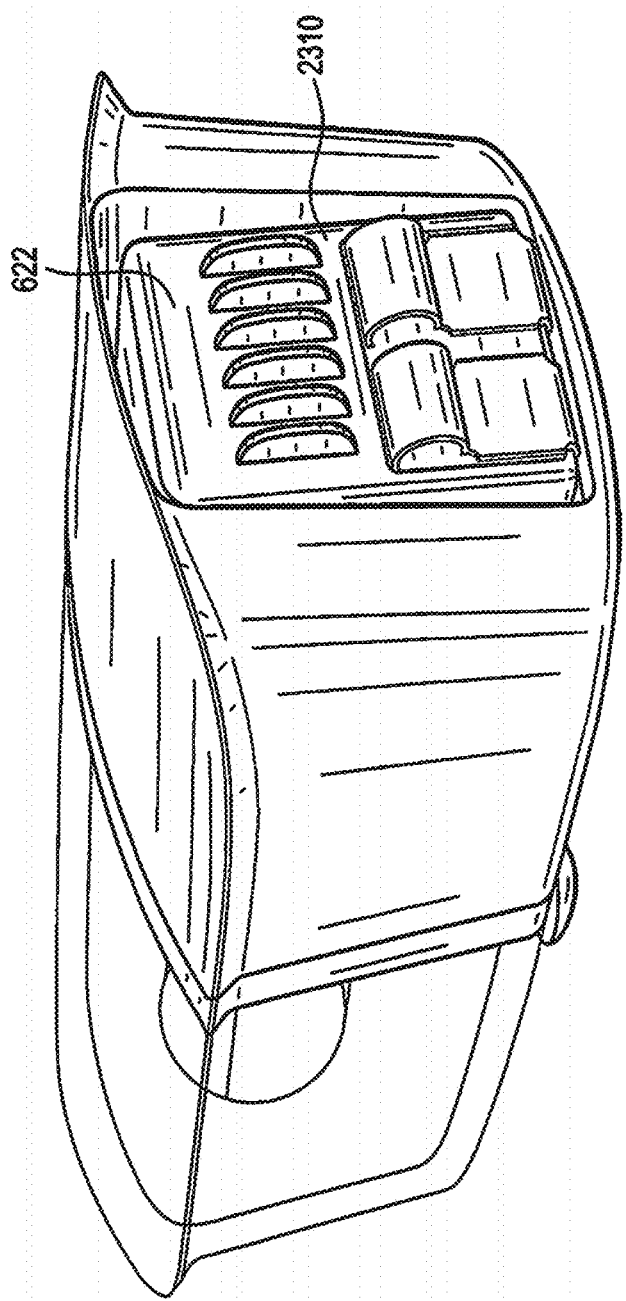
Figure 35B:
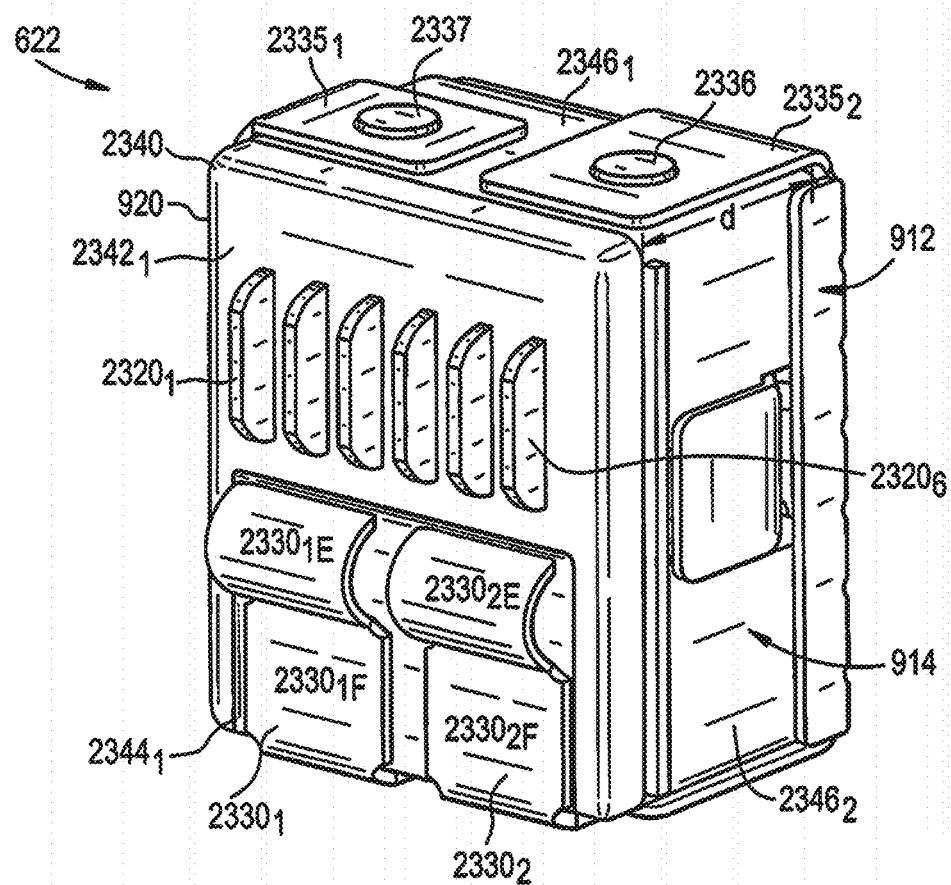

FIG. 35A illustrates a front view of an example embodiment of a pod system having a connector assembly to provide the electrical/data interface with the pod and the dispensing body. FIG. 35B illustrates a perspective view of the connector assembly shown in FIG. 35A.

As shown in FIG. 35A, the electrical connector assembly 622 is located within a receiving area 2310 of the pod system. The electrical connector assembly 622 is connected to the vaporizer assembly 906, as will be discussed in further detail below.

Referring to FIG. 35B, the electrical connector assembly 622 includes a plurality of blade-shaped contacts $2320_1$-$2320_6$ and two power contacts $2330_1$-$2330_2$. The plurality of blade-shaped contacts $2320_1$-$2320_6$ and the two power contacts $2330_1$-$2330_2$ are mounted on a receptacle 2340 of the electrical connector assembly 622.

The receptacle 2340 is formed by the electrode section 912, the connector case 914 and the data pin connector 920. The connector case 914 has four side surfaces $2346_1$-$2346_4$ that form a square shape. The data pin connector 920 is mounted to one open end of the square to create of first (e.g., front) surface $2342_1$ of the receptacle 2340 and the electrode section 912 is mounted to the other open end of the square to create a second (e.g., back) surface $2342_2$ of the receptacle 2340. The data pin connector 920 is attached to the connector case 914 by an ultrasonic weld.

The blade-shaped contacts $2320_1$-$2320_6$ protrude through the first surface (front surface) $2342_1$ of the receptacle 2340 and are interference fit into the receptacle, thereby achieving a seal. The blade-shaped contacts $2320_1$-$2320_6$ receive and transmit digital and analog data signals to/from the dispensing body 3700 (shown in FIG. 37). The blade-shaped contacts $2320_1$-$2320_6$ are evenly spaced and may be the same shape. In an example embodiment, the blade-shaped contacts $2320_1$-$2320_6$ have a thickness of 0.2 mm, protrude from the connector case 914 by about 2.1 mm, extend into the connector case by 1 mm (as shown by a cantilever portion $2320_{1F}$ in FIG. 37C), and extend 3 mm along the connector case 914. Cantilever portions $2320_{1F}$-$2320_{6F}$ of the blade-shaped contacts $2320_1$-$2320_6$, respectively, extend into the PCB 918, as shown in FIG. 35D.

While six blade-shaped contacts $2320_1$-$2320_6$ are illustrated, example embodiments are not limited thereto. Each blade-shaped contact has a different function. Thus, the number of blade-shaped contacts is based on the functions of the pod system. For example, additional blade-shaped contacts may be added to increase the quality of a measured voltage of the vaporizer assembly 906.

In the example shown in FIG. 35B, the blade-shaped contacts $2320_1$-$2320_3$ are dedicated to digital communications of the pod system, the blade-shaped contact $2320_4$ is dedicated to common ground and the blade-shaped contacts $2320_5$-$2320_6$ are dedicated to an analog input and output of a hot-wire flow sensor. More specifically, the blade-shaped contacts $2320_1$-$2320_3$ communicate with a programmable read-only memory (PROM) in the pod system using the inter-integrated circuit (I2C) interface (e.g., digital power, I2C clock and I2C data, respectively) and the blade-shaped contacts $2320_5$-$2320_6$ are dedicated to a power supply of the hot-wire air flow sensor and output of a hot-wire flow sensor.

The electrode section 912 includes the two power contacts $2330_1$-$2330_2$ which are parts of anode and cathode electrodes $2335_1$-$2335_2$, respectively. The anode and cathode electrodes $2335_1$-$2335_2$ may be made of copper-beryllium (CuBe), copper-titanium or another material that provides a spring force, low resistance and compliance under force (to reduce contact resistance). The two power contacts $2330_1$-$2330_2$ are arranged such that they form a circuit from the dispensing body 3700, to the cathode electrode $2335_2$, to the vaporizer assembly 906, to the anode electrode $2335_1$ and back to the dispensing body 3700, when current is supplied to the vaporizer assembly 906.

The anode and cathode electrodes $2335_1$-$2335_2$ are mounted to the connector case 914 using a spring force. More specifically, when the anode and cathode electrodes $2335_1$-$2335_2$ are mounted to the connector case 914, spring forces of the anode and cathode electrodes $2335_1$-$2335_2$ cause protrusions 2337 and 2336 of the connector case 914 to be inserted in holes of the anode and cathode electrodes $2335_1$-$2335_2$, respectively. It should be understood, that protrusions are also located on an opposing side of the connector case 914 such that a similar connection of holes of the anode and cathode electrodes $2335_1$-$2335_2$ and protrusions of the connector case 914 exists.

Each of the two power contacts $2330_1$-$2330_2$ extend in parallel from a first side $2344_1$ over the first surface $2342_1$ to a middle portion of the first surface $2342_1$. The power contacts $2330_1$-$2330_2$ each have flat portions $2330_{1F}$, $2330_{2F}$ that are parallel to the first surface $2342_1$ and semi-circular portions $2330_{1E}$, $2330_{2E}$ that extend away from the first surface $2342_1$.

The semi-circular portions $2330_{1E}$, $2330_{2E}$ are designed to reduce contact resistance. Contact resistance is determined by a combination of force, surface area, and compliance of material. The half cylinder shape of the semi-circular portions $2330_{1E}$, $2330_{2E}$ provides a contact area along a width of the tangent.

As shown in FIG. 35C, the cathode electrode $2335_2$ extends over the side surface $2346_1$ and defines the back surface $2342_2$. The portion of the cathode electrode $2335_2$ that defines the back surface $2342_2$ is attached to the side surfaces $2346_1$-$2346_4$.

The portion of the cathode electrode $2335_2$ that defines the back surface $2342_2$ defines a circle 2348 there through with arms 2350 projecting from the circle 2348. The circle 2348 is shaped to receive the vaporizer assembly 906. The arms 2350 are spring fingers such that the vaporizer assembly 906 can be inserted into the connector case 914 and the electrical connector assembly 622. The arms 2350 mechanically hold the vaporizer assembly 906, and minimize assembly time compared with screwing on a thread. Moreover, the arms 2350 provide a downwards force on the vaporizer assembly 906 to ensure good contact with a portion $2335_{1BINT}$ (shown in FIG. 35D).

FIG. 35D illustrates a cross-sectional view of the receptacle 2340 along the plane A (shown in FIG. 35C). The electrode $2335_1$ continuously extends along a portion of the side $2346_1$, along a length of the side $2346_3$ and along a portion of the side $2346_4$. The electrode $2335_1$ may also extend the entire depth d of the side $2346_1$, the side $2346_3$ and the side $2346_4$ or only a portion of the depth.

As shown, an interior of the receptacle 2340 includes the PCB 918. The blade-shaped data contacts $2320_1$-$2320_6$ are attached to the PCB 918 by soldering. In another example embodiment, the blade-shaped data contacts $2320_1$-$2320_6$ may be insert molded to the data pin connector 920, as opposed to interference fitted.

The electrode $2335_1$ also includes a bridge portion $2335_{1B}$ that extends from the side $2346_3$ to the side $2346_2$. The electrode $2335_1$ is over-bent during forming creating a spring-force to hold the electrode $2335_1$ to the connector case 914. More specifically, the sides $2346_3$ and $2346_2$ include notches $N_1$ and $N_2$, respectively. The notches $N_1$ and $N_2$ are aligned such that the bridge portion $2335_{1B}$ is substantially normal to both sides $2346_3$ and $2346_2$. The bridge portion $2335_{1B}$ includes portions $2335_{1BEXT}$ that extend over the notches $N_1$, $N_2$ as well as the portion $2335_{1BINT}$ that extends into an interior of the receptacle and runs parallel to the PCB 918. The portion $2335_{1BINT}$ is designed to maximize/have a desired contact area of a flat surface of the vaporizer assembly 906.

The air flow sensor 916, PROM memory 2356 and resistors 2358, 2359 are mounted on the PCB 918. The PROM memory 2356 may act as an authentication device such as described with reference to FIGS. 21-22. For example, the PROM memory 2356 may store the data stored by the non-volatile memory 2205b in FIG. 22.

The air flow sensor 916 is positioned adjacent a U-shaped notch in the side surface $2346_4$ of the connector case 914. As shown in FIG. 35D, the electrodes $2335_1$ and $2335_2$ include grooved portions 2362 and 2364 that align with halves of the U-shaped notch, respectively, thereby providing an air flow passage into the interior of the receptacle 2340. The air flow sensor 916 may be a microelectromechanical system (MEMS) flow sensor or another type of sensor configured to measure air flow.

Figure 35E:
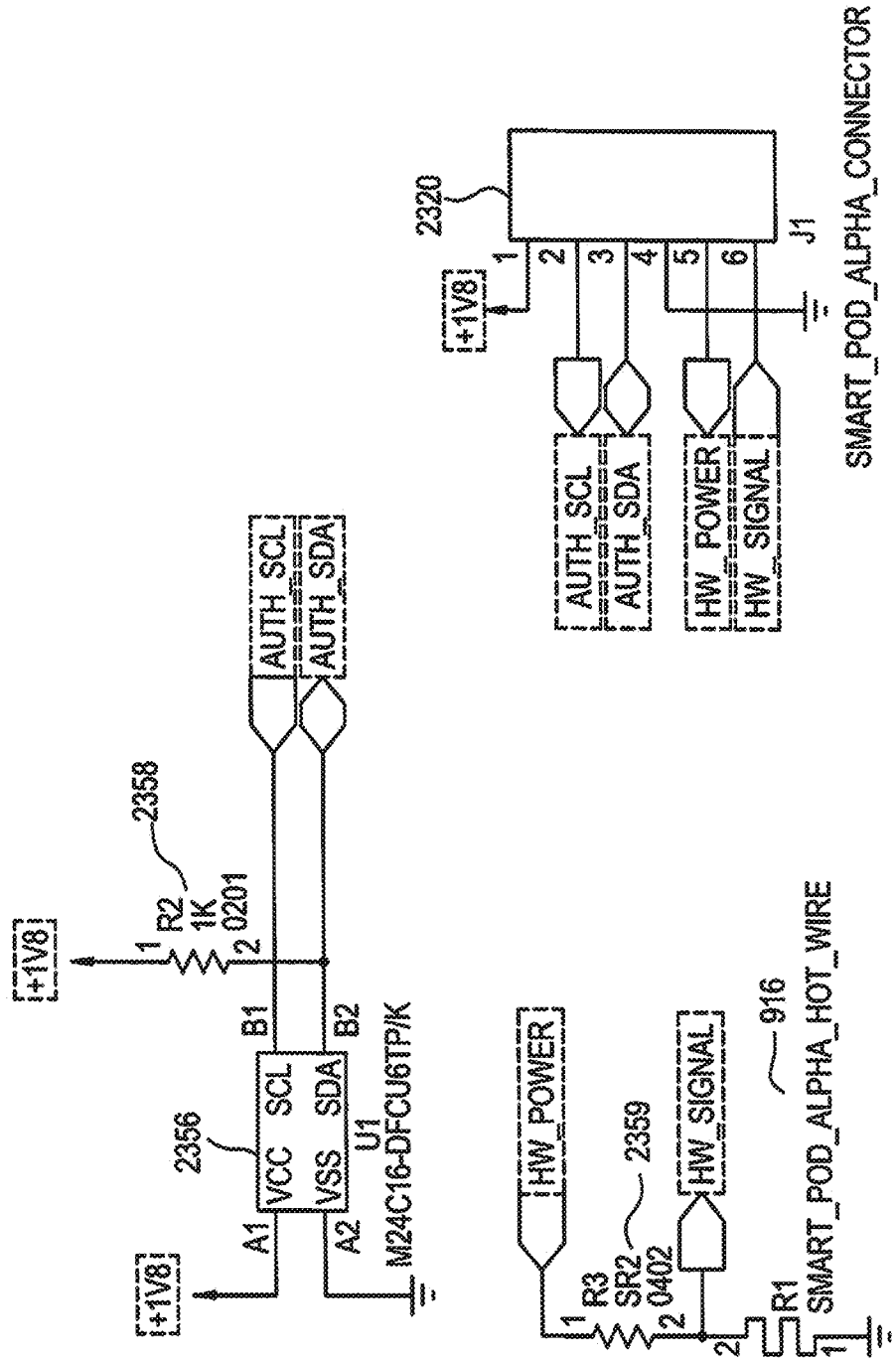

FIG. 35E illustrates the electrical connections of the air flow sensor, PROM and blade-shaped data contacts $2320_1$-$2320_6$. As shown in FIG. 35E, the data contact $2320_2$ provides a clock signal AUTH_SCL to the PROM 2356. The data contact $2320_3$ permits transmission of an input/output data signal AUTH_SDA to the PROM 2356. The pull up resistor 2358 is connected between the data contact $2320_3$ and the PROM 2356. The data contact $2320_5$ provides power HW_POWER to the air flow sensor 916. The data contact $2320_6$ receives an output HW_SIGNAL of the air flow sensor 916. The resistor 2359 is connected between an input terminal of the power HW_POWER and an output terminal of the output HW_SIGNAL.

Figure 35F:
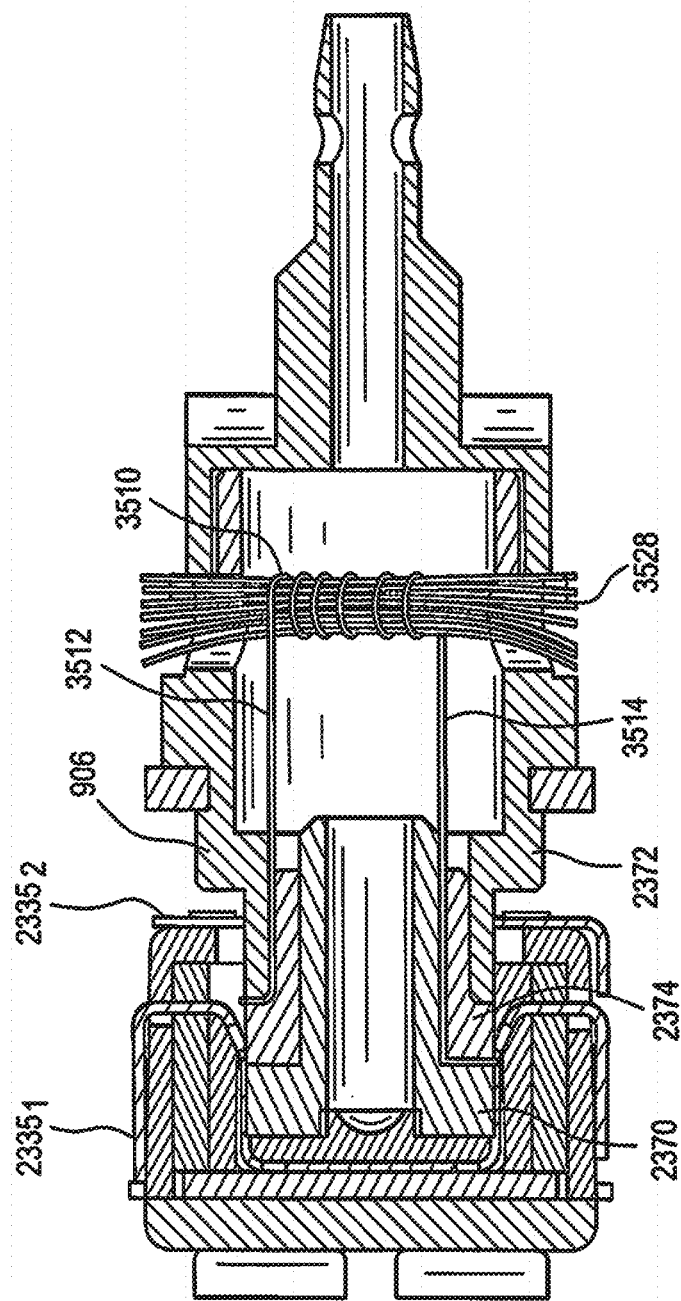

FIG. 35F illustrates a cross sectional view of the pod assembly 902 including the vaporizer assembly 906 and the electrical connector assembly 622.

As shown in FIG. 35F, the vaporizer assembly 906 includes an anode portion 2370 and a cathode portion 2372.

The anode portion 2370 contacts the anode electrode $2335_1$ and the cathode portion 2372 contacts the cathode electrode $2335_2$.

To receive power (e.g., from the power supply 2110 as previously described with reference to FIGS. 21-22), a heater 3510 is attached to the cathode portion 2372 and the anode portion 2370. The heater 3510 is connected to the cathode portion 2372 by a first end of a wire 3512 and the heater 3510 is connected to the anode portion 2370 by a second end of the wire 3514. The anode portion 2370 extends into a section of the cathode portion 2372, but it is physically separated from the cathode portion 2372 by an electrical insulator 2374. The electrical insulator 2374 is a silicon gasket which provides insulation between current carrying metal parts of the vaporizer assembly 906 and provides a force on the first and second ends 3512 and 3514 to ensure a reliable connection between the wires.

The heater 3510 is illustrated as a coil wrapped around a wick 3528. However, the heater 3510 may be the same as the features described with respect to the heater 2215. Thus, for the sake of brevity, a description thereof is omitted.

The first end 3512 is located between the electrical insulator 2374 and the cathode portion 2372. The second end 3514 is located between the electrical insulator 2374 and the anode portion 2370. The first end 3512 and the second end 3514 may be connected to the cathode portion 2372 and the anode portion 2370, respectively, by, for example, spot welding or soldering. It should be understood that connections should not be limited to soldering or spot welding. Where soldering is used, welding may be used instead and vice versa.

Figure 36:
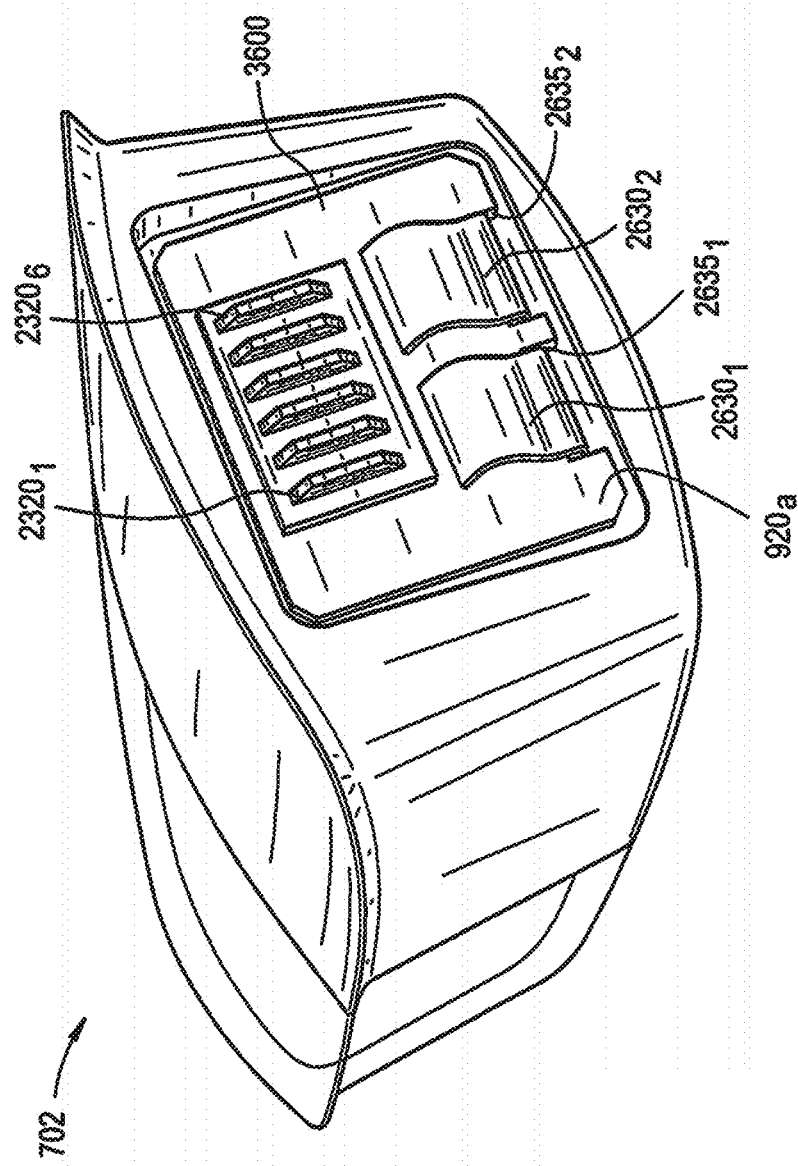
FIG. 36 illustrates another example embodiment of an electrical connector assembly.

FIG. 36 illustrates another example embodiment of an electrical connector assembly having the blade-shaped data contacts $2320_1$-$2320_6$. An electrical connector assembly 3600 is the same as the electrical connector assembly 622 except power contacts $2630_1$ and $2630_2$ are shaped differently than the contacts $2330_1$ and $2330_2$. Moreover, a data pin connector 920a has notches $2635_1$ and $2635_2$ on one side. The power contacts $2630_1$ and $2630_2$ are in the notches $2635_1$ and $2635_2$, respectively.

Figure 37A:
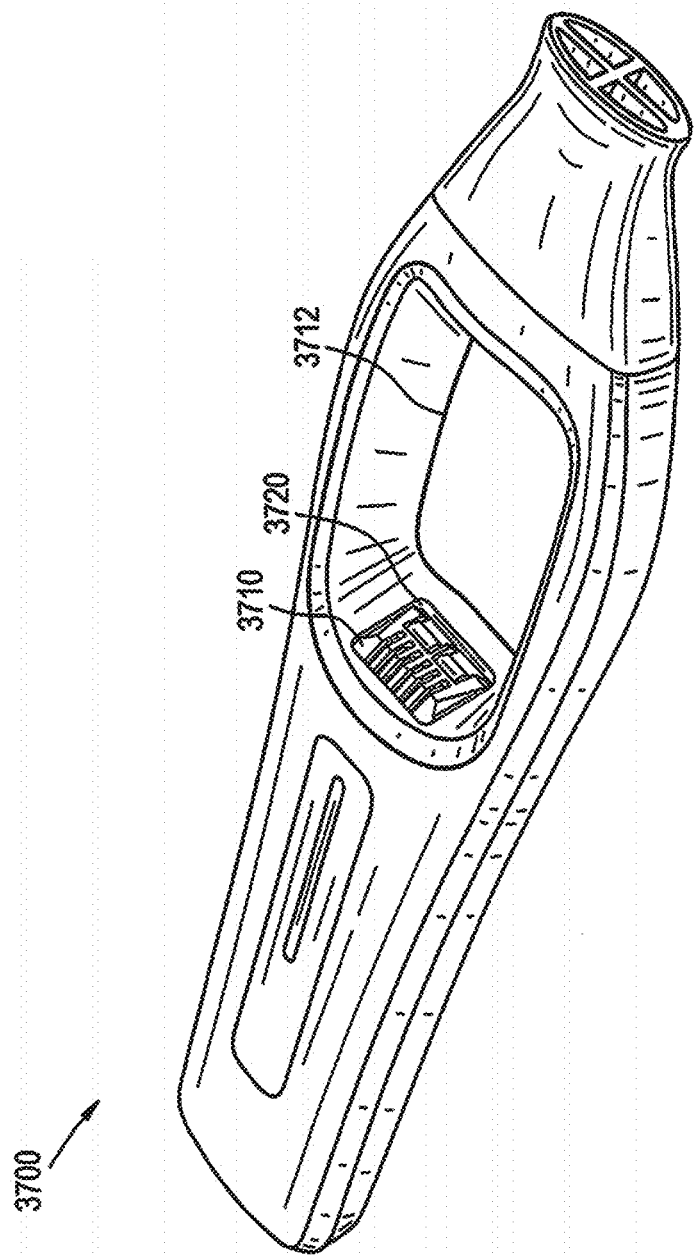
FIG. 37A illustrates a dispensing body of an e-vaping device including an electrical connector assembly.

FIG. 37A illustrates a dispensing body 3700 of an e-vaping device including an electrical connector assembly 3710 (electrical connector). The electrical connector assembly 3710 is configured to be connected to the electrical connector assembly 622 shown in FIGS. 35A-35F.

As shown in FIG. 37A, electrical connector assembly 3710 is located within a receiving area 3720 of the dispensing device. The connector assembly 3710 is connected to a PCB 3775, as will be discussed in further detail below. A sealing gasket may be between the electrical connector assembly 3710 and an outer boundary of the receiving area 3720. Alternatively, the electrical connector assembly 3710 may be interference fit within the receiving area 3720, ultrasonically welded to the receiving area 3720 or chemically welded. In another example embodiment, the electrical connector assembly 3710 and the receiving area 3720 may be a single part.

A bezel 3712 is shaped such that a pod assembly (e.g., shown in FIG. 35A) is held in a single orientation within tolerance of the electrical connector assemblies 622 and 3710.

FIG. 37B illustrates a perspective view of the electrical connector assembly 3710. The electrical connector assembly 3710 includes a body 3715, two power contacts $3725_1$-$3725_2$ (anode and cathode, respectively) and data contacts $3732_1$-$3732_6$.

The body 3715 is made by injection molding and is made of plastic. The body 3715 includes receiving slots $3730_1$-$3730_6$ for holding the data contacts $3732_1$-$3732_6$, mounting arms $3735_1$-$3735_2$ and receiving areas $3737_1$-$3737_2$. Each of the mounting arms $3735_1$ and $3735_2$ extend from opposite sides of the body 3715 and define holes therethrough to receive fasteners to attach the connector assembly 3710 to the PCB 3775.

Each of the slots $3730_1$-$3730_6$ extends from a top side 3740 of the body 3715 to a middle portion of a height h of the body 3715. The slots $3730_1$-$3730_6$ are open on the top side 3740 and on a front face 3742 of the body 3715. Each of the slots $3730_1$-$3730_6$ is defined by at least two internal walls of the body 3715. For example, the slot $3730_1$ is defined by the walls 3744a and 3744b, with the slot $3730_1$ being therebetween. Mounted on one of the defining walls for each slot is a data contact $3732_1$-$3732_6$. For example, the data contact $3732_1$ is mounted on the wall 3744b. The slots $3730_1$-$3730_6$ are spaced and the data contacts $3732_1$-$3732_6$ are mounted such that the slots $3730_1$-$3730_6$ can receive the data contacts $2320_1$-$2320_6$, respectively, simultaneously, and the data contacts $3732_1$-$3732_6$ can contact the blade contacts $2320_1$-$2320_6$, respectively. The data contacts $3732_1$-$3732_6$ are photo-etched or stamped, pre-formed and heat-treated to give the data contacts certain mechanical properties such as a spring force. The data contacts $3732_1$-$3732_6$ are retained in the slots $3730_1$-$3730_6$, respectively, using barbs 3754 (shown in FIG. 37C).

The body 3715 further includes the receiving areas $3737_1$-$3737_2$ at the front face 3742. The receiving areas $3737_1$-$3737_2$ are two notched out areas of the front face 3742 that are separated from each other by a wall 3745. The receiving areas $3737_1$-$3737_2$ are spaced from sides 3746 and 3747, respectively, of the body 3715 and extend to the wall 3745 which is located at a middle of a width w (excluding the mounting arms $3735_1$-$3735_2$) of the body 3715.

Within the receiving areas $3737_1$-$3737_2$ are protruding ledges $3750_1$ and $3750_2$. The protruding ledge $3750_1$ is more clearly shown in FIG. 37C.

Figure 37C:
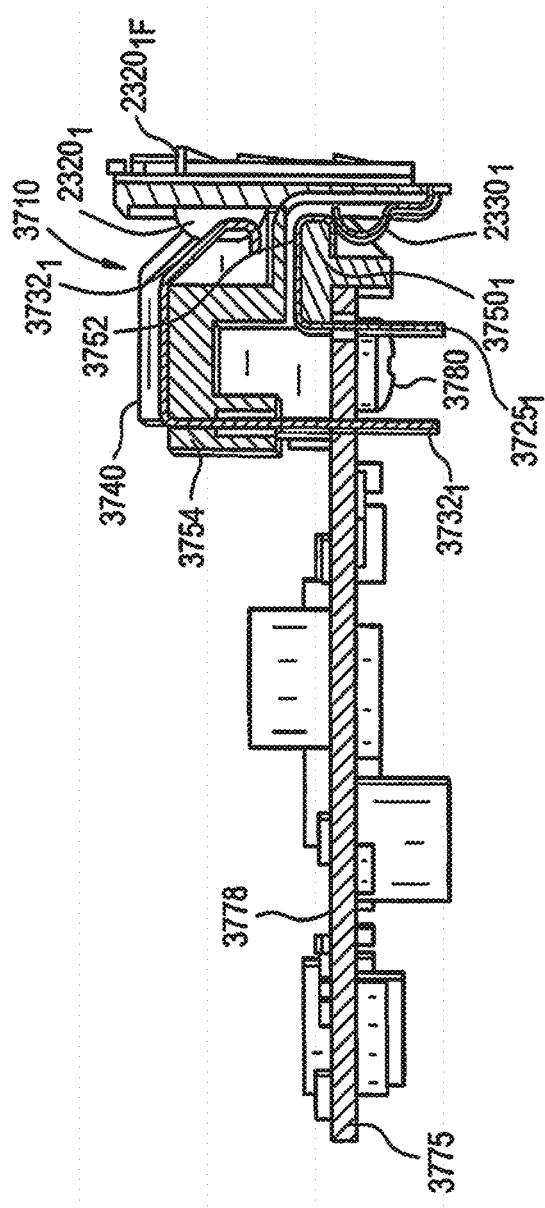
FIGS. 37C-37F illustrate a connection between a connector assembly of a pod assembly and a connector assembly of a dispensing body, according to an example embodiment.

As shown in FIG. 37C, the power contact $3725_1$ wraps around all three sides of the protruding ledge $3750_1$ (three sides within the receiving area $3737_1$). The power contact $3725_1$ further extends from the ledge $3750_1$ through an elongated internal gap 3752 of the body 3715. The power contact $3725_1$ extends out of the body 3715, from behind the receiving area $3737_1$, and through the PCB 3775 in a direction normal to the gap 3752. Each power contact $3725_1$ and $3725_2$ includes two pin contacts. As shown in FIG. 37F, the power contact $3725_1$ includes pin contacts $3725_{1A}$ and $3725_{1B}$. While only the power contact $3725_1$ is shown in FIG. 37F, it should be understood that the power contact $3725_2$ has the same shape.

The power contacts $3725_1$ and $3725_2$ are through-hole soldered to the PCB 3775. Each of the power contacts $3725_1$ and $3725_2$ is split into two pin contacts (e.g., $3725_{1A}$ and $3725_{1B}$) to reduce a resistance of the solder joint and increase current carrying capability.

Referring still to FIG. 37C, the connector assembly 3710 is mounted on a first side 3778 of the PCB 3775 by fasteners 3780 that extend through the holes $3735_1$-$3735_2$ of the body 3715 and through the PCB 3775. The PCB 2775 may have at least some of the components illustrated in FIG. 21 mounted thereon including the controller 2105 and the power supply 2110.

Moreover, the data contacts $3732_1$-$3732_6$ also extend through the PCB 3775.

Figure 37D:
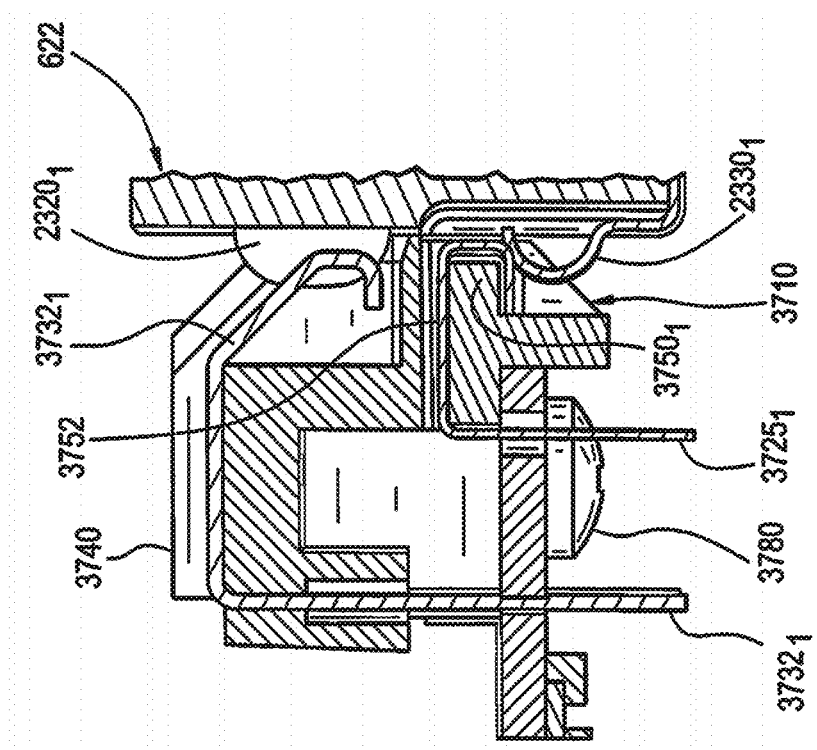

FIG. 37D illustrates the connection between the electrical connector assembly 622 and the connector assembly 3710 shown in FIG. 37C. The bezel 3712 is shaped such that the pod assembly will be held in a single orientation, within tolerance of the electrical connector assemblies 622 and 3710.

The device data contacts $3732_1$-$3732_6$ would interfere with the pod data contacts $2320_1$-$2320_6$ in their natural/relaxed position. As a result, the device data contacts $3732_1$-$3732_6$ are compressed against their spring force when the electrical connector assemblies 622 and 3710 are connected. This spring force applies pressure on the pod data contacts $2320_1$-$2320_6$, ensuring a robust connection.

The device power contacts $3725_1$ and $3725_2$ and pod power contacts $2330_1$ and $2330_2$ are connected in a similar manner (i.e., the spring force of pod power contacts $2330_1$ and $2330_2$ applies pressure on the device power contacts $3725_1$ and $3725_2$).

The data contacts $3732_1$-$3732_6$ are recessed in the body 3715 to help prevent a short circuit.

Figure 37E:
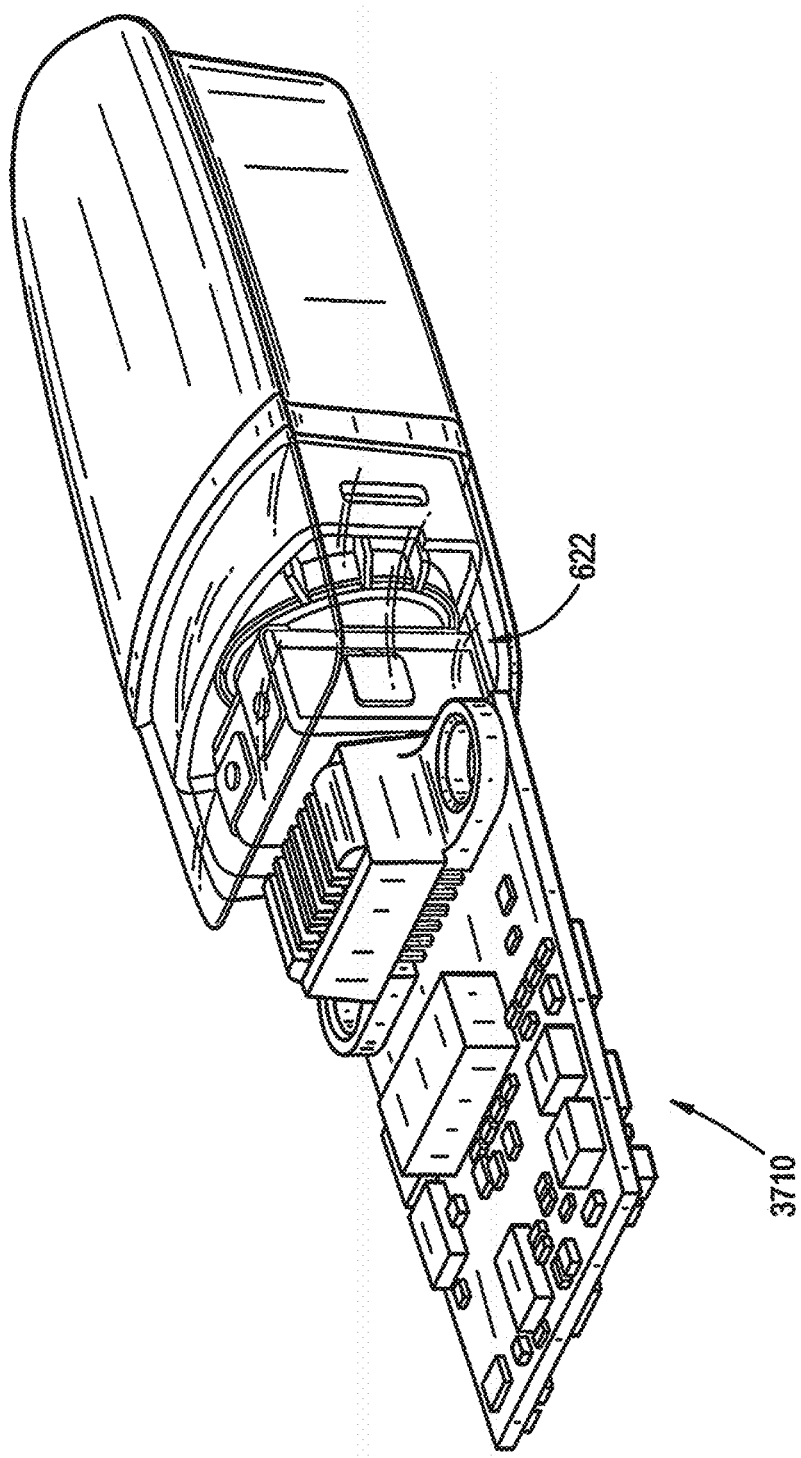
Figure 37F:
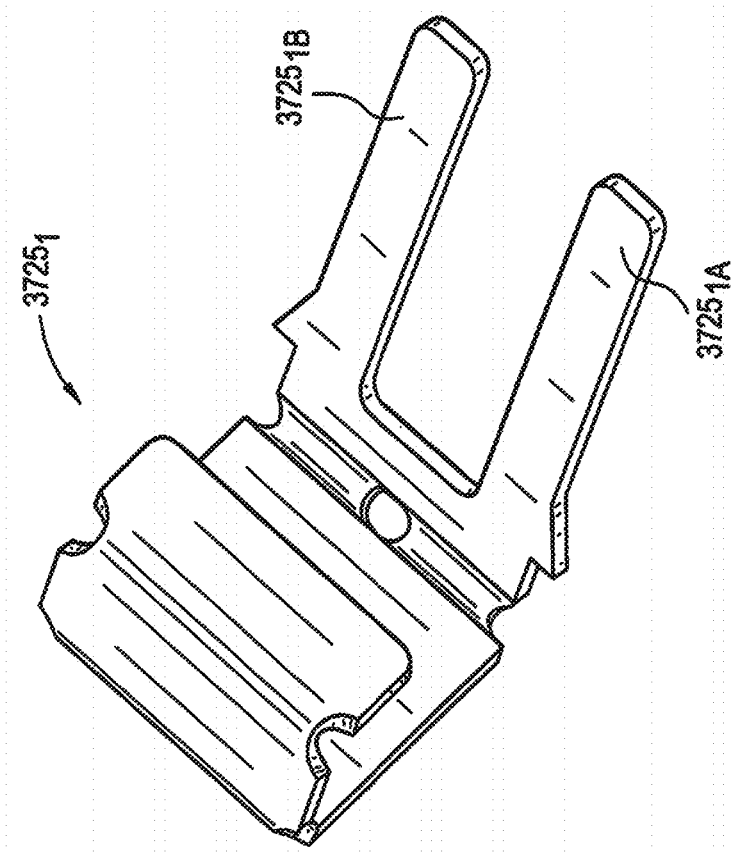

FIG. 37E illustrates a perspective view of the electrical connector assembly 622 and the electrical connector assembly 3710 connected (e.g., providing a connection between interfaces 2120 and 2210).

Figure 38A:
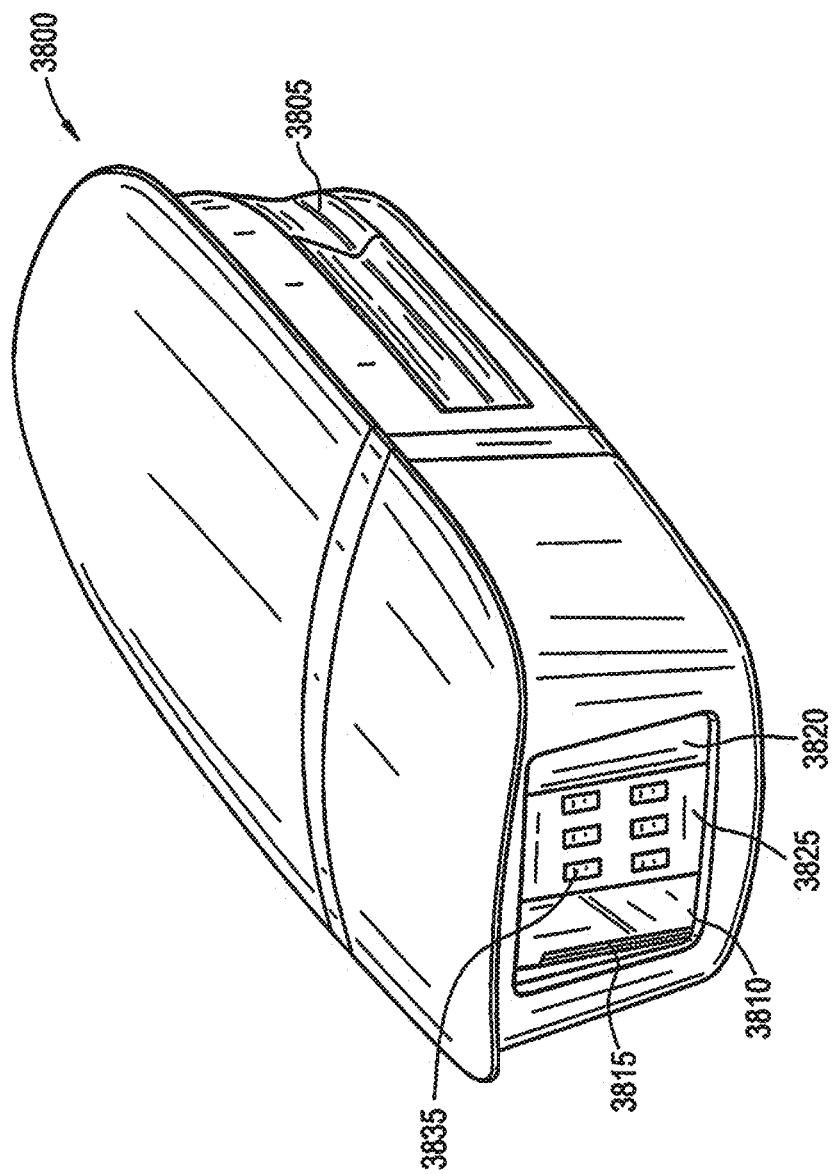

FIG. 38A illustrates a front view of an example embodiment of a pod system having a connector assembly to provide the electrical/data interface with the pod and the dispensing body. FIGS. 38B-38C illustrate exploded views of the connector assembly and the vaporizer assembly.

As shown in FIG. 38A, a pod assembly 3800 includes a triangular shaped groove 3805 and a connector assembly 3810. The triangular shaped groove 3805 may be on at least two sides of the pod assembly 3800. The connector assembly 3810 is exposed such that a connector assembly (e.g., pogo pins) from the dispensing body can contact the connector assembly 3810, supply power to the pod assembly 3800 and communicate data with the dispensing body.

The connector assembly includes a first power contact 3815, a second power contact 3820, a PCB 3830 (including an exposed section 3825) and data communication pads 3835.

On the surface of the PCB 3830 exposed to the dispensing body, the exposed section 3825 is between the first power contact 3815 and the second power contact 3820. Similarly, portions of the first power contact 3815 and the second power contact 3820 that are exposed to the dispensing body are flat and rectangular in shape with the longitudinal axes being normal to a longitudinal axis of the pod assembly 3800. The first power contact 3815 and the second power contact 3820 are folded onto the PCB 3830 as will be described in greater detail below. The first power contact 3815 is part of an anode electrode 3836 and the second power contact 3820 is part of a cathode electrode 3837, shown in FIGS. 38B-38C.

The data communication pads 3835 are printed on the PCB 3830 and are configured to permit digital and analog communications between the pod assembly 3800 and the dispensing body. The data communication pads 3835 may be made of copper. However, another conductive material may be used instead of copper. While six data communication pads 3835 are illustrated, it should be understood that more or less than six data communication pads 3835 may be used.

FIGS. 38B-38C illustrate exploded views of the connector assembly and the vaporizer assembly from different sides.

As shown in FIGS. 38B-38C, the first power contact 3815 is folded around the PCB 3830 to reduce the number of contact points and avoid the use of vias in the PCB 3830 to connect the PCB 3830 with the first power contact 3815.

The electrode 3837 includes the second power contact 3820, two arms 3840, 3842 that extend from opposing sides of the PCB 3830 and a back plate section 3856. The back plate section 3856 connects the arms 3840, 3842. The second power contact 3820 is connected to the arm 3840 by two links 3844-3845. The links 3844-3845 wrap the electrode 3837 around a corner 3850 of the PCB 3830 such that the arm 3840 and the second power contact 3820 are substantially normal.

The electrode 3837 may be made of copper-beryllium (CuBe) or copper-titanium, for example and is photo-etched or stamped from sheet metal, then pressed/folded around a tool or die to create the structure shown in FIGS. 38B-38C.

The arm 3840 includes a rectangular shaped portion 3852 that extends from the PCB 3830 to a tapered portion 3854 of the arm 3840. The tapered portion 3854 has an increasing width from the rectangular shaped portion 3852 to the back plate section 3856.

The back plate section 3856 defines a circle 3858 there through with arms 3860 projecting from the circle 3858. The circle 3858 is shaped to receive a first cylindrical portion 3862 of the vaporizer assembly 906 such that a first end 3864 of the cylindrical portion 3862 contacts the electrode 3836. As shown, the first end 3864 includes a groove 3865 to allow air to enter the vaporizer assembly 906 when the first end 3864 contacts the electrode 3836.

The circle 3858 may have a radius of 3.25 millimeters, each arm 3860 may have a radius of 0.75 millimeters.

A second cylindrical portion 3866 of the vaporizer assembly 906 has a diameter greater than the first cylindrical portion 3862 and contacts the electrode 3837 when the first cylindrical portion 3862 contacts the electrode 3836, thereby forming an electrical circuit between the dispensing body (e.g., 3900 in FIG. 39A), the electrode 3836, the vaporizer assembly 906 and the electrode 3837 when current is supplied from the power supply 2110 to the vaporizer assembly 906.

Figure 39A:
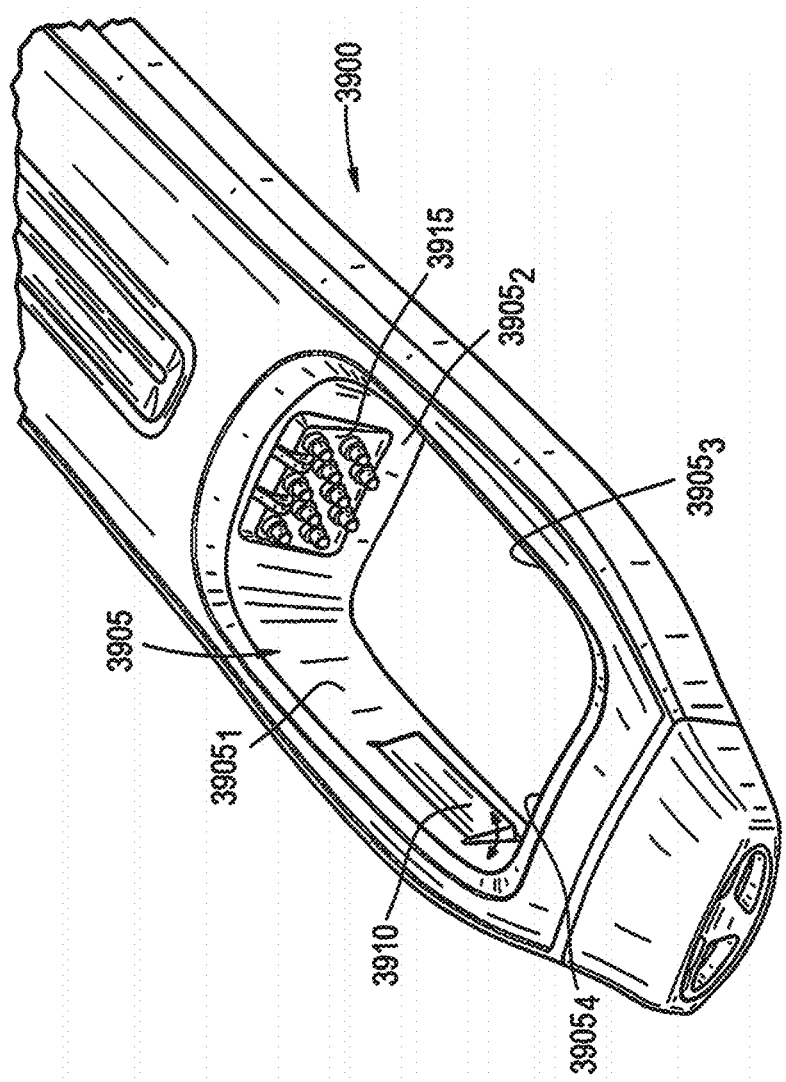
FIG. 39A illustrates an example embodiment of a dispensing body for receiving a pod assembly.

FIG. 39A illustrates an example embodiment of a dispensing body 3900 for receiving the pod assembly 3800.

As shown, the dispensing body 3900 includes a bezel 3905 having four internal walls $3905_1$-$3905_4$ that defining a receiving area for the pod assembly 3800. Within at least one of the walls $3905_1$-$3905_4$ is a triangular wedge 3910 that is designed to fit within the triangular shaped groove 3805 when the pod assembly 3800 is inserted into the receiving area for the pod assembly 3800.

The bezel 3905 is an injection molded part and the wedge 3910 is free to move. The injection molding process and plastic material create allow the wedge to move as shown in FIG. 39A. In another example embodiment, a mechanical spring could be added behind the wedge 3910.

Within another internal wall is a connector assembly 3915 for connecting with the connector assembly 3810 of the pod assembly 3800.

Figure 39B:
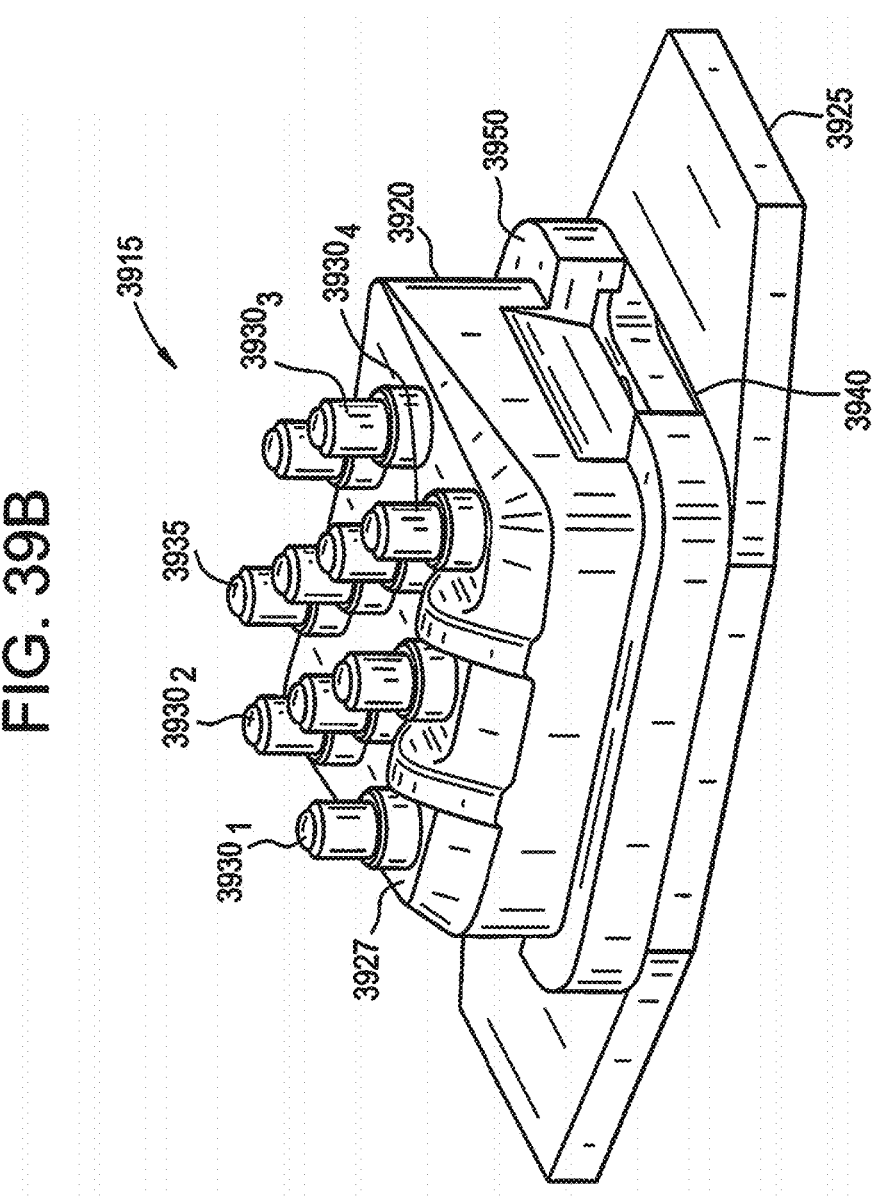

FIGS. 39B-39C illustrate more detailed views of the connector assembly 3915 shown in FIG. 39A.

As shown in FIG. 39B, the connector assembly 3915 includes a base 3920 and a PCB 3925.

A plurality of pogo pins 3930 and 3935 protruding through holes 3927 of the base 3920. The base 3920 is made of plastic and the holes 3927 aid in aligning the pogo pins 3930 and 3935 and protecting the pogo pins 3920 and 3925 from shearing when the pod assembly 3800 is inserted into the receiving area.

The pogo pins $3930_1$-$3930_4$ are on outside rows of the pogo pins are aligned to connect with the power contacts 3815 and 3820 (two to connect to the anode and two to connect to the cathode). More specifically, the pogo pins $3930_1$-$3930_2$ connect with the first power contact 3815 and the pogo pins $3930_3$-$3930_4$ connect with the second power contact 3820. By having two pogo pins contact each power contact, a resistance of the connection is lowered, thereby by improving the power supplied from the dispensing body 3900 to the pod assembly 3800.

The pogo pins 3935 are between the pogo pins $3930_1$-$3930_4$ and are aligned to connect with the data communication pads 3835 and establish an interface for digital and analog communications between the dispensing body 3900 and the pod assembly 3800. Thus, there may be a same number of pogo pins 3935 as data communication pads 3835.

In an example embodiment, the PCB 3925 may include slots 3940 for receiving latching arms 3945. Referring to FIG. 39C, the latching arms 3945 go through the slots 3940 and hold the PCB 3925 to the bezel 3905. The base 3920 is sandwiched between the PCB 3925 and the bezel 3905.

Referring to FIG. 39B, a flanged edge 3950 around the base 3920 holds the base 3920 against the bezel 3905 to prevent the base 3920 from falling out of the bezel 3915.

The PCB 3925 may be connected to a main PCB 3775a using discrete wires (not shown). The main PCB 3775a is the same as the PCB 3775, shown in FIG. 37C, except the PCB 3775a is connected to the pogo pins $3930_1$-$3930_4$ by wires as opposed to electrodes penetrating through the PCB 3775.

FIG. 40 illustrates a cross-sectional view of the electrical connector assembly 3810 and the electrical connector assembly 3915 being connected.

FIGS. 41A-41F illustrate another example embodiment of an electrical connector assembly. An electrical connector assembly 622', shown in FIG. 41 is similar to the electrical connector assembly 622, shown in FIGS. 35A-35F. Thus, for the sake of brevity, only differences between the electrical connector assembly 622' and the electrical connector assembly 622, will be discussed.

Figure 41B:
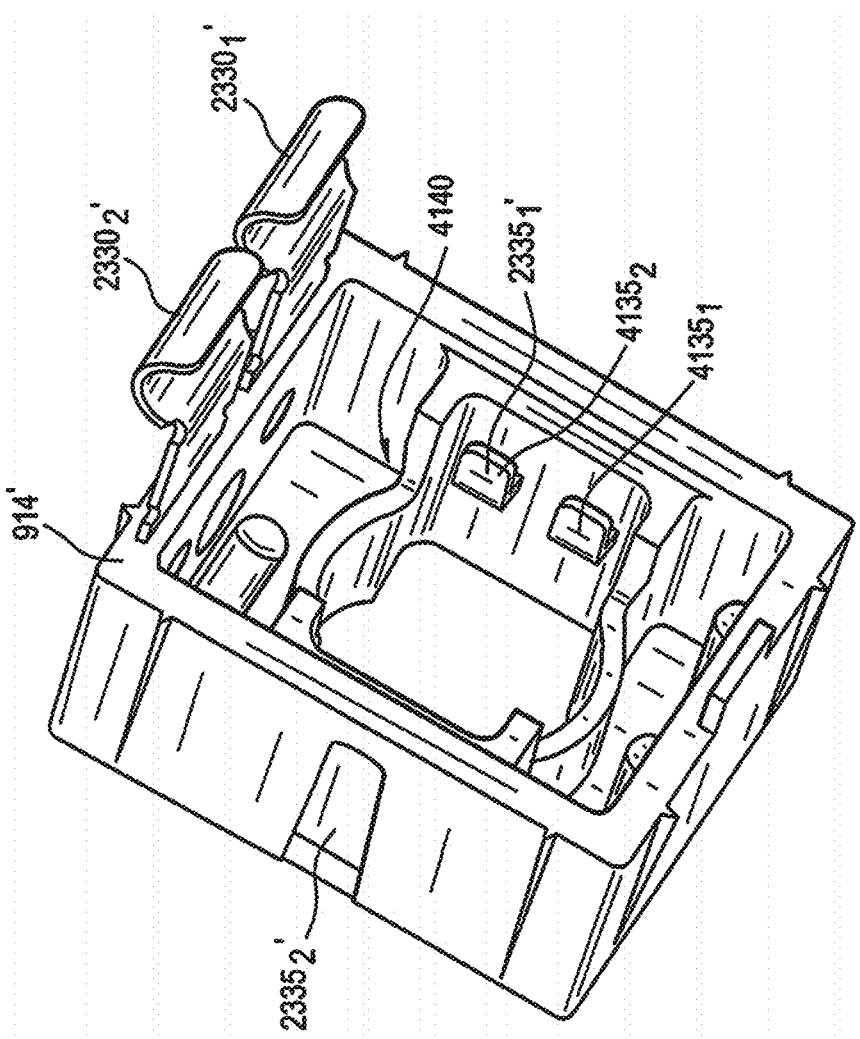

In FIG. 41A, power contacts $2300_1$' and $2330_2$' (anode and cathode, respectively) are insert molded into a connector case 914', as shown in FIG. 41B. While FIG. 41A does not illustrate the power contacts $2300_1$' and $2330_2$' being folded over, it should be understood that the power contacts $2300_1$' and $2330_2$' may be folded over in the same manner as shown in FIGS. 35A-35B.

A data pin connector 920' is ultrasonically welded to the connector case 914'.

The blade-shaped contacts $2320_1$-$2320_6$ are interference fit into the data pin connector 920.

The two power contacts $2330_1$'-$2330_2$' are parts of anode and cathode electrodes $2335_1$'-$2335_2$', respectively.

FIG. 41C illustrates a view of the anode and cathode electrodes $2335_1$'-$2335_2$'. As shown in FIG. 41, the electrodes $2335_1$'-$2335_2$' include folding sections $2335_{1F}$, $2335_{2F}$, respectively, to fold over a surface 4105 of the connector case 914' and extend along a surface 2342' in a fashion similar to that shown in FIG. 35A.

The electrode 2335₁' includes a tapered edge 4112 inside of the connector case 914' so as to not cover an air inlet 4113. Similarly, electrode 2335₂' includes a tapered edge 4115 inside of the connector case 914' so as to not cover the air inlet 4113.

The electrode 2335₁' further includes a bent portion 4120 along a corner 4117 of the connector case 914'. An extended portion 4125 extends from the bent portion 4120 along a side 4130 of the connector case 914'. Two fingers 4135₁ and 4135₂ protrude from the extended portion 4125 into an interior space 4140 of the connector case 914', as shown in both FIGS. 41B and 41C.

The electrode 2335₂' further includes a bent portion 4145 along a corner 4110 of the connector case 914'. An extended portion 4150 extends from the bent portion 4145 along a side 4155 of the connector case 914'. The sides 4155 and 4130 are opposite sides of the connector case 914'. Two fingers 4160₁ and 4160₂ protrude from the extended portion 4125 into an interior space 4140 of the connector case 914', as shown in both FIGS. 41B and 41C.

FIG. 41D illustrates a rear view of the electrical connector assembly shown in FIG. 41A. As shown in FIG. 41D, the connector case 914' includes a rear side 4170 connected to sides 4130, 4155, 4175 and 4180. The rear side 4170, along with the sides 4130, 4155, 4175 and 4180 may be single piece of plastic, as opposed to the connector case 914, shown in FIGS. 35A-35D. More specifically, the connector case 914' has five side surfaces 4130, 4155, 4170, 4175 and 4180 as opposed to the four sides of the connector case 914.

The rear side 4170 defines a circle 4190 there through. The circle 4190 is shaped to receive the vaporizer assembly 906. A gasket 4195 is on the rear side 4170. The gasket 4195 has an inner diameter substantially the same as the diameter of the circle 4190. The inner diameter of the gasket 4195 is large enough to permit the vaporizer assembly 906 to be inserted into the connector case 914'.

When the vaporizer assembly 906 is inserted into the connector case 914', an airtight seal is formed between the vaporizer assembly 906 and the connector case 914', with air being permitted to enter the connector case 914' through only the air inlet 4113.

FIG. 41E illustrates an overhead cross sectional view of a pod assembly including the vaporizer assembly 906 and the electrical connector assembly 622'. FIG. 41F illustrates another view of the vaporizer assembly 906 connected to the electrical connector assembly 622'.

The anode portion 2370 contacts the anode electrode 2335₁' and the cathode portion 2372 contacts the cathode electrode 2335₂'. More specifically, the cathode portion 2372 contacts the cathode electrode 2335₂' along an interior surface of the side 4155 of the connector case 914' and the anode portion 2370 contacts the anode electrode 2335₁' along an interior surface of the side 4130 of the connector case 914'.

As shown in FIGS. 41E-41F, the locations of the connections between the anode portion 2370 and the anode electrode 2335₁' and the cathode portion 2372 and the cathode electrode 2335₂' are different than the locations of the connections between the anode portion 2370 and the anode electrode 2335₁ and the cathode portion 2372 and the cathode electrode 2335₂, shown in FIG. 35F.

The fingers 4135₁, 4135₂ and 4160₁, 4160₂ have a spring property that provide a downwards force on opposing portions of the vaporizer assembly 906 and allows the vaporizer assembly 906 to be pushed into contact with the connector case 914' and be held in place. The fingers 4135₁, 4135₂ and 4160₁, 4160₂ mechanically hold the vaporizer assembly 906, and minimize assembly time compared with screwing on a thread.

As shown in FIG. 41E, when the air flow sensor 916 detects a negative pressure, air flows from the air inlet 4113 to the heater 3510, is mixed with the vaporized pre-vapor formulation generated by the heater 3510 to form a flavored vapor. The flavored vapor flows out of the vaporizer assembly 906 through a channel 4205 that extends across opposing ends of the vaporizer assembly 906.

While a number of example embodiments have been disclosed herein, it should be understood that other variations may be possible. Such variations are not to be regarded as a departure from the spirit and scope of the present disclosure, and all such modifications as would be obvious to one skilled in the art are intended to be included within the scope of the following claims.

The invention claimed is:

1. An e-vapor apparatus comprising:
   a pod assembly including a pre-vapor formulation compartment, a first electrical connector, the pre-vapor formulation compartment configured to hold a pre-vapor formulation therein and in fluidic communication with a vaporizer during an operation of the e-vapor apparatus, the first electrical connector including,
      first and second power electrodes, the first power electrode including a first contact portion on an exterior of the first electrical connector and a first extended portion connected to an anode portion of the vaporizer, the second power electrode including a second contact portion on the exterior of the first electrical connector and a second extended portion connected to a cathode portion of the vaporizer.

2. The e-vapor apparatus of claim 1, wherein each of the first contact portion and the second contact portion includes a part that extends away from a surface of the first electrical connector.

3. The e-vapor apparatus of claim 2, wherein the part that extends away from the surface of the first electrical connector is semi-circular.

4. The e-vapor apparatus of claim 1, wherein the first contact portion and the second contact portion are configured to apply a spring force on a second electrical connector of a dispensing body configured to receive the pod assembly.

5. The e-vapor apparatus of claim 1, wherein the first electrical connector further includes,
   first data contacts, the first data contacts being blade-shaped.

6. The e-vapor apparatus of claim 5, further comprising:
   a dispensing body configured to receive the pod assembly, the dispensing body including a second electrical connector configured to connect to the first electrical connector, the second electrical connector including,
      a body, the body defining slots for receiving the first data contacts, and
      second data contacts in the slots.

7. The e-vapor apparatus of claim 6, wherein the second data contacts are configured to apply a spring force on the first data contacts.

8. The e-vapor apparatus of claim 1, wherein the first extended portion and the second extended portion are configured to apply a spring force on the vaporizer.

9. The e-vapor apparatus of claim 1, wherein the pre-vapor formulation compartment and the first electrical connector are at opposite ends of the pod assembly.

10. The e-vapor apparatus of claim 1, wherein the first electrical connector further includes a memory device and an air flow sensor.

11. The e-vapor apparatus of claim 1, further comprising:
   a dispensing body configured to supply power to the pod assembly and communicate with the pod assembly.

12. The e-vapor apparatus of claim 1, further comprising:
   a dispensing body, wherein the pod assembly further includes a vapor channel traversing the pre-vapor formulation compartment and the dispensing body includes a mouthpiece that includes a vapor passage, the vapor passage being in fluidic communication with the vapor channel when the pod assembly is electrically connected to the dispensing body.

13. The e-vapor apparatus of claim 1, further comprising:
   an attachment structure, the attachment structure configured to engage and hold the pod assembly upon insertion into a receiving area of the e-vapor apparatus.

14. The e-vapor apparatus of claim 1, further comprising:
   an attachment structure on a side surface of the pod assembly, the attachment structure configured to engage and hold the pod assembly upon insertion into a receiving area of the e-vapor apparatus.

15. The e-vapor apparatus of claim 14, wherein the attachment structure is a groove.

16. The e-vapor apparatus of claim 1, wherein the first contact portion and the second contact portion are flat.

* * * * *